United States Patent
Endo et al.

(10) Patent No.: US 11,620,606 B2
(45) Date of Patent: Apr. 4, 2023

(54) INFORMATION PROCESSING DEVICE, INFORMATION PROCESSING METHOD, AND NON-TRANSITORY STORAGE MEDIUM STORING INFORMATION PROCESSING PROGRAM

(71) Applicant: TOYOTA JIDOSHA KABUSHIKI KAISHA, Toyota (JP)

(72) Inventors: Masato Endo, Nagakute (JP); Yuichiro Haruna, Oyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1128 days.

(21) Appl. No.: 16/200,433

(22) Filed: Nov. 26, 2018

(65) Prior Publication Data
US 2019/0164121 A1 May 30, 2019

(30) Foreign Application Priority Data
Nov. 28, 2017 (JP) .............................. JP2017-227892

(51) Int. Cl.
*G06Q 10/08* (2023.01)
*G08G 1/127* (2006.01)
(Continued)

(52) U.S. Cl.
CPC ..... *G06Q 10/0832* (2013.01); *G06Q 10/0833* (2013.01); *G08G 1/127* (2013.01);
(Continued)

(58) Field of Classification Search
CPC . G06Q 10/0832; G06Q 10/0833; H04W 4/44; H04W 4/029; H04W 4/027; H04W 12/06; G08G 1/127
See application file for complete search history.

(56) References Cited

U.S. PATENT DOCUMENTS 9,508,204 B2   11/2016 Oz et al.
2016/0189098 A1*  6/2016 Beaurepaire ........ H04W 12/084
                                                   705/337
(Continued)

FOREIGN PATENT DOCUMENTS

CN     104885110 A    9/2015
JP     2006-206225 A  8/2006
(Continued)

OTHER PUBLICATIONS

Thomas J. Kimpel, Improving Scheduling Through Performance Monitoring, p. 1-2 (Year: 2006).*

*Primary Examiner* — Resha Desai
*Assistant Examiner* — Ibrahim N El-Bathy
(74) *Attorney, Agent, or Firm* — Hunton Andrews Kurth LLP

(57) ABSTRACT

An information processing device performs an operation of a delivery service in which a vehicle cabin including a trunk of a vehicle used by a requester is designated as a delivery destination of luggage, or assists in the operation. The information processing device includes a vehicle position information acquisition unit configured to acquire position information of the vehicle, a requester position information acquisition unit configured to acquire position information of a mobile terminal carried by a requester, and a delivery countermeasure decision unit configured to decide a procedure regarding delivery work of the luggage based on the position information of the vehicle and the position information of the mobile terminal carried by the requester when the vehicle is parked.

10 Claims, 13 Drawing Sheets

(51) Int. Cl.
| | |
|---|---|
| *H04W 4/44* | (2018.01) |
| *H04W 4/029* | (2018.01) |
| *H04W 12/06* | (2021.01) |
| *H04W 4/02* | (2018.01) |
| *G06Q 10/0832* | (2023.01) |
| *G06Q 10/0833* | (2023.01) |

(52) U.S. Cl.
CPC .......... *H04W 4/027* (2013.01); *H04W 4/029* (2018.02); *H04W 4/44* (2018.02); *H04W 12/06* (2013.01)

(56) References Cited

U.S. PATENT DOCUMENTS

| | | | |
|---|---|---|---|
| 2017/0017920 A1 | 1/2017 | Stark et al. | |
| 2018/0315013 A1* | 11/2018 | Wilkinson | ......... G05D 23/1917 |
| 2021/0097486 A1* | 4/2021 | Boccuccia | ......... G06Q 10/0833 |

FOREIGN PATENT DOCUMENTS

| | | |
|---|---|---|
| JP | 2013032105 A | 2/2013 |
| JP | 2015-045141 A | 3/2015 |
| WO | 2014099858 A2 | 6/2014 |

* cited by examiner

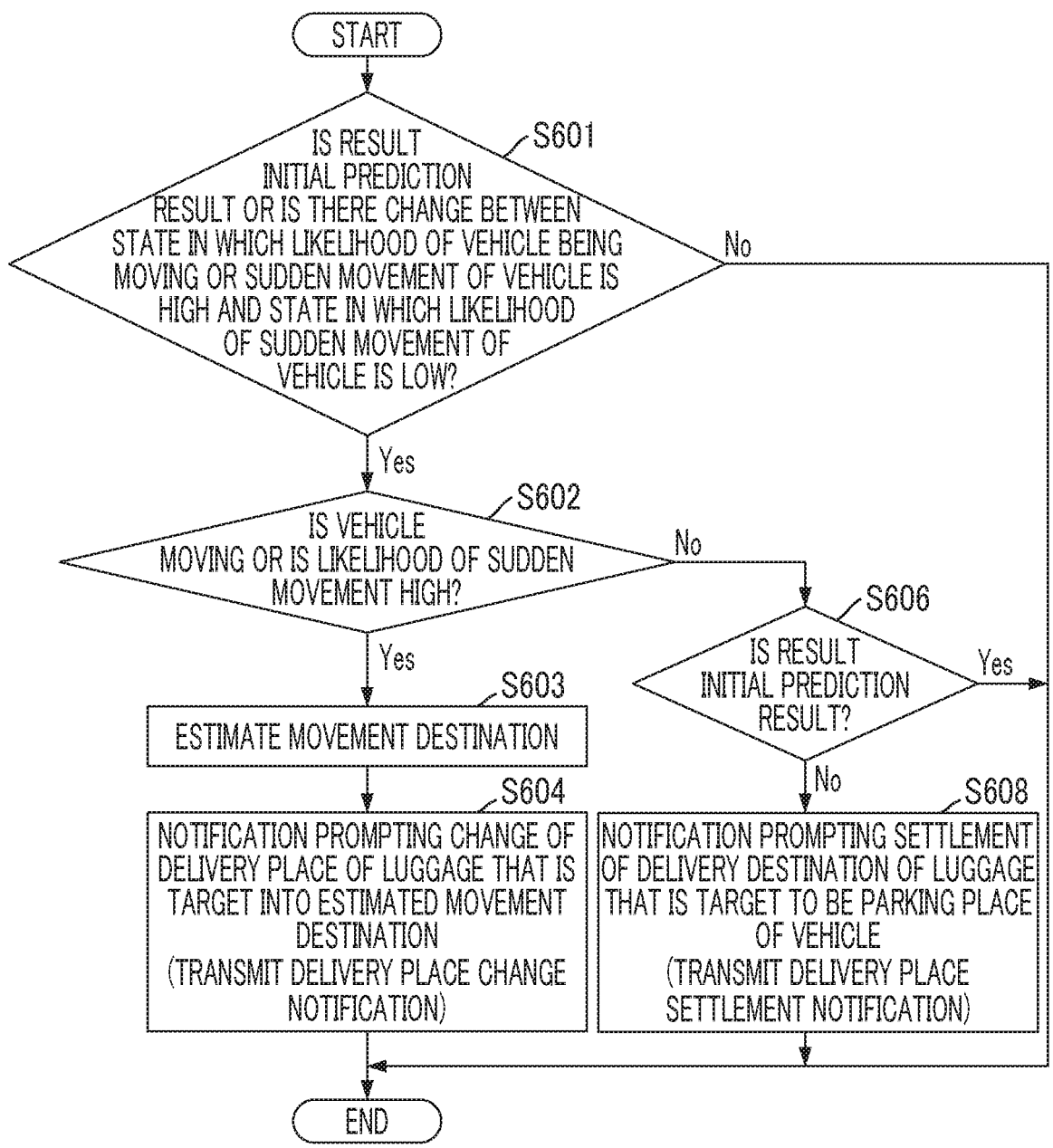

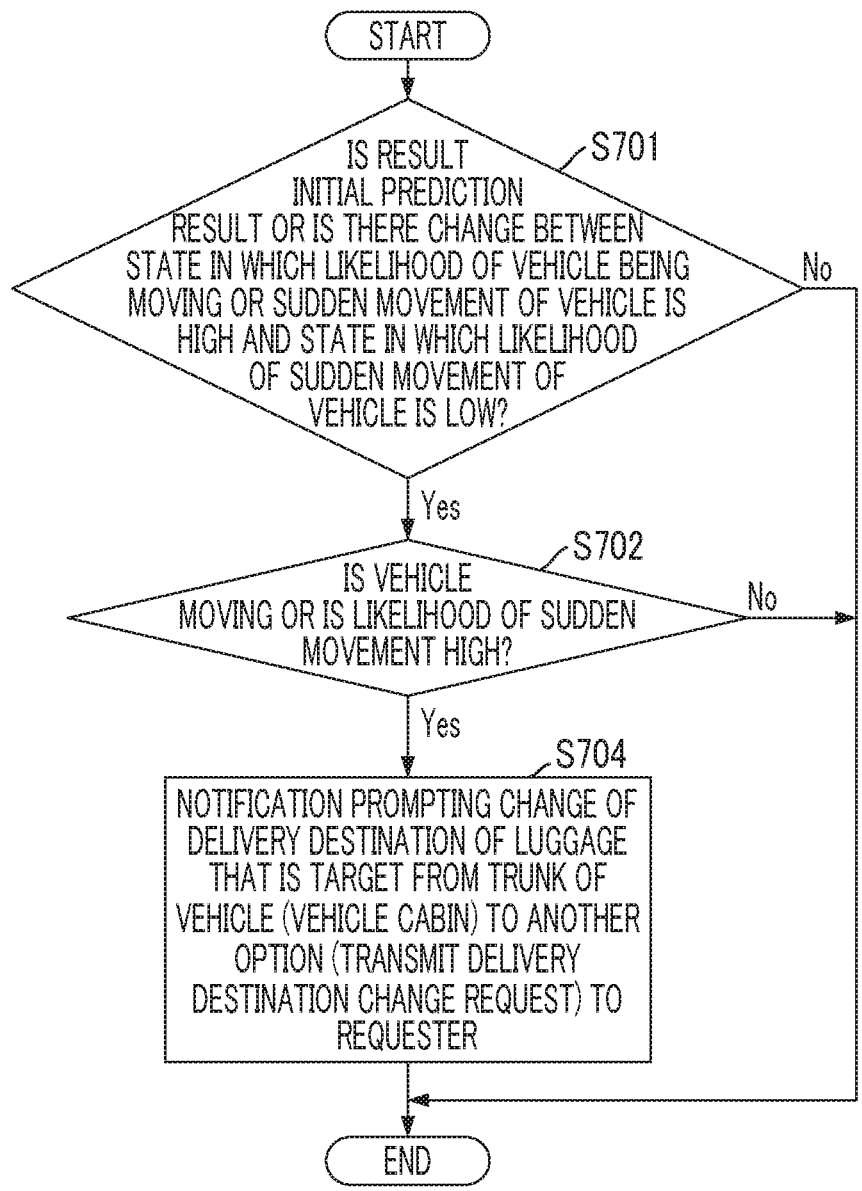

INFORMATION PROCESSING DEVICE, INFORMATION PROCESSING METHOD, AND NON-TRANSITORY STORAGE MEDIUM STORING INFORMATION PROCESSING PROGRAM

INCORPORATION BY REFERENCE

The disclosure of Japanese Patent Application No. 2017-227892 filed on Nov. 28, 2017 including the specification, drawings and abstract is incorporated herein by reference in its entirety.

BACKGROUND

1. Technical Field

The present disclosure relates to an information processing device, an information processing method, and a non-transitory storage medium storing an information processing program.

2. Description of Related Art

For example, a mechanism for using a trunk of a vehicle such as a trunk as a delivery destination of luggage is disclosed (see Japanese Unexamined Patent Application Publication No. 2006-206225 (JP 2006-206225 A) or the like).

Specifically, when a predetermined transmission signal is transmitted from a terminal carried by a deliverer to a vehicle and accordingly, authentication based on authentication information (key information) included in the transmission signal is successful on the vehicle side, a trunk of the vehicle is unlocked and a deliverer causes luggage to be accommodated in the trunk. Accordingly, a delivery company can provide a customer with a delivery service in which a vehicle cabin such as the trunk of the vehicle can be designated as a delivery destination (hereinafter referred to as a "vehicle cabin delivery service").

SUMMARY

However, there is a likelihood of a vehicle moving from a parking place due to sudden use of a user or the like. Therefore, for example, a delivery company or the like is forced to make a determination such as changing a delivery countermeasure regarding luggage at a point in time when the delivery company or the like has ascertained that the vehicle designated as a delivery destination of the luggage has moved from the parking place, and there is a likelihood of an appropriate determination in consideration of delivery work efficiency being unable to be made. Accordingly, as a result, there is a likelihood of efficient delivery work being unable to be performed.

The present disclosure provides an information processing device, an information processing method, and a non-transitory storage medium storing an information processing program capable of realizing efficient delivery work even in a situation in which there is a likelihood of sudden movement of a parked vehicle is high in a delivery service in which a vehicle cabin of a vehicle used by a user can be designated as a delivery destination of luggage.

A first aspect of the present disclosure relates to an information processing device that performs an operation of a delivery service in which a vehicle cabin including a trunk of a vehicle used by a requester is designated as a delivery destination of luggage, or assists in the operation. The information processing device includes a vehicle position information acquisition unit configured to acquire position information of the vehicle, a requester position information acquisition unit configured to acquire position information of a mobile terminal carried by the requester, and a delivery countermeasure decision unit configured to decide a procedure regarding delivery work of the luggage based on the position information of the vehicle and the position information of the mobile terminal carried by the requester when the vehicle is parked.

According to the first aspect of the present invention, the information processing device can ascertain a relative positional relationship between the vehicle and the requester based on the position information of the vehicle and the position information of the mobile terminals carried by the requester. Therefore, when the vehicle is parked, the information processing device can predict whether or not the likelihood of the requester getting on the vehicle and going out is high, that is, whether or not the likelihood of the requester getting on the vehicle and the vehicle suddenly moving is high, from a relative positional relationship between the vehicle and the requester or a change in the relative positional relationship. Therefore, for example, the information processing device can maintain a procedure regarding the delivery work of the luggage in which a vehicle cabin of the vehicle is designated as a delivery destination as it is in a situation in which the likelihood of the sudden movement of the vehicle is low, and can change the procedure regarding the delivery work of the luggage in consideration of efficiency before the vehicle moves in a situation in which the likelihood of the sudden movement of the vehicle is high. Therefore, the information processing device can realize efficient delivery work even in a situation in which a likelihood of the sudden movement of the parked vehicle is high.

The information processing device according to the first aspect of the present disclosure may further include a prediction unit configured to predict a level of a likelihood of sudden movement of the vehicle based on the position information of the vehicle and the position information of the mobile terminal carried by the requester when the vehicle is parked. The delivery countermeasure decision unit may change the procedure when the prediction unit predicts that the likelihood of the sudden movement of the vehicle is high.

According to the first aspect of the present disclosure, the information processing device can specifically predict the level of the likelihood of the sudden movement of the vehicle, and change the procedure regarding the delivery work of the luggage in which the vehicle cabin of the vehicle is designated as the delivery destination when the information processing device predicts that the likelihood of the sudden movement of the vehicle is high.

In the information processing device according to the first aspect of the present disclosure, the prediction unit may predict that the likelihood of the sudden movement of the vehicle is high when a distance between the vehicle and the mobile terminal carried by the requester is relatively short.

According to the first aspect of the present disclosure, when the distance between the vehicle and the requester is relatively short, the information processing device can specifically predict that the likelihood of the sudden movement of the vehicle is high.

In the information processing device according to the first aspect of the present disclosure, the prediction unit may predict that the likelihood of the sudden movement of the vehicle is high when the mobile terminal carried by the requester is approaching the vehicle in a predetermined range of the vehicle.

According to the first aspect of the present disclosure, the information processing device can predict that the likelihood of the sudden movement of the vehicle is high when the requester is approaching the vehicle in the predetermined range of the vehicle.

The information processing device according to the first aspect of the present disclosure may further include an other-user position information acquisition unit configured to acquire the position information of the mobile terminal carried by another user of the vehicle other than the requester. The prediction unit may predict a level of the likelihood of the sudden movement of the vehicle based on the position information of the vehicle and the position information of the mobile terminal carried by the other user when the vehicle is parked.

According to the first aspect of the present disclosure, the information processing device can ascertain a relative positional relationship between the vehicle and the other user based on the position information of the vehicle and the position information of the mobile terminal carried by another user of the vehicle other than the requester of the delivery service. Therefore, when the vehicle is parked, the information processing device can predict not only the level of the likelihood of the requester getting on the vehicle and the sudden movement of the vehicle, but also the level of the likelihood of the other user getting on the vehicle and the vehicle suddenly moving from the relative position relationship between the vehicle and the other user and a change in the relative positional relationship. That is, the information processing device can predict the level of the likelihood of solely the other user other than the requester getting on the vehicle and the vehicle suddenly moving. Therefore, the information processing device can realize efficient delivery work even in a situation in which the likelihood of solely the other user other than the requester getting on the vehicle and the parked vehicle suddenly moving is high.

In the information processing device according to the first aspect of the present disclosure, the delivery countermeasure decision unit may temporarily stop the delivery work of the luggage when the prediction unit predicts that the likelihood of the sudden movement of the vehicle is high.

According to the first aspect of the present disclosure, when the likelihood of the sudden movement of the vehicle is high, the information processing device can specifically perform a countermeasure such as changing the procedure regarding the delivery work of the luggage and prioritizing the delivery work of other luggage in advance, in a detailed aspect in which the delivery work of the luggage is temporarily stopped.

In the information processing device according to the first aspect of the present disclosure, the delivery countermeasure decision unit may relatively delay a delivery order of the vehicle cabin of the vehicle corresponding to the luggage among a plurality of delivery destinations of which a deliverer of the luggage is in charge when the prediction unit predicts that the likelihood of the sudden movement of the vehicle is high.

According to the first aspect of the present disclosure, when the likelihood of the sudden movement of the vehicle is high, the information processing device can specifically perform a countermeasure such as changing the procedure regarding the delivery work of the luggage and prioritizing the delivery work of other luggage in advance, in a detailed aspect in which the delivery order of the vehicle cabin of the vehicle corresponding to the luggage among the delivery destinations of which the deliverer is in charge is delayed.

The information processing device according to the first aspect of the present disclosure may further include a movement destination estimation unit configured to estimate a movement destination of the vehicle. The delivery countermeasure decision unit may change a delivery place to which a deliverer of the luggage is directed, from a parking place of the vehicle to the movement destination of the vehicle estimated by the movement destination estimation unit when the prediction unit predicts that the likelihood of the sudden movement of the vehicle is high.

According to the first aspect of the present disclosure, the information processing device can change the procedure regarding the delivery work of the luggage in advance specifically, in an aspect in which a delivery place to which the deliverer is directed is changed, from the parking place of the vehicle to a place estimated as the movement destination of the vehicle when the likelihood of the sudden movement of the vehicle is high.

The information processing device according to the first aspect of the present disclosure may further include a notification unit configured to transmit a notification prompting change of the delivery destination from the vehicle cabin of the vehicle to another option, to the mobile terminal carried by the requester, an email address of the requester, or an account of a predetermined social networking service of the requester when the prediction unit predicts that the likelihood of the sudden movement of the vehicle is high.

According to the first aspect of the present disclosure, the information processing device can prompt the requester to change the delivery destination in advance when the likelihood of the sudden movement of the vehicle is high.

A second aspect of the present disclosure relates to an information processing method executed by an information processing device that performs an operation of a delivery service in which a vehicle cabin including a trunk of a vehicle used by a requester is designated as a delivery destination of luggage, or assists in the operation. The information processing method includes acquiring position information of the vehicle, acquiring position information of a mobile terminal carried by a requester, and deciding a procedure regarding delivery work of the luggage based on the position information of the vehicle and the position information of the mobile terminal carried by the requester when the vehicle is parked.

A third aspect of the present disclosure relates to a non-transitory computer-readable storage medium storing an information processing program. The information processing program causes an information processing device to execute the information processing method according to the second aspect of the present disclosure.

According to the aspects of the present disclosure, it is possible to provide an information processing device, an information processing method, and a non-transitory computer-readable storage medium storing an information processing program capable of realizing efficient delivery work in a delivery service in which a vehicle cabin of a vehicle used by a requester can be designated as a delivery destination of luggage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 12 is a flowchart schematically showing a third example of the delivery countermeasure decision process of the center server; and FIG. 13 is a flowchart schematically showing a fourth example of the delivery countermeasure decision process of the center server.

DETAILED DESCRIPTION OF EMBODIMENTS

Hereinafter, modes for carrying out the disclosure will be described with reference to the drawings.

Overall Configuration of Key Information Management System

Figure 1:
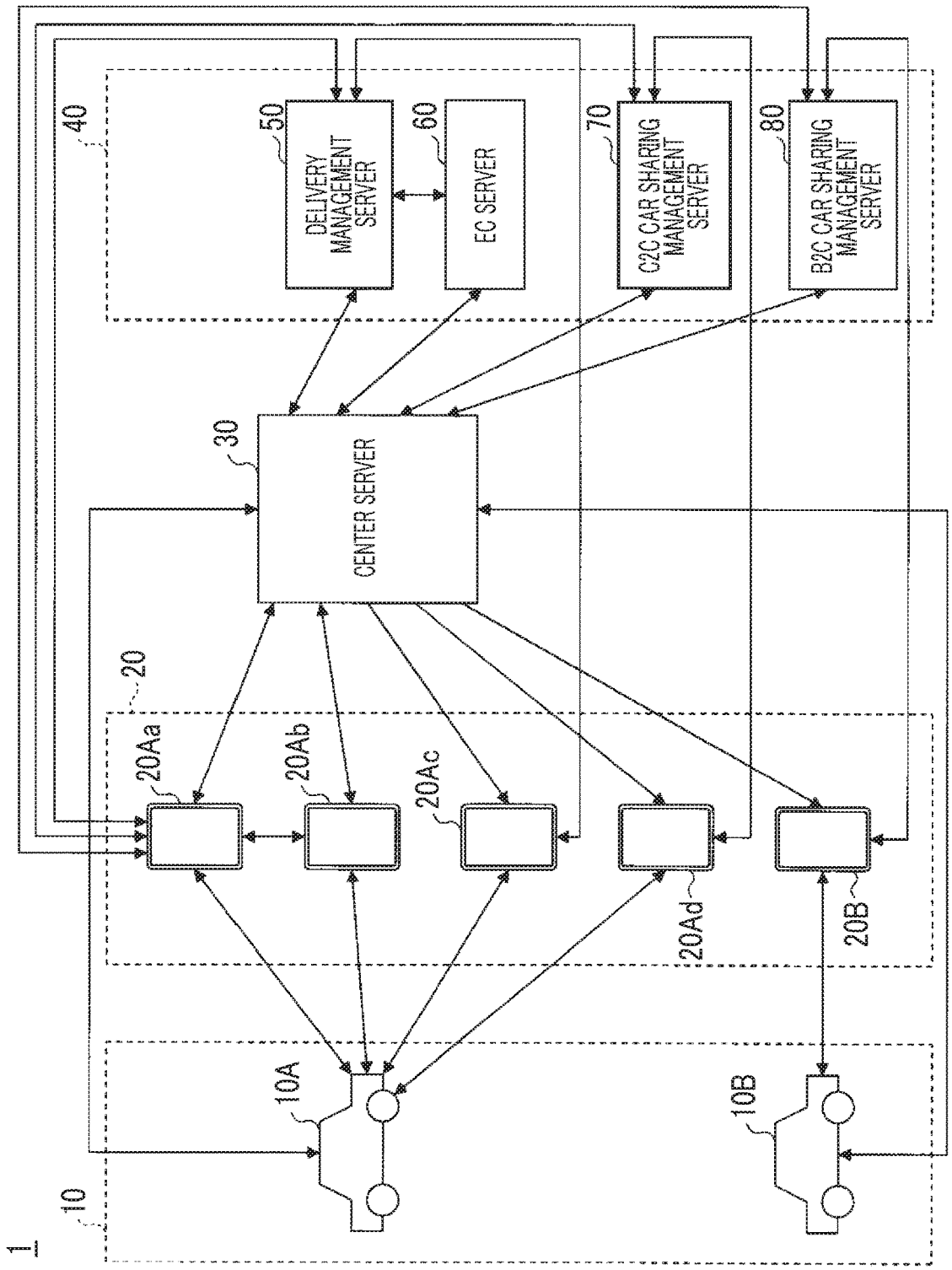
FIG. 1 is a diagram illustrating an example of an overall configuration of an authentication key management system.

FIG. 1 is a block diagram illustrating an example of an overall configuration of a key information management system according to an embodiment.

An authentication key management system 1 includes a vehicle 10, a mobile terminal 20, a center server 30, and a service management server 40.

The vehicle 10 can perform wireless communication (hereinafter referred to as "near field communication") with the mobile terminal 20 at a relatively short distance (a distance that allows communication between the inside of a vehicle cabin and the outside of the vehicle cabin) according to a predetermined communication standard. The vehicle 10 is a target on which locking and unlocking of doors and activation (ignition on) of the vehicle 10 are performed based on transmission signals (an authentication request, a locking request, and an unlocking request to be described below) from the mobile terminal 20. The door of the vehicle 10 may include not only a door for getting on and off, but also a door for luggage (for example, a trunk lid or a back door) for accessing a trunk (a luggage room). The ignition on (IG-ON) of the vehicle 10 may include ON of a power supply to an electric motor in the vehicle 10 using the electric motor as a main power source, in addition to startup of an engine in the vehicle 10 using the engine as a main power source. Hereinafter, in the embodiment, description will be given on the premise that the vehicle 10 includes an engine 117 to be described below as a main power source, the activation (IG-ON) of the vehicle 10 corresponds to startup of the engine 117, and stopping (IG-OFF) of the vehicle 10 corresponds to stopping of the engine 117.

The vehicle 10 is communicably connected to the center server 30 over a predetermined communication network (for example, a mobile phone network or an Internet network in which a plurality of base stations is terminations). The vehicle 10 transmits vehicle information such as position information to the center server 30, as described below.

The vehicle 10 includes a vehicle 10A owned by an individual and a vehicle 10B owned by a company providing a business to consumer (hereinafter referred to as "B2C") car sharing service.

The mobile terminal 20 is communicably connected to the center server 30 over a predetermined communication network (for example, a mobile phone network or an Internet network in which a plurality of base stations is terminations). The mobile terminal 20 can unlock or lock the vehicle 10 by acquiring authentication key information (an example of key information. The authentication key information is hereinafter referred to as an "authentication key") distributed from the center server 30 and transmitting the acquired authentication key to the vehicle 10 through relatively short distance wireless communication according to a predetermined manipulation of the user. The mobile terminal 20 may be, for example, a general-purpose mobile phone, a smartphone, or a tablet terminal. As will be described below, a predetermined application program (hereinafter referred to as a "key application") installed in the built-in processing device 23 is activated, and thereby, the above-described function may be realized. The mobile terminal 20 may be a dedicated mobile terminal specialized for unlocking of the doors of the vehicle 10 and activation of the vehicle 10 by acquiring the authentication key from the center server 30 and using the acquired authentication key. The mobile terminal 20 includes mobile terminals 20Aa to 20Ad corresponding to the vehicle 10A and a mobile terminal 20B corresponding to the vehicle 10B.

The mobile terminal 20Aa is a mobile terminal carried by an owner (hereinafter referred to as an "owner user") among regular users of the vehicle 10A (hereinafter referred to as "regular users"). The mobile terminal 20Aa may bidirectionally communicate with the mobile terminal 20Ab through wireless communication at a relatively short distance.

The mobile terminal 20Ab is a mobile terminal carried by a regular user other than the owner user of the vehicle 10A (for example, including a family member of the owner user and a close friend of the owner user. The regular user is hereinafter referred to as a "sub-user").

The sub-user may include a user who does not drive the vehicle 10A or a user who cannot drive (for example, an owner user's child under 18 years of age). This is because, for example, when solely a trunk delivery service to be described below is used, the regular user does not need to drive the vehicle 10A.

The mobile terminal 20Ac is carried by a deliverer of a company that provides a trunk delivery service to be described below (hereinafter simply referred to as a "delivery company"). The mobile terminal 20Ac is communicably connected to the center server 30 and a delivery management server 50 to be described below over a predetermined communication network (for example, a mobile phone network or an Internet network in which a plurality of base stations is terminations).

The mobile terminal 20Ad is a mobile terminal carried by a borrower of the vehicle 10A in a consumer to consumer (hereinafter referred to as "C2C") car sharing service to be described below. The mobile terminal 20Ad is communicably connected to the center server 30 and a C2C car sharing management server 70 to be described below over the predetermined communication network (for example, a mobile phone network or an Internet network in which a plurality of base stations is terminations).

The mobile terminal 20B is a mobile terminal carried by the borrower of the vehicle 10B in a B2C car sharing service to be described below. The mobile terminal 20B is communicably connected to the center server 30 and a B2C car sharing management server 80 to be described below over the predetermined communication network (for example, a mobile phone network or an Internet network in which a plurality of base stations is terminations).

The center server 30 is communicably connected to the vehicle 10, the mobile terminal 20, and the service management server 40.

The center server 30 manages issuance of an authentication key of the vehicle 10. For example, the center server 30 issues the authentication key according to a predetermined condition and distributes the authentication key to the mobile terminal 20.

The center server 30 acquires position information of the vehicle 10 from the vehicle 10. Accordingly, the center server 30 can ascertain the position of the vehicle 10.

The center server 30 operates the car sharing service for sharing the vehicle 10A among a plurality of regular users including the owner user of the vehicle 10A. Specifically, the center server 30 operates a service for sharing the authentication key of the vehicle 10A that each of a plurality of pre-registered regular users including the owner user can acquire in the mobile terminal 20 of the regular user (the mobile terminals 20Aa, 20Ab) (a key sharing service).

The center server 30 performs a registration process (a use registration process) of allowing the regular user of the vehicle 10A to use a service for using the vehicle 10A (a key sharing service, a trunk delivery service, a C2C car sharing service, or the like). Specifically, the center server 30 registers an authority to distribute the authentication key to the predetermined mobile terminal 20 (hereinafter referred to as an "authentication key arrangement authority") by a key sharing management unit 3207 or a service management server 40 to be described below transmitting an authentication key arrangement request to be described below in order for the regular user of the vehicle 10A to use the service for using the vehicle 10A.

The center server 30 manages a use situation of the vehicle 10A through a plurality of services (that is, a plurality of companies) through a trunk delivery service, a C2C car sharing service, and the like to be described below.

The service management server 40 operates and manages various services that are provided using the vehicle 10. The service management server 40 includes a delivery management server 50 and an electronic commerce (EC) server 60 corresponding to the trunk delivery service, a C2C car sharing management server 70 corresponding to the C2C car sharing service, a B2C car sharing management server 80 corresponding to the B2C car sharing service.

The trunk delivery service may include a delivery service in which a product ordered at an EC site to be described below is a delivery target, and a delivery service in which a product other than the product ordered at the EC site is a delivery target. For example, the trunk delivery service in which the product other than the product ordered at the EC site is the delivery target is a service in which the regular user of the vehicle 10A can change a delivery destination to the trunk of the vehicle 10A when there is a notification indicating that luggage destined for a house is scheduled to be delivered, from the delivery management server 50 to the regular user of the vehicle 10A through an e-mail, an account of social networking service (SNS), or a specific application program activated at mobile terminals 20Aa, 20Ab. Hereinafter, in the embodiment, description will be given while focusing on the trunk delivery service in which the product ordered at the EC site is the delivery target. An operation of each configuration related to the trunk delivery service to be described below can be appropriately applied to an operation of each configuration in the trunk delivery service in which the product other than the product ordered at the EC site is the delivery target.

The delivery management server 50 is communicably connected to the mobile terminal 20Ac and the center server 30 over a predetermined communication network, and performs an operation and management of a distribution system related to the trunk delivery service from reception of the luggage to the delivery of the luggage to the trunk of the vehicle 10A.

A delivery company operating the delivery management server 50 may provide the regular user of the vehicle 10A with a delivery service in which a vehicle cabin other than the trunk of the vehicle 10A can be designated as a delivery destination in place of the trunk of the vehicle 10A or in addition to the trunk of the vehicle 10A. Hereinafter A delivery service in which the vehicle cabin (that is, the inside of the vehicle 10A) including the trunk of the vehicle 10A can be designated as the delivery destination is referred to as a "vehicle cabin delivery service". The delivery company operating the delivery management server 50 may provide the regular user of the vehicle 10A with a collection service in which the vehicle cabin including the trunk can be designated as a luggage collection source (hereinafter referred to as a "vehicle cabin collection service"), as well as the vehicle cabin delivery service. That is, the delivery management server 50 may perform an operation and management of the vehicle cabin collection service in place of the vehicle cabin delivery service or in addition to the vehicle cabin delivery service. In this case, the luggage that is a luggage collection target may be a product (that is, a product purchased at the EC site) returning to an operating company of the EC site corresponding to the EC server 60 (or a store opened at the EC site) or may be luggage for delivery not related to the EC site. The vehicle cabin collection service may be realized as a collection service when a company (for example, a company for cleaning) that provides a service in a form of temporarily keeping products from a customer keeps luggage from the regular user of the vehicle 10A. In this case, a cleaning company or the like may provide a collection management server that operates and manages the vehicle cabin collection service, which can be included in the service management server 40, as in the delivery management server 50. That is, the collection management server may be provided, in place of the delivery management server 50 or in addition to the delivery management server 50. A recovery service in which the vehicle cabin of the vehicle 10A can be designated as a recovery source of articles that are recovery targets (hereinafter referred to as a "vehicle cabin recovery service") may be provided to the regular user of the vehicle 10A by a company that provides a service in a form of recovering predetermined articles (articles such as waste or a secondhand book desired to be purchased) from customers (for example, a waste collection company or an antique purchase company). In this case, a recovery management server that operates and manages the vehicle cabin recovery service, which may be included in the service management server 40, may be provided by a waste recovery company or the like, similar to the delivery management server 50. That is, the recovery management server may be provided, in place of the delivery management server 50 or in addition to the delivery management server 50.

The EC server 60 is communicably connected to the center server 30 and the delivery management server 50 over a predetermined communication network, and operates a predetermined website (an EC site) for selling products or services. More specifically, the EC server 60 displays the trunk of the vehicle 10A as an option of the delivery destination on an order screen of the EC site, for regular users of the vehicle 10A and a delivery company (a delivery company corresponding to the delivery management server 50) that have been registered in advance. Accordingly, the regular user of the vehicle 10A can have the purchased product delivered to the trunk of the vehicle 10A even when the regular user is absent at a house.

The C2C car sharing management server 70 is communicably connected to the mobile terminal 20Ad and the center server 30, and performs an operation and management of the C2C car sharing service that assists in lending and borrowing of the vehicle 10A between individuals. For example, the C2C car sharing management server 70 performs an operation and management of the C2C car sharing service such as reception of registration of a date and time when the vehicle 10A can be lent by the owner user, reception of reservation of use from a person who wants to borrow the vehicle 10A, and arrangement of the authentication key of the vehicle 10A. The C2C car sharing management server 70 may operate and manage the C2C trunk sharing service in an aspect in which the inside of the vehicle cabin of the vehicle 10A of an individual or the trunk thereof is lent as a temporary luggage storage place, a luggage delivery destination, or the like.

The B2C car sharing management server 80 is communicably connected to the mobile terminal 20B and the center server 30, and performs an operation and management of the B2C car sharing service in which the vehicle 10B owned by a predetermined company (for example, a provider of the B2C car sharing service) is lent in an aspect in which the vehicle 10B can be shared among a plurality of general consumers. For example, the B2C car sharing management server 80 performs an operation and management of the B2C car sharing service such as reception of reservation of use of the vehicle 10B, and arrangement of a parking position of the vehicle 10B and the authentication key of the vehicle 10B. The B2C car sharing management server 80 may operate and manage the B2C trunk sharing service in an aspect in which the inside of the vehicle cabin of the vehicle 10B or the trunk is lent as a temporary luggage storage space or a luggage delivery destination.

A company car use management server that operates a car sharing service (a company car use management service) in which an employee of a company is a borrower, with the vehicle 10 as a company car of the company being a reservation of use target, may be included in the service management server 40, instead of the B2C car sharing management server 80 or in addition to the B2C car sharing management server 80. In this case, when there is an idle time period of the vehicle 10, which is the company car, the C2C car sharing management server 70 may operate the C2C car sharing service, with the vehicle 10 as a company car being a borrowing target. The delivery management server 50 and the EC server 60 may operate the trunk delivery service in which a delivery destination of luggage to be delivered to a company can be designated as a trunk of the vehicle 10 that is a company car of the company.

Details of Configuration Regarding Locking, Unlocking, and Activation of Vehicle A configuration regarding locking, unlocking, and activation of vehicle 10 in the authentication key management system 1 will be described with reference to FIG. 2.

Figure 2:
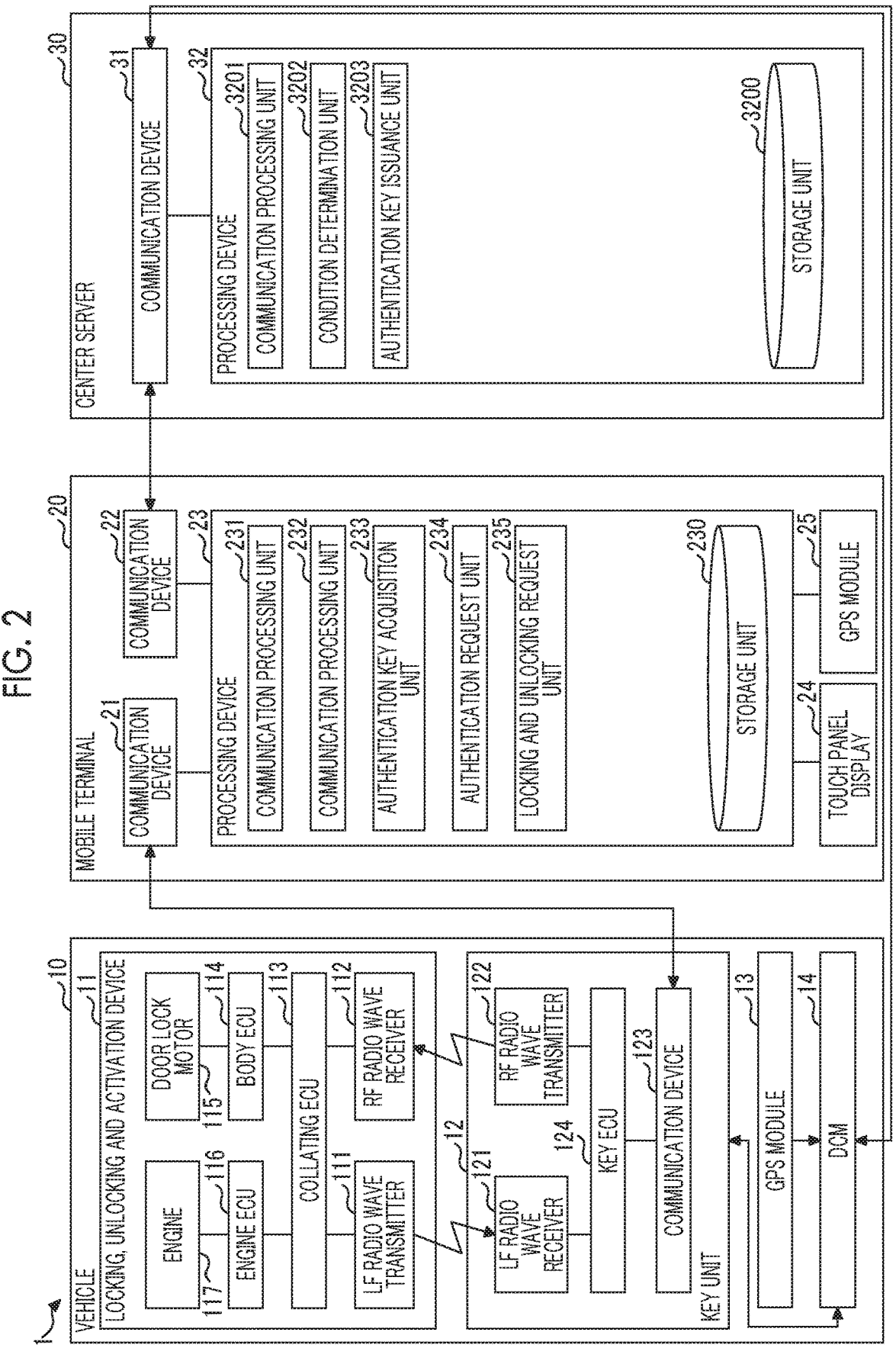
FIG. 2 is a diagram mainly illustrating an example of a configuration regarding locking and unlocking of a vehicle in the authentication key management system.

FIG. 2 is a diagram mainly illustrating an example of the configuration regarding locking, unlocking, and activation of the vehicle 10 in the authentication key management system 1. The vehicle 10 includes a locking, unlocking and activation device 11, a key unit 12, a global positioning system (GPS) module 13, and a data communication module (DCM) 14.

The locking, unlocking and activation device 11 is attached to the vehicle 10 and performs unlocking and locking of the doors of the vehicle 10 according to a locking signal and an unlocking signal to be transmitted as radio waves in a radio frequency (RF) band (for example, 300 MHz to 3 GHz) (hereinafter referred to as "RF radio waves") from the key unit 12. The locking, unlocking and activation device 11 activates the vehicle 10 according to exchange using radio waves in a low frequency (LF) band (for example, 30 Hz to 300 kHz) (hereinafter referred to as "LF radio waves") and RF radio waves with the key unit using a pressing manipulation of an activation switch (not illustrated) provided in the vehicle cabin of the vehicle 10 as a trigger. The locking, unlocking and activation device 11 includes an LF radio wave transmitter 111, an RF radio wave receiver 112, a collating electronic control unit (ECU) 113, a body ECU 114, a door lock motor 115, an engine ECU 116, and an engine 117 as a driving power source of the vehicle 10.

The locking, unlocking and activation device 11 operates with power supplied from an auxiliary battery (not illustrated) mounted on the vehicle 10.

The LF radio wave transmitter 111 is embedded into, for example, a center console or a door handle in the vehicle cabin, and transmits LF radio waves under the control of the collating ECU 113.

The RF radio wave receiver 112 is provided, for example, in a trim of a luggage room of the vehicle 10 and receives RF radio waves under the control of the collating ECU 113.

The collating ECU 113 is an electronic control unit that controls locking and unlocking of the doors of the vehicle 10 and activation of the vehicle 10 based on exchange of signals with the key unit 12. The collating ECU 113 is realized by any hardware, any software, or a combination of any hardware and any software. For example, the collating ECU 113 is configured mainly of a microcomputer includes a central processing unit (CPU), a random access memory (RAM), a read only memory (ROM), an auxiliary storage device, a real time clock (RTC), and a communication interface. The collating ECU 113 realizes various control processes by executing various programs stored in the ROM or the auxiliary storage device on the CPU. Hereinafter, the same applies to the key ECU 124 to be described below.

The collating ECU 113 receives an unlocking signal and a locking signal transmitted as RF radio waves from the key unit 12 using the RF radio wave receiver 112.

When the collating ECU 113 receives the unlocking signal or the locking signal, the collating ECU 113 performs authentication of a transmission source (the key unit 12) of the unlocking signal or the locking signal based on key information included in the unlocking signal or the locking signal (hereinafter referred to as "internal key information"). For example, when the internal key information registered in an internal memory such as an auxiliary storage device in advance matches the internal key information included in the unlocking signal or the locking signal, the collating ECU 113 determines that the authentication is successful, and when the internal key information registered in the internal memory such as the auxiliary storage device in advance does not match the internal key information included in the unlocking signal or the locking signal, the collating ECU 113 determines that the authentication fails.

For example, the collating ECU 113 may transmit LF radio waves including a "challenge" created in a predetermined method using the internal key information of the internal memory from the LF radio wave transmitter 111 to the key unit 12 and perform challenge response authentication based on a "response" replied from the key unit 12, which is received from the RF radio wave receiver 112.

When the authentication is successful, the collating ECU 113 transmits an unlocking command (upon reception of the unlocking signal) or a locking command (upon reception of the locking signal) to the body ECU 114 via an in-vehicle network such as a controller area network (CAN).

As will be described below, in the unlocking signal, solely some of the doors of the vehicle 10 may be designated as unlocked targets. In this case, the collating ECU 113 designates the door as an unlocked target in the unlocking command. Accordingly, the body ECU 114 can operate solely the door lock motor 115 corresponding to some designated doors and unlock solely some doors.

When the above-described activation switch is pressed, the collating ECU 113 performs authentication of the key unit 12 by exchanging signals with the key unit 12 using the LF radio wave transmitter 111 and the RF radio wave receiver 112.

For example, the collating ECU 113 transmits a request signal in an LF band from the LF radio wave transmitter 111 to the key unit 12 to request reply of the internal key information. When a response signal including the internal key information is received from the key unit 12 by the RF radio wave receiver 112, the collating ECU 113 determines authentication success or authentication failure based on matching between the internal key information registered in the internal memory in advance and the internal key information included in the response signal, as in the case of locking and unlocking the doors.

For example, the collating ECU 113 may perform challenge response authentication, as in the case of locking and unlocking of doors.

When the authentication has succeeded, the collating ECU 113 transmits a startup command of the engine 117 to the engine ECU 116 through the in-vehicle network such as the CAN.

The body ECU 114 is an electronic control unit that performs operation control of the door lock motor 115 that is communicably connected via a one-to-one communication line or the like. The body ECU 114 outputs a control command to cause the door lock motor 115 to perform an unlocking operation according to the unlocking command from the collating ECU 113. The body ECU 114 outputs a control command to cause the door lock motor 115 to perform a locking operation according to the locking command from the collating ECU 113.

The door lock motor 115 is a known electric actuator that unlocks and locks the doors of the vehicle 10 according to the control command from the body ECU 114.

The engine ECU 116 is an electronic control unit that drives and controls the engine 117. Specifically, the engine ECU 116 drives and controls various actuators such as a starter or an injector, which are mounted on the engine 117. When the startup command is input from the collating ECU 113, the engine ECU 116 outputs a control command to various actuators such as a starter or an injector of the engine 117 to start up the engine 117.

The key unit 12 is disposed in the vehicle cabin of the vehicle 10 and transmits the unlocking signal and the locking signal as RF radio waves to the locking, unlocking and activation device 11 according to of the unlocking request and the locking request transmitted from the mobile terminal 20. The key unit 12 performs exchange of signals with the locking, unlocking and activation device 11 according to the signal in the LF band transmitted from the locking, unlocking and activation device 11 when the activation switch provided in the vehicle cabin of the vehicle 10 is pressed. The key unit 12 includes an LF radio wave receiver 121, an RF radio wave transmitter 122, a communication device 123, and a key ECU 124.

The key unit 12 may be disposed at a position (for example, a glove box, or the inside of a center console box) at which it is difficult for users seated on respective seats of the vehicle 10 to visually recognize the key unit 12. The key unit 12 may be fixed or may not be fixed to the vehicle 10. The key unit 12 may be operated by a built-in button battery or the like or may be operated by power supplied from an auxiliary battery mounted on the vehicle 10.

The LF radio wave receiver 121 receives the LF radio waves under the control of the key ECU 124.

The RF radio wave transmitter 122 transmits RF radio waves under the control of the key ECU 124.

The communication device 123 is any device that performs near field communication with the mobile terminal 20 under the control of the key ECU 124. The communication device 123 may be, for example, a BLE communication module that performs communication with the mobile terminal 20 in compliance with a Bluetooth (registered trademark) low energy (BLE) communication standard. Hereinafter, description will be given on the premise that a communication standard adopted in the communication device 123 conforms to BLE communication.

The communication device 123 may be a communication device conforming to a short-range communication standard having a very short communicable distance, such as a near field communication (NFC) standard. In this case, the communication device 123 may be built, for example, at a position (for example, the inside of the door handle) close to a body surface of the vehicle 10 outside the vehicle cabin. Accordingly, the key unit 12 (the key ECU 124) can communicate with the mobile terminal 20 outside the vehicle cabin even when the communicable distance of the communication device 123 is very short.

The key ECU 124 is an electronic control unit that performs a control process of transmitting a locking signal and an unlocking signal to the locking, unlocking and activation device 11 according to the unlocking request and the locking request received from the mobile terminal 20.

The key ECU 124 controls the communication device 123 and establishes a state in which communication according to a predetermined communication standard with the mobile terminal 20, such as a BLE communication standard is possible.

Specifically, the key ECU 124 periodically (for example, every several seconds) transmits an advertising packet including advertisement information reachable in a predetermined communication range (for example, several meters to tens of meters) from the communication device 123. The advertisement information includes a universally unique identifier (UUID) corresponding to the key unit 12, a device identifier (ID), and the like. Accordingly, the mobile terminal 20 can identify the key unit 12 mounted on the vehicle 10 that is a target by receiving the advertising packet and confirming the advertisement information.

When a connection request for requesting connection based on the BLE communication is received from the mobile terminal 20 present in a communication range of the vehicle 10 (the key unit 12) that has received the advertising packet, the key ECU 124 establishes a state in which BLE communication between the mobile terminal 20 and the vehicle 10 (the key unit 12) is possible. In this case, the key ECU 124 transmits a connection response indicating that the state in which the BLE communication is possible has been established, to the mobile terminal 20 via the communication device 123.

The key ECU 124 receives an authentication request including an authentication key associated with the key unit 12 from the mobile terminal 20 via the communication device 123 in a state in which the above-described BLE communication is established.

When the authentication request including the authentication key associated with the key unit 12 is received from the mobile terminal 20, the key ECU 124 performs authentication of the mobile terminal 20 based on the authentication key. When the authentication has been successful, the key ECU 124 restores the internal key information stored in an internal memory such as an auxiliary storage device to a usable state. The internal key information is stored in a state that the internal key information cannot be used for authentication in the locking, unlocking and activation device 11, for example, due to a state in which the internal key information is not accessible or a state in which the internal key information has been encrypted. Therefore, when the authentication of the mobile terminal 20 has been successful, the key ECU 124, for example, performs changing of an authority to access the internal memory for changing the key information to an accessible state, or decodes encrypted internal key information based on the authentication key. Accordingly, the key ECU 124 can access the internal key information which is not normally accessible to transmit an unlocking signal or a locking signal including the internal key information to the locking, unlocking and activation device 11 or transmit an unlocking signal or a locking signal including decoded internal key information to the locking, unlocking and activation device 11. Therefore, the locking, unlocking and activation device 11 can perform appropriate authentication based on the internal key information included in the unlocking signal and the locking signal. Even when a situation in which a malicious third party illegally obtains the key unit 12 occurs, the internal key information in the key unit 12, for example, is not accessible or is encrypted, occurrence of theft of the vehicle 10 can be suppressed.

The key ECU 124 receives the unlocking request and the locking request from the mobile terminal 20 via the communication device 123 in a state in which the above-described BLE communication is established. When the authentication of the mobile terminal 20 is successful (specifically, a state in which the BLE communication has been established is kept after the authentication of the mobile terminal 20 has been successful) and the key ECU 124 has received the unlocking request or the locking request from the mobile terminal 20, the key ECU 124 transmits the unlocking signal or the locking signal including locking and unlocking key information to the locking, unlocking and activation device 11 via the RF radio wave transmitter 122.

Accordingly, unlocking or locking of the doors of the vehicle 10 is realized after an authentication process in the locking, unlocking and activation device 11.

As described above, the key ECU 124 performs exchange of signals with the locking, unlocking and activation device 11 according to a signal in the LF band transmitted from the locking, unlocking and activation device 11 when the activation switch provided in the vehicle cabin of the vehicle 10 is pressed.

For example, when the request signal is received from the locking, unlocking and activation device 11 by the LF radio wave receiver 121, the key ECU 124 transmits a response signal including the internal key information stored in the internal memory or the like to the locking, unlocking and activation device 11 via the RF radio wave transmitter 122.

For example, when the LF radio waves including the "challenge" are received from the locking, unlocking and activation device 11 by the LF radio wave receiver 121, the key ECU 124 generates a "response" based on the internal key information and transmits the response to the locking, unlocking and activation device 11 via the RF radio wave transmitter 122.

Accordingly, after the authentication process in the locking, unlocking and activation device 11, the startup of the engine 117 is realized.

An authority regarding a function of locking, unlocking, or activating the vehicle 10 imparted by the center server 30 may be defined in the authentication key.

For example, when the authentication key has solely the authority to unlock some of the doors of the vehicle 10, the key ECU 124 transmits an unlocking signal including information for designating the door to be unlocked to the key unit 12 via the RF radio wave transmitter 122. Accordingly, solely some of the doors of the vehicle 10 can be unlocked as described above.

For example, when the authentication key does not have the authority to activate the engine 117, the key ECU 124 may not perform exchange with the locking, unlocking and activation device 11 even when the signal in the LF band from the locking, unlocking and activation device 11 based on a pressing manipulation of the activation switch is received by the LF radio wave receiver 121. Accordingly, it is possible to prohibit the activation of the engine 117 according to the authority of the authentication key.

The GPS module 13 receives GPS signals transmitted from three or more satellites and, desirably, four or more satellites over the vehicle 10, and measures a position of the vehicle 10. The GPS module 13 is communicably connected to the DCM 14 or the like via a one-to-one communication line or an in-vehicle network such as a CAN, and the measured position information of the vehicle 10 is input to the DCM 14 or the like.

The DCM 14 is a communication device that bidirectionally communicates with the center server 30 over a predetermined communication network. The DCM 14 transmits current position information of the vehicle 10 input from the GPS module 13 to the center server 30 at a predefined timing or according to a request from the center server 30, or the like. The DCM 14 transmits, to the center server 30, various types of vehicle information (for example, information indicating that unlocking of the door of the vehicle 10 or activation of the vehicle 10 is performed based on the authentication key, which is acquired from the key unit, or information on a setting of the destination or the like, which is acquired from a navigation device) that can be acquired over an in-vehicle network such as a CAN at a predefined timing or according to a request from the center server 30 or the like.

The mobile terminal 20 includes a communication device 21, a communication device 22, a processing device 23, a touch panel display (hereinafter simply referred to as a "display") 24, and a GPS module 25.

The communication device 21 is any device that performs near field communication with the mobile terminal 20 according to the same communication standard as that of the communication device 123. As described above, in the case of the embodiment, the communication device 21 is, for example, a BLE communication module.

The communication device 22 is any device that communicates with the center server 30, the service management server 40, or the like over a predetermined communication network. The communication device 22 is a mobile communication module corresponding to a communication standard such as Long Term Evolution (LTE), 4th Generation (4G), or 5th Generation (5G).

The processing device 23 performs various control processes in the mobile terminal 20. The functions of the processing device 23 may be realized by any hardware, any software, or a combination of any hardware and any software, and includes for example, a CPU, a RAM, a ROM, an auxiliary storage device, an RTC, and various interfaces for communication. The processing device 23 includes, for example, a communication processing unit 231, a communication processing unit 232, an authentication key acquisition unit 233, an authentication request unit 234, and a locking and unlocking request unit 235 as functional units that are realized by executing one or more programs stored in the ROM or the auxiliary storage device on the CPU. The processing device 23 includes, for example, a storage unit 230 that is realized as a storage area in the auxiliary storage device, and a process of storing various pieces of data in the storage unit 230 is realized by a predetermined program stored in the ROM or the auxiliary storage device.

The communication processing unit 231 performs bidirectional near field communication with the key unit 12 using the communication device 21 and performs transmission and reception of various signals.

The communication processing unit 232 connects to the predetermined communication network using the communication device 22 and transmits and receives various signals such as a data signal or a control signal to and from the center server 30, the service management server 40, and the like.

The authentication key acquisition unit 233 acquires the authentication key from the center server 30, for example, according to a predetermined manipulation of the user with respect to a predetermined graphical user interface (GUI) displayed on the display 24, and stores the acquired authentication key in the storage unit 230. Hereinafter, the description will be given on the premise that various manipulations with respect to the mobile terminal 20 are performed by a manipulation with respect to the GUI displayed on the display 24 in conjunction with the operation of the key application.

For example, the authentication key acquisition unit 233 of the mobile terminal 20Aa transmits an authentication key acquisition request to the center server 30 via the communication processing unit 232. Accordingly, the center server 30 receives the authentication key acquisition request, and issues the authentication key when the center server 30 determines that the authentication key acquisition request is a regular authentication key acquisition request. The authentication key acquisition unit 233 acquires the authentication key distributed from the center server 30 via the communication processing unit 232.

For example, the authentication key acquisition unit 233 of the mobile terminal 20Ab acquires the authentication key distributed from the center server 30 to the mobile terminal 20Ab via the communication processing unit 232 according to a key sharing request (to be described below) transmitted from the mobile terminal 20Aa to the center server 30.

The authentication key acquisition unit 233 of the mobile terminal 20Ab may transmit the authentication key acquisition request by itself to the center server 30 via the communication processing unit 232. In this case, when the center server 30 receives the authentication key acquisition request from the mobile terminal 20Ab, the center server 30 may perform an inquiry about whether or not to permit distribution of the authentication key to the mobile terminal 20Aa of the owner user.

For example, the authentication key acquisition unit 233 of each of the mobile terminals 20Ac, 20Ad, 20B transmits an authentication key acquisition request to the delivery management server 50, the C2C car sharing management server 70, and the B2C car sharing management server 80 to request acquisition of the authentication key. Accordingly, the delivery management server 50, the C2C car sharing management server 70, and the B2C car sharing management server 80 transmit an authentication key arrangement request to the center server 30 according to reception of the authentication key acquisition request, and the center server 30 issues the authentication key according to reception of the authentication key arrangement request. The authentication key acquisition unit 233 acquires an authentication key that is distributed from the center server 30 via the communication processing unit 232.

The authentication key acquisition unit 233 of the mobile terminals 20Ac, 20Ad, 20B may transmit the authentication key acquisition request to the center server 30 via the communication processing unit 232. In this case, the center server 30 may perform an inquiry of the delivery management server 50, the C2C car sharing management server 70, and the B2C car sharing management server 80 to determine whether or not the authentication key acquisition request is a regular authentication key acquisition request.

The authentication request unit 234 transmits an authentication request to the key unit 12 of the vehicle 10 via the communication processing unit 231 to request authentication of the mobile terminal 20 serving as a remote manipulation unit for locking and unlocking the doors of the vehicle 10. For example, when the authentication request unit 234 finds a key unit corresponding to the authentication key, and specifically, when an advertising packet corresponding to the key unit 12 is received by the communication processing unit 231, the authentication request unit 234 may transmit the authentication request to the key unit 12. For example, the authentication request unit 234 may transmit the authentication request to the key unit 12 according to a predetermined manipulation by the user.

The locking and unlocking request unit 235 transmits an unlocking request including an authentication key or a locking request including the authentication key to the key unit 12 via the communication processing unit 231 according to the predetermined manipulation by the user. Accordingly, even when the unlocking request or the locking request has been transmitted to the key unit 12 before the authentication request is transmitted by the authentication request unit 234, locking and unlocking of the door of the vehicle 10 based on the authentication process in the key unit 12 can be realized. For example, an unlocking button for requesting unlocking of the vehicle 10 and a locking button for requesting locking of the vehicle 10 may be drawn in a GUI serving as a manipulation screen of the display 24, a locking request may be transmitted when the locking button is touched, and an unlocking request may be transmitted when the unlocking button is touched. The locking request and the unlocking request may be transmitted by a manipulation with respect to a predetermined manipulation unit by hardware provided in the mobile terminal 20.

For example, the functions of the authentication key acquisition unit 233, the authentication request unit 234, and the locking and unlocking request unit 235 may be available to the user by a predetermined application program installed in the ROM of the processing device 23, the auxiliary storage device, or the like being activated. Hereinafter, the description will be given on the premise that the functions of the authentication key acquisition unit 233, the authentication request unit 234, and the locking and unlocking request unit 235 of the processing device 23 are available to the user by the key application already installed in the processing device 23 (the auxiliary storage device or the ROM) being activated.

The display 24 is, for example, a liquid crystal display or an organic electroluminescence (EL) display, and is a display device which is provided on a front surface of the mobile terminal 20 and also serving as a known touch panel type manipulation unit.

The GPS module 25 receives GPS signals transmitted from three or more satellites and, preferably, four or more satellites above the mobile terminal 20, and measures the position of the mobile terminal 20. The position measurement information (position information of the mobile terminal 20) of the GPS module 25 is input to the processing device 32.

The mobile terminal 20 may measure the position of the mobile terminal 20 through base station position measurement based on wireless communication with a plurality of base stations.

The center server 30 includes a communication device 31 and a processing device 32.

The functions of the center server 30 may be shared and realized by a plurality of servers. Hereinafter, the same applies to the delivery management server 50, the EC server 60, the C2C car sharing management server 70, and the B2C car sharing management server 80.

The communication device 31 is any device that performs bidirectional communication with each of the vehicle 10, the mobile terminal 20, and the service management server 40 over a predetermined communication network.

The processing device 32 performs various control processes in the center server 30. The functions of the processing device 32 may be realized by any hardware, any software, or a combination of any hardware and any software, and the processing device 32 is mainly configured of one or a plurality of server computers including, for example, a CPU, a RAM, a ROM, an auxiliary storage device, an RTC, and a predetermined communication interface. Hereinafter, the same applies to processing devices 52, 62, 72, 82 to be described below of the delivery management server 50, the EC server 60, the C2C car sharing management server 70, and the B2C car sharing management server 80. The processing device 32 includes, for example, a communication processing unit 3201, a condition determination unit 3202, and an authentication key issuance unit 3203 as functional units that are realized by executing one or more programs stored in the ROM or the auxiliary storage device on the CPU. The processing device 32 includes, for example, a storage unit 3200 that is realized as a storage area defined in an auxiliary storage device of a server computer or an external storage device connected to the server computer, and a process in which various pieces of data are stored in the storage unit 3200 is realized by a program stored in the ROM or the auxiliary storage device. Hereinafter, the same applies to the storage units 520, 620, 720, 820 to be described below.

The communication processing unit 3201 controls the communication device 31 to perform exchange of various signals such as control signals and information signals with the vehicle 10, the mobile terminal 20, and the service management server 40.

The condition determination unit 3202 determines whether or not the authentication key acquisition request or the authentication key arrangement request is a regular authentication key acquisition request or a regular authentication key arrangement request according to reception of an authentication key acquisition request from the mobile terminal 20 or an authentication key arrangement request from the service management server 40 received by the communication processing unit 3201.

When the condition determination unit 3202 determines that the authentication key acquisition request or the authentication key arrangement request is the regular one, the authentication key issuance unit 3203 specifies a specification of the authentication key to be issued and issues an authentication key corresponding to the specified specification. For example, the authentication key issuance unit 3203 specifies the vehicle 10 that is a target of locking and unlocking using the authentication key or the key unit 12 corresponding to the vehicle 10. For example, the authentication key issuance unit 3203 specifies the authority of the authentication key regarding a period of time in which the authentication key is valid (available) and the number of times the authentication key is available. For example, the authentication key issuance unit 3203 specifies the authority of the authentication key regarding the unlocking or activation of the vehicle 10, such as lockable and unlockable doors and whether or not the vehicle 10 can be activated. For example, the authentication key issuance unit 3203 specifies the authority of the authentication key regarding the temporary key sharing, such as whether or not the authentication key can be shared with another mobile terminal 20 through a temporary key sharing to be described below, a period of time in which the authentication key can be shared with the other mobile terminal 20, and the number of times the authentication key can be shared with the other mobile terminal 20. Hereinafter, the authority of the authentication key regarding the period of time in which the authentication key is available, the number of times the authentication key is available, and the like, the authority of the authentication key regarding the unlocking or activation of the vehicle 10, and the authority of the authentication key regarding the temporary key sharing are collectively simply referred to as "various authorities of the authentication key". The authentication key issuance unit 3203 distributes the authentication key issued to the mobile terminal 20 that is a target via the communication processing unit 3201.

Details of Configuration Regarding Key Sharing Service

A configuration regarding the key sharing service in the authentication key management system 1 will be described with reference to FIG. 3.

Figure 3:
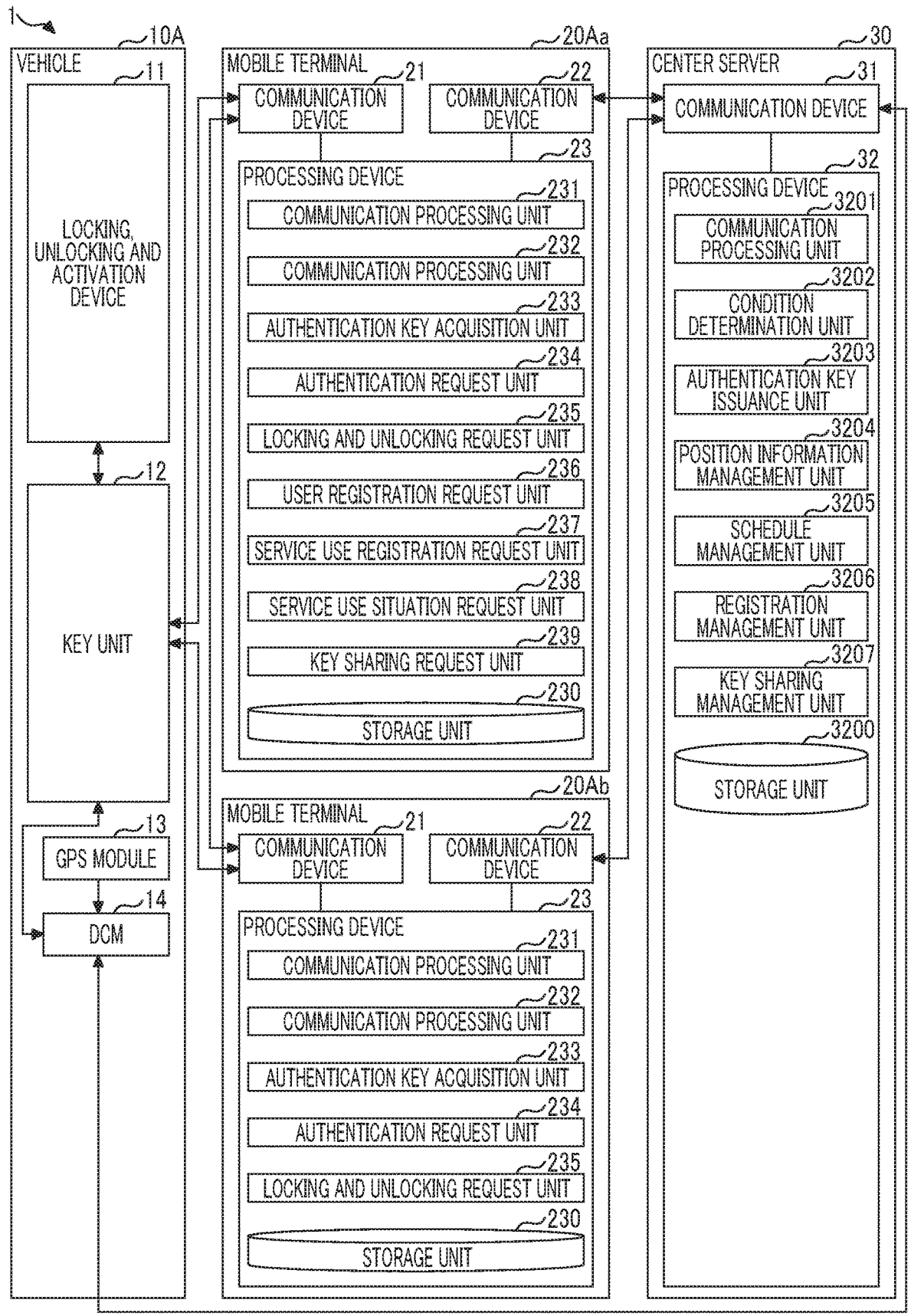
FIG. 3 is a diagram mainly illustrating an example of a configuration regarding a key sharing service in the authentication key management system.

FIG. 3 is a diagram mainly illustrating an example of a configuration regarding the key sharing service in the authentication key management system 1. Hereinafter, a configuration regarding the key sharing service in the authentication key management system 1 will be mainly described with reference to FIG. 3, and duplicate description on the configuration overlapping the configuration regarding locking, unlocking, and activation of the vehicle 10 described above will be omitted as much as possible. Hereinafter, the same applies to description of FIGS. 4 to 6.

The processing device 23 of the mobile terminal 20Aa carried by the owner user of the vehicle 10A includes the communication processing unit 231, the communication processing unit 232, the authentication key acquisition unit 233, the authentication request unit 234, and the locking and unlocking request unit 235, as described above. The processing device 23 of the mobile terminal 20Aa further includes a user registration request unit 236, a service use registration request unit 237, a service use situation request unit 238, and a key sharing request unit 239 as functional units that are realized by executing one or more programs stored in the ROM or the auxiliary storage device on the CPU.

In the embodiment, the description will be given on the premise that the functions of the user registration request unit 236, the service use registration request unit 237, the service use situation request unit 238, and the key sharing request unit 239 of the mobile terminal 20Aa are available to the owner user by the key application being activated and the user authentication based on bidirectional communication with the center server 30 being successful. The description will be given on the premise that the user authentication is performed by the center server 30 based on an ID defined for the owner user (hereinafter referred to as an "owner user ID") in advance and a password corresponding to the owner user ID.

The user registration request unit 236 requests the center server 30 to register the regular user of the vehicle 10A that uses various services (the key sharing service, the trunk delivery service, the C2C car sharing service, and the like) for using the vehicle 10A, according to a predetermined manipulation by the owner user. For example, the user registration request unit 236 transmits a user registration request including an owner user ID and a password and attribute information (for example, a name, age, and relationship with the owner user) for specifying a sub-user who is a registration target to the center server 30 via the communication processing unit 232.

When a notification indicating that registration of the sub-user has been completed (user registration completion notification) is received from the center server 30 by the communication processing unit 232, the user registration request unit 236 stores an ID (hereinafter referred to as a "sub-user ID") and a password of the sub-user included in the user registration completion notification in the storage unit 230. In this case, the user registration request unit 236 may transmit the sub-user ID and the password to the mobile terminal 20Ab carried by the registered sub-user via the communication processing unit 231 according to a predetermined manipulation by the owner user.

The service use registration request unit 237 requests the center server 30 to perform registration of use of various services for using the vehicle 10A by the regular user of the vehicle 10A according to a predetermined manipulation by the owner user. That is, the service use registration request unit 237 requests registration of the authentication key arrangement authority of the key sharing management unit 3207 or the service management server 40 corresponding to various services for allowing regular users of the vehicle 10A to use various services, as described above. For example, the service use registration request unit 237 transmits a service use registration request including the owner user ID and the password, the information for specifying the vehicle 10A to be used for various services, the information for specifying the service that is a target, and the ID of the regular user who uses the target service (the owner user ID or the sub-user ID) to the center server 30 via the communication processing unit 232. Hereinafter, the owner user ID and the sub-user ID may be collectively referred to as a "regular user ID". Accordingly, the service use registration request unit 237 can register a sub-user who uses the key sharing service in the center server 30.

The service use registration request unit 237 receives a notification that the use registration of the service based on the service use registration request has been completed from at least one of the center server 30 and the service management server 40 through the communication processing unit 232. The service use registration request unit 237 causes the display 24 to display an indication that the use registration of the specific service by the regular user of the vehicle 10A based on the predetermined manipulation by the owner user has been completed. Accordingly, the owner user can ascertain that the use registration of the specific service by the regular user has been completed.

The service use situation request unit 238 requests the center server 30 to provide information on the use situation of various services (service use situation information) including the key sharing service by the regular user of the vehicle 10A for which the use registration has been completed in a form corresponding to the owner user ID according to a predetermined manipulation by the owner user. For example, the service use situation request unit 238 transmits a service use situation request including the owner user ID and the password to the center server 30 via the communication processing unit 232. When the service use situation information received from the center server 30 by the communication processing unit 232 is received, the service use situation request unit 238 displays the service use situation information on the display 24. Accordingly, the owner user can centrally ascertain the information on the use situation of each service by each of the regular users registered for use in the center server 30 in an aspect in which the information is linked to the owner user ID.

The key sharing request unit 239 requests the center server 30 to distribute the authentication key for performing locking, unlocking or activating of the vehicle 10A to the sub-user registered for use in the key sharing service according to a predetermined manipulation by the owner user. For example, the key sharing request unit 239 transmits a key sharing request including an owner user ID and a password, information for specifying the vehicle 10A that is a locking and unlocking target by the authentication key, and information (for example, a sub-user ID) for specifying the sub-user that is a distribution (share) target of the authentication key to the center server 30 via the communication processing unit 232. When the key sharing request unit 239 transmits the key sharing request, use period information (for example, a date and time of use start and a date and time of use end) regarding a period of time in which the authentication key set and distributed by a predetermined manipulation by the owner user is available may be included in the key sharing request. The key sharing request may include authority information on various authorities of the authentication key, such as an authority of the authentication key regarding a period of time in which the authentication key is available or the number of times the authentication key is available, an authority of the authentication key regarding the unlocking or activation of the vehicle, and an authority of the authentication key regarding temporary key sharing to be described below, which can be designated according to the predetermined manipulation by the owner user. Accordingly, as described below, when the authentication key available at the same time is shared among the mobile terminals 20, the owner user can appropriately set authority information such that use of the vehicle 10A by a user other than the owner user can be limited. Therefore, security of the vehicle 10A can be improved.

The key sharing request unit 239 may set the mobile terminals 20 (that is, at least one of the mobile terminals 20Aa, 20Ab) of a plurality of regular users of the vehicle 10A as distribution targets and request the center server 30 to distribute the authentication key of which the periods of time in which the authentication key is available overlap according to the predetermined manipulation by the owner user. That is, in the key sharing request, the regular users that are authentication key distribution targets may be designated, or the owner users may be included among the regular users. In the key sharing request, the period of time in which the authentication key is available for each of the designated regular users may overlap. Accordingly, the authentication key of the vehicle 10A available at the same time can be shared by the regular users. Therefore, for example, when a plurality of persons gets on the vehicle 10A together and go out for travel, camp, or the like, each of passengers can lock and unlock the vehicle 10A without lending and borrowing the mobile terminal 20 in which the authentication key has been stored, and therefore, convenience for users can be improved.

Even when the key sharing request unit 239 may share the distributed authentication key with another mobile terminal 20 (that is, the mobile terminal 20 in which the key application is installed) according to a predetermined manipulation by the owner user (hereinafter, a sharing aspect of the authentication key will be referred to as "temporary key sharing"). In the above-described case, the other mobile terminal 20 may be the mobile terminal 20Ab of the sub-user or may be the mobile terminal 20 of a user other than the sub-user, that is, a user temporarily using the vehicle 10A.

For example, the key sharing request unit 239 transmits the authentication key (more specifically, a copy of the authentication key) to another mobile terminal 20 via the communication processing unit 231. Accordingly, the owner user of the vehicle 10A can share the authentication key with the other user even when a plurality of persons suddenly get on the vehicle 10A together and go out for traveling or the like. It is possible to share the authentication key available at the same time with the other mobile terminal 20 directly from the mobile terminal 20Aa. Accordingly, for example, even when the mobile terminal 20Aa is at a place at which a communication situation in a wireless mobile communication network is poor or out of a communication range, the owner user of the vehicle 10A can share the authentication key with the other user.

In the above-described case, the key sharing request unit 239 may transmit the authentication key of which the authority regarding the period of time in which the authentication key is available or the number of times the authentication key is available or the authority regarding the unlocking or activation of the vehicle 10A, which is set based on the predetermined manipulation by the owner user or which is defined in advance, has been restricted, to the other mobile terminal 20 via the communication processing unit 231. Specifically, for example, an authentication key with an authority to limit the period of time in which the authentication key is available or the number of times the authentication key is available to, for example, 30 minutes or once, or an authentication key with an authority, for example, solely to lock and unlock doors for getting on and off the vehicle 10A or prohibit activation of the vehicle 10A may be transmitted to another mobile terminal 20. Hereinafter, the same applies to the case of temporary key sharing that is performed via the center server 30. Accordingly, security of the vehicle 10A due to the temporary key sharing can be improved.

When the temporary key sharing is performed, the key sharing request unit 239 may cause the authentication key to be distributed from the center server 30 to the other mobile terminal 20, as in the case of a normal key sharing. In the above-described case, the key sharing request unit 239 may transmit a temporary key sharing request including information (for example, an issued ID embedded in the authentication key) for specifying the distributed authentication key and information for designating the other mobile terminal 20 that is a distribution target to the center server 30 via the communication processing unit 232, to cause the authentication key of the vehicle 10A to be distributed from the center server 30 to the other mobile terminal 20.

For example, when the other mobile terminal 20 is the mobile terminal 20Ab of the sub-user, the key sharing request unit 239 may transmit a temporary key sharing request including the sub-user ID to the center server 30 via the communication processing unit 232.

For example, the key sharing request unit 239 acquires predetermined identification information (for example, a quick response (QR) code (registered trademark) corresponding to the user of another mobile terminal 20 registered as a user installing the key application in the center server 30) from the other mobile terminal 20 via the communication processing unit 231. The key sharing request unit 239 may transmit a temporary key sharing request for designating another mobile terminal 20 specified based on the identification information as a distribution target, to the center server 30.

The mobile terminal 20Aa may acquire the identification information using another method. For example, the mobile terminal 20Aa may acquire identification information corresponding to the user of the other mobile terminal 20 in an aspect in which the identification information displayed on the display 24 of the other mobile terminal 20 is recognized using a mounted camera function. For example, the mobile terminal 20Aa may acquire the identification information transmitted from the user of the other mobile terminal 20 to a mail address or an account of an SNS of the owner user.

For example, according to a predetermined manipulation by the owner user, the key sharing request unit 239 transmits a candidate terminal information request for requesting a candidate terminal information on a candidate terminal that is a candidate for the other mobile terminal 20 present around a current position of the mobile terminal 20Aa to the center server 30 via the communication processing unit 232. When the candidate terminal information is received from the center server 30 by the communication processing unit 232, the key sharing request unit 239 causes the display 24 to display the candidate terminal information. When the candidate terminal information is displayed on the display 24, information for specifying a candidate terminal in which a specific manipulation or operation is performed among candidate terminals may be included in the candidate terminal information replied from the center server 30. Accordingly, the owner user of the vehicle 10A can specify another mobile terminal 20 from among the candidate terminals displayed on the display 24 of the mobile terminal 20Aa by the user of the other mobile terminal 20 as a key sharing target performing a specific manipulation or operation with respect to the mobile terminal 20. The key sharing request unit 239 may transmit a temporary key sharing request for designating the other mobile terminal 20 specified from among the candidate terminals as a distribution target to the center server 30, according to a predetermined manipulation by the owner user.

The key sharing request unit 239 may activate the key application according to a predetermined manipulation by the owner user to transmit link information according to a uniform resource locator (URL) scheme for allowing the other mobile terminal 20 to acquire the authentication key from the center server 30 (hereinafter, simply referred to as "link information") to a mail address or an account of an SNS of the user of the other mobile terminal 20 via the communication processing unit 232. In the above-described case, the key sharing request unit 239 transmits a temporary key sharing request for designating the acquired authentication key to the center server 30 via the communication processing unit 232 according to a predetermined manipulation by the owner user, and acquires the link information replied from the center server 30 according to the temporary key sharing request. Accordingly, the key sharing request unit 239 can cause the authentication key to be distributed from the center server 30 to the other mobile terminal 20.

The temporary key sharing may be executed from the mobile terminal 20Ab of the sub-user to which the authentication key has already been distributed. That is, a function regarding the temporary key sharing in the key sharing request unit 239 may be included in a function of the key application that is installed in the processing device 23 of the mobile terminal 20Ab of the sub-user. Accordingly, it is not needed to lend and borrow the mobile terminal 20Ab of the sub-user who has acquired the authentication key even when a plurality of persons including no owner user get on the vehicle 10A together, and convenience for the sub-user of the vehicle 10A can be further improved. Hereinafter, description will be given on the premise that the temporary key sharing can be performed from the mobile terminal 20Ab of the sub-user.

The processing device 32 of the center server 30 includes the communication processing unit 3201, the condition determination unit 3202, the authentication key issuance unit 3203, and the storage unit 3200, as described above. The processing device 32 of the center server 30 includes, for example, a position information management unit 3204, a schedule management unit 3205, a registration management unit 3206, and a key sharing management unit 3207 as functional units realized by executing one or more programs stored in an auxiliary storage device or the like of a server computer on a CPU.

When the authentication key acquisition request has been received from the mobile terminals 20Aa, 20Ab by the communication processing unit 3201, the condition determination unit 3202 performs authentication based on the regular user ID and the password included in the authentication key acquisition request. For example, the condition determination unit 3202 collates the regular user ID and password registered in the storage unit 3200 with the regular user ID and password included in the authentication key acquisition request, and determines that the authentication is successful, that is, the authentication key acquisition request is a regular authentication key acquisition request when both match.

The condition determination unit 3202 determines whether or not the authentication key arrangement request sent from the key sharing management unit 3207 to be described below is a regular authentication key arrangement request. For example, when the authentication is successful based on authentication information (for example, the ID and the password) included in the authentication key arrangement request from the key sharing management unit 3207, the condition determination unit 3202 may determine that the authentication key arrangement request is a regular authentication key arrangement request.

When the condition determination unit 3202 determines that the authentication key acquisition request or the authentication key arrangement request is a regular authentication key acquisition request or a regular authentication key arrangement request, the authentication key issuance unit 3203 issues the authentication key and distributes the authentication key to the mobile terminal 20 via the communication processing unit 3201.

The position information management unit 3204 manages the position information of the vehicles 10 (10A, 10B). Specifically, the position information management unit 3204 transmits a position information request to the vehicle 10 via the communication processing unit 3201. In response to the position information request, the DCM 14 of the vehicle 10 replies the center server 30 with the position information of the vehicle 10 input from the GPS module 13, and the position information management unit 3204 can acquire the position information of the vehicle 10.

The position information management unit 3204 acquires the position information from the vehicle 10A via the communication processing unit 3201 and monitors the position information of the vehicle 10A in real time to ascertain a movement situation of the vehicle 10A. Accordingly, for example, the position information management unit 3204 can notify the owner user of the position information of the vehicle 10A lent to the sub-user via the communication processing unit 3201. For example, the position information management unit 3204 can notify the mobile terminal 20Ab of the sub-user of information such as whether or not the vehicle 10A scheduled to be lent to the sub-user is directed to a designated position (for example, a house) or a reference for returning, via the communication processing unit 3201.

The schedule management unit 3205 manages the use situation of the vehicle 10A regarding various services. For example, the schedule management unit 3205 periodically acquires a use schedule of the vehicle 10 by the key sharing service and, specifically, information on a date and time on which the authentication key distributed by the key sharing service is available, from the key sharing management unit 3207. The schedule management unit 3205 acquires the use schedule of the vehicle 10A by each of the trunk delivery service and the C2C car sharing service from the delivery management server 50 and the C2C car sharing management server 70 via the communication processing unit 3201. The schedule management unit 3205 generates information on the use schedule of the vehicle 10A (vehicle use schedule information) over a plurality of services based on the acquired use schedule of the vehicle 10A regarding the various services, and updates the vehicle use schedule information stored in the storage unit 3200.

The registration management unit 3206 performs registration of the regular user (the sub-user) who uses various services according to the user registration request received from the mobile terminal 20Aa of the owner user by the communication processing unit 3201. For example, the registration management unit 3206 collates the owner user ID and password included in the user registration request from the mobile terminal 20Aa with the owner user ID and password stored in the storage unit 3200, and determines that the user registration request is a regular user registration request when both match. That is, the registration management unit 3206 determines that the authentication is successful. The registration management unit 3206 registers the sub-user ID included in the regular user registration request in a user service registration information database (DB) in the storage unit 3200 as the regular user who can use various services.

The registration management unit 3206 performs registration of use of various services by the regular user of the vehicle 10A according to the service use registration request received from the mobile terminal 20Aa of the owner user by the communication processing unit 3201. That is, according to the service use registration request, the registration management unit 3206 performs registration of an authentication key arrangement authority of the key sharing management unit 3207 or the service management server 40 corresponding to various services to allow the user of the vehicle 10A to use various services. For example, the registration management unit 3206 performs the same authentication process as described above based on the owner user ID and the password included in the service use registration request from the mobile terminal 20Aa to determine whether the service use registration request is a regular service use registration request. When the service use registration request is a regular service use registration request, the registration management unit 3206 determines whether or not the regular user ID included in the service use registration request has already been registered in the user service registration information DB. When the regular user ID included in the service use registration request has already been registered in the user service registration information DB, the registration management unit 3206 registers the service of a target specified by the service use registration request in the user service registration information database (DB) in the storage unit 3200 as a service available to the regular user corresponding to the regular user ID.

Specifically, the registration management unit 3206 constructs a user service registration information DB in an aspect in which service-specific information for specifying a target service, vehicle-specific information for specifying the vehicle 10A, a regular user ID for specifying a regular user who uses the service, and service link information in which the vehicle-specific information corresponding to the vehicle 10A and the regular user ID are associated with the target service is linked to the owner user ID.

The service-specific information is, for example, a service ID that is defined for each service. Specifically, for example, when there is a plurality of companies providing the C2C car sharing service, a unique service ID is defined for each of the companies. For example, when the same company provides a plurality of C2C car sharing services, a unique ID is defined for each of the services provided by the same company. When a trunk delivery service is provided by a combination of a plurality of delivery companies and a plurality of EC companies, a unique service ID may be defined for each combination of the delivery company and the EC company, and the target service may be specified by a combination of the unique service ID defined for each of the delivery companies and a unique service ID defined for each of the EC companies.

The vehicle-specific information may be any information as long as the information is able to specify the vehicle 10A that is a target of locking, unlocking, or activation using the authentication key. For example, the vehicle-specific information may be identification information such as a vehicle ID or a vehicle identification number (VIN), which is defined for each vehicle 10A. For example, the vehicle-specific information may be identification information such as a key unit ID, which is defined for each in-vehicle device related to locking, unlocking, or activation of the doors based on the authentication key mounted on the vehicle 10A such as the key unit 12. Hereinafter, description will be given on the premise that the vehicle-specific information is the key unit ID.

The service link information is information needed for the key sharing management unit 3207, the delivery management server 50, the EC server 60, and the C2C car sharing management server 70 managing various services to transmit the authentication key arrangement request to thereby cause the authentication key issuance unit 3203 to issue the authentication key of the vehicle 10A that is a target and distribute the authentication key to the mobile terminal 20 that is a target. That is, the authentication key issuance unit 3203 can specify the vehicle 10A that is a target of locking, unlocking, or activation using the authentication key and issue an appropriate authentication key by receiving the authentication key arrangement request including the service link information from the key sharing management unit 3207, the delivery management server 50, the EC server 60, and the C2C car sharing management server 70.

The service link information may be any information as long as the target service is associated with the vehicle 10A and the user who uses the service in the center server 30. For example, the service link information may be a login ID of the regular user at a website for users of various services corresponding to the key sharing management unit 3207, the delivery management server 50, the EC server 60, and the C2C car sharing management server 70 (hereinafter referred to as a "service login ID" for convenience). In this case, the service use registration request unit 237 of the mobile terminal 20Aa transmits the service use registration request including the service login ID of the regular user that is a registration target corresponding to the various services to the center server 30 via the communication processing unit 232. When the regular user that is a registration target corresponding to various services does not acquire the service login ID, the processing device 23 of the mobile terminal 20Aa may activate a predetermined browser and acquire the service login ID of a website of various services. Accordingly, when the user (the regular user of the vehicle 10A) logs in to the website at the time of requesting a service that is a target, the delivery management server 50 or the C2C car sharing management server 70 can ascertain the service login ID corresponding to the service link information and easily arrange the authentication key regarding the service provision. Hereinafter, description will be given on the premise that the service link information on the trunk delivery service and the C2C car sharing service is the service login ID.

In the case of regular users who regularly use a plurality of vehicles 10A, the center server 30 can specify the regular user solely by using the service login ID, but cannot specify the vehicle 10A. Therefore, information for indirectly specifying the vehicle 10A (for example, information obtained by encrypting the vehicle-specific information using a predetermined scheme) in addition to the service login ID may be included in the service link information.

When the registration of use of various services has been completed, registration management unit 3206 notifies the mobile terminals 20Aa, 20Ab corresponding to the regular users that are registration targets that the registration of use of various services has been completed, via the communication processing unit 3201. When the registration of use of various services has been completed, the registration management unit 3206 transmits a service use registration completion notification including the service link information to the key sharing management unit 3207 or the service management server 40 that performs an operation and management of a service that is a registration target.

A notification that the registration of use of various services for the mobile terminals 20Aa, 20Ab has been completed may be transmitted from the service management server 40 that has received the service use registration completion notification.

When the service use situation request has been received from the mobile terminal 20Aa by the communication processing unit 3201, the registration management unit 3206 generates the service use situation information based on, for example, the vehicle use schedule information managed by the user service registration information DB of the storage unit 320 or the schedule management unit 3205, and distributes the service use situation information to the mobile terminal 20Aa via the communication processing unit 3201.

The key sharing management unit 3207 performs an operation and management of the key sharing service.

For example, according to the key sharing request received from the mobile terminal 20Aa of the owner user by the communication processing unit 3201, the key sharing management unit 3207 performs the arrangement of the authentication key to the mobile terminals 20Aa, 20Ab corresponding to the regular user ID designated by the key sharing request. Specifically, the key sharing management unit 3207 collates the owner user ID and the password included in the key sharing request with the owner user ID and the password stored in the storage unit 3200, and determines that the key sharing request is a regular key sharing request when both match. The key sharing management unit 3207 inquires of the schedule management unit 3205 and determines whether or not there is mismatch, that is, overlapping of the use date and time regarding the use of the services and the vehicle 10A of the regular users between the use period information included in the key sharing request and the latest vehicle use schedule information. When there is no overlapping of the use time, the key sharing management unit 3207 sends, to the authentication key issuance unit 3203, the authentication key arrangement request including information on the regular users corresponding to the mobile terminals 20Aa, 20Ab that are distribution targets of the authentication key specified by the information included in the key sharing request, and the vehicle 10A that is a target of locking, unlocking, or activation using the authentication key, and authority information such as a period of time in which the authentication key is available to the respective mobile terminals 20Aa, 20Ab, the number of times the authentication key is available to the respective mobile terminals 20Aa, 20Ab, unlockable doors, and whether or not the vehicle can be activated. Accordingly, the authentication key issuance unit 3203 can specify the regular user IDs corresponding to the mobile terminals 20Aa, 20Ab that are distribution targets of the authentication key, and the vehicle 10A that is a target of locking, unlocking, or activation using the authentication key, and issue an appropriate authentication key.

For example, the key sharing management unit 3207 confirms, for example, attribute information (for example, an age or presence or absence of a driving license) of the users of the mobile terminals 20Aa, 20Ab that are distribution targets of the authentication key that is designated by the key sharing request, which is stored in the storage unit 3200. When the users of the mobile terminal 20Aa, 20Ab (regular users of the vehicle 10A) that are distribution targets of the authentication key are users determined to be unable to drive the vehicle 10A, the key sharing management unit 3207 allows an authentication key to which an authority to be unable to activate the vehicle 10A has been imparted to be issued to the mobile terminal 20 of the user. The user who cannot drive the vehicle 10A is, for example, a user who has not reached an age at which the user can acquire a driver's license or a user who does not acquire the driver's license. Specifically, the key sharing management unit 3207 sends an authentication key arrangement request in which an indication that the activation of the vehicle 10A is prohibited is included in authority information corresponding to the mobile terminals 20Aa, 20Ab corresponding to the users determined to be unable to drive the vehicle 10A, to the authentication key issuance unit 3203. Accordingly, since the authentication key issuance unit 3203 can distribute the authentication key to which the authority to prohibit the activation of the vehicle 10A has been imparted, to the mobile terminals 20Aa, 20Ab of the users who are unable to drive the vehicle 10A, it is possible to improve safety of the vehicle 10A in the key sharing service.

For example, the key sharing management unit 3207 distributes the authentication key of the vehicle 10A to the other mobile terminal 20 designated by the temporary key sharing request received from the mobile terminal 20Aa of the owner user by the communication processing unit 3201 based on the temporary key sharing request. Specifically, the key sharing management unit 3207 specifies the ID of the installing user corresponding to the other mobile terminal 20 that is a distribution target (hereinafter referred to as an "installing user ID") based on the installing user information DB of the key application stored in the storage unit 3200. The key sharing management unit 3207 sends an authentication key arrangement request including the specified installing user ID and information (for example, an issued ID of the authentication key included in the temporary key sharing request) corresponding to the authentication key designated by the temporary key sharing request to the authentication key issuance unit 3203. Accordingly, the authentication key issuance unit 3203 can specify another mobile terminal 20 that is a distribution target based on the installing user ID, the issued ID of the authentication key, and the like, and distribute the authentication key to the other mobile terminal 20 via the communication processing unit 3201.

A function of the key sharing management unit 3207 may be transferred to a server (a key sharing management server)

outside the center server 30, which may be included in the service management server 40, similar to other services for using the vehicle 10A.

The mobile terminal 20Ab carried by the sub-user includes the communication processing unit 231, the communication processing unit 232, the authentication key acquisition unit 233, the authentication request unit 234, the locking and unlocking request unit 235, and the storage unit 230, as described above.

In the embodiment, description will be given on the premise that the function of the authentication key acquisition unit 233 of the mobile terminal 20Ab is available to the sub-user by the key application being activated and the user authentication based on bidirectional communication with the center server 30 being successful. Description will be given on the premise that the user authentication is performed by the center server 30 based on the sub-user ID and the password. Description will be given on the premise that functions of the authentication request unit 234 and the locking and unlocking request unit 235 of the mobile terminal 20Ab are available to the sub-user by the key application being activated.

The authentication key acquisition unit 233 acquires the authentication key distributed from the center server 30 according to the key sharing request transmitted from the mobile terminal 20Aa to the center server 30 via the communication processing unit 232, as described above. Accordingly, the mobile terminal 20Ab can lock and unlock the doors of the vehicle 10A or activate the vehicle 10A based on the functions of the communication processing unit 231, the authentication request unit 234, and the locking and unlocking request unit 235. That is, the sub-user carrying the mobile terminal 20Ab can directly use the vehicle 10A through the key sharing service. For example, the sub-user can lock and unlock the vehicle 10A using the mobile terminal 20Ab without performing key exchange with the owner user and drive the vehicle 10A. Similarly, the owner user can lend the vehicle 10A to the sub-user without exchanging the key with the sub-user. Accordingly, it is possible to improve convenience in lending and borrowing of the vehicle 10A between the owner user of the vehicle 10A and the sub-user through the key sharing service in the authentication key management system 1.

The authentication key acquisition unit 233 acquires the authentication key that is distributed from the center server 30 according to the temporary key sharing request transmitted from the mobile terminal 20Aa to the center server 30 via the communication processing unit 232, as described above. The same applies to a case where the authentication key is distributed to another mobile terminal 20 other than the mobile terminal 20Ab of the sub-user according to the temporary key sharing request. Accordingly, the other mobile terminal 20 including the mobile terminal 20Ab can lock and unlock the doors of the vehicle 10A or activate the vehicle 10A based on the functions of the communication processing unit 231, the authentication request unit 234, and the locking and unlocking request unit 235. That is, for example, when a plurality of persons including other regular users gets on the vehicle 10A together and goes out and even when the sub-user carrying the mobile terminal 20Ab does not acquire the authentication key in advance, the sub-user does not have to borrow the mobile terminals 20Aa, 20Ab to which the authentication key has already been distributed, and can directly use the vehicle 10A using the mobile terminal 20Ab, such as locking and unlocking the vehicle 10A or driving the vehicle 10A. Similarly, even when the owner user has not caused the mobile terminal 20Ab of the sub-user to acquire the authentication key, it is not needed for the owner user to lend the mobile terminal 20Aa of the owner user to the sub-user. Accordingly, it is possible to improve convenience of the user in a case where a plurality of persons including the regular user of the vehicle 10A gets on the vehicle 10A together and uses the vehicle 10A through the temporary key sharing in the authentication key management system 1.

Details of Configuration Regarding Trunk Delivery Service

A configuration regarding the trunk delivery service in the authentication key management system 1 will be described with reference to FIG. 4.

Figure 4:
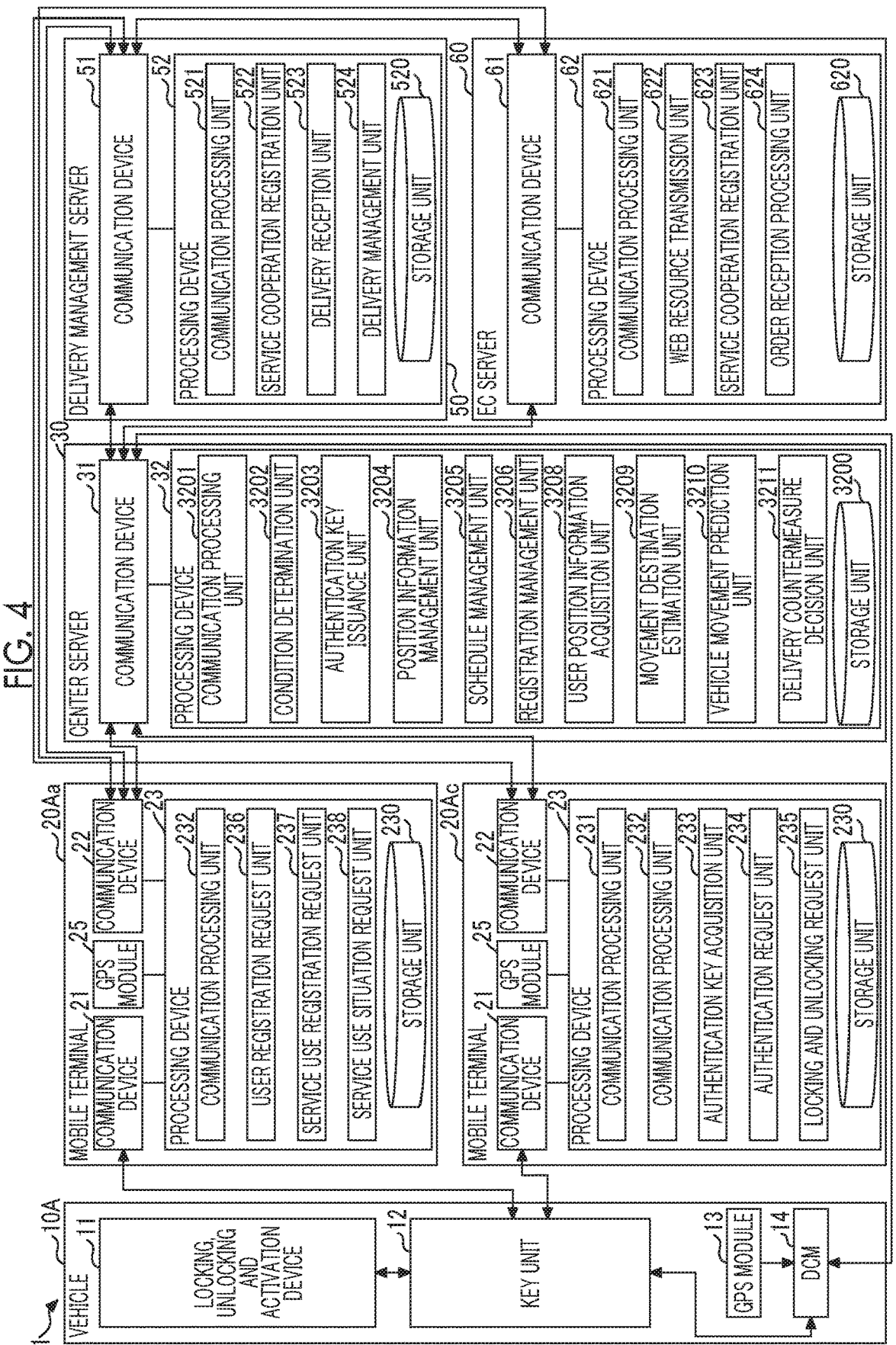
FIG. 4 is a diagram mainly illustrating an example of a configuration regarding a trunk delivery service in the authentication key management system.

FIG. 4 is a diagram mainly illustrating an example of a configuration regarding a trunk delivery service in the authentication key management system 1. Hereinafter, the configuration regarding the trunk delivery service in the authentication key management system 1 will be mainly described with reference to FIG. 4, and duplicate description on the configuration overlapping the above-described configuration regarding the key sharing service will be omitted as much as possible.

The processing device 23 of the mobile terminal 20Aa carried by the owner user of the vehicle 10A includes the communication processing unit 232, the user registration request unit 236, the service use registration request unit 237, and the service use situation request unit 238, as described above.

The user registration request unit 236 requests the center server 30 to register the regular user (a sub-user) of the vehicle 10A who uses various services including the trunk delivery service according to a predetermined manipulation by the owner user, as described above.

The service use registration request unit 237 requests the center server 30 to perform the registration of use of various services including the trunk delivery service for each registered regular user (the owner user or the sub-user) according to a predetermined manipulation by the owner user, as described above.

For example, the service use registration request unit 237 transmits, as the service link information, a service use registration request for using the trunk delivery service including a service login ID of a website for a user who uses the service of the delivery management server 50 (hereinafter referred to as a "delivery site") and a service login ID of the EC site, which corresponds to the regular user of the vehicle 10A that is a registration target, to the center server 30.

The service use situation request unit 238 requests the center server 30 to provide information on a use situation of various services (service use situation information) including the trunk delivery service of the regular user of the vehicle 10A for which the use registration has been performed, in a form corresponding to the owner user ID according to a predetermined manipulation by the owner user, as described above.

The delivery management server 50 that performs an operation of the trunk delivery service includes a communication device 51 and a processing device 52.

The communication device 51 is any device that performs bidirectional communication with each of the mobile terminal 20, the center server 30, and the EC server 60 over a predetermined communication network.

The processing device 52 includes, for example, a communication processing unit 521, a service cooperation registration unit 522, a delivery reception unit 523, and a delivery management unit 524 as functional units that are realized by executing one or more programs stored in the ROM or the auxiliary storage device on the CPU. The processing device 52 includes a storage unit 520 that is realized as a storage area of an auxiliary storage device or the like of the server computer.

The communication processing unit 521 controls the communication device 51 to perform transmission and reception of various signals such as control signals or information signals to and from each of the mobile terminal 20, the center server 30, and the EC server 60.

The service cooperation registration unit 522 performs information registration for cooperation between the center server 30 regarding the use of the trunk delivery service of the regular user of the vehicle 10A and the delivery management server 50 according to the service use registration completion notification received from the center server 30 by the communication processing unit 521.

For example, the service cooperation registration unit 522 adds a flag indicating a use target of the trunk delivery service to the service login ID (a part of service link information) included in the service use registration completion notification in the user management DB that manages the user of the delivery site constructed in the storage unit 520. In addition, the service cooperation registration unit 522 performs registration in an aspect in which information for specifying the vehicle 10A included in the service link information and a service login ID of a website (that is, the EC site) corresponding to the EC server 60 included in the service use registration completion notification is linked to the service login ID included in the service use registration completion notification in the user management DB of the storage unit 520. Accordingly, when the user corresponding to the service login ID regularly uses the vehicles 10A, the delivery management server 50 transmits an authentication key arrangement request to the center server 30 for the vehicle 10A designated by the user. When an order reception including a service login ID is received from the EC server 60, the delivery management server 50 can specify the corresponding service login ID of the delivery site. The delivery management server 50 transmits the authentication key arrangement request including service link information such as the specified service login ID or information for specifying the vehicle 10A corresponding to the vehicle 10A designated by the user to the center server 30 such that it is possible to cause the authentication key to be distributed from the center server 30 to the mobile terminal 20Ac of the deliverer, as described below.

The delivery reception unit 523 receives information (delivery request information) on the luggage delivery request including the service login ID of the EC site corresponding to an orderer of the product at the EC site from the EC server 60 via the communication processing unit 521. The delivery request information received from the EC server 60 includes information on a designated delivery destination (delivery destination information), information on a designated delivery date and time (delivery date and time information), and the like in addition to basic information such as a name, an address, and a telephone number of the orderer that is a delivery destination.

The delivery management unit 524 performs an operation and management of each process from reception to delivery regarding the delivery request received by the delivery reception unit 523.

For example, when the delivery management unit 524 receives a notification that luggage has reached a business office that has jurisdiction over a parking position of the vehicle 10A designated by the delivery destination information of the delivery request from business office via the communication processing unit 521, the delivery management unit 524 decides a date and time of departure for delivery of the luggage, a deliverer in charge, and the like according to a designated delivery time and time (delivery date and time period).

When a time at which the preparation of departure of the delivery by the deliverer is started (for example, 30 minutes to one hour before departure) for each luggage that is a target of the trunk delivery service is reached, the delivery management unit 524 transmits a departure preparation notification to the center server 30 via the communication processing unit 521.

When there is no particular notification from the center server 30 after the above-described departure preparation notification is transmitted, the delivery management unit 524 inquires of the center server 30 about the position information of the vehicle 10A via the communication processing unit 521 before departure for the delivery of the luggage that is a target (for example, 10 minutes before the departure). The delivery management unit 524 acquires current position information of the vehicle 10A from the center server 30 via the communication processing unit 521 and determines whether or not the delivery is available from whether or not the current position matches the designated parking position of the vehicle 10A, a relationship between the current position and a jurisdiction area, or the like.

The determination as to whether or not the delivery is available may be made by the center server 30.

When the delivery management unit 524 determines that the delivery can be performed, the delivery management unit 524 transmits a notification that the trunk can be delivered to the trunk of the vehicle 10A (delivery available notification) to the mobile terminal 20Ac of the deliverer via the communication processing unit 521.

When an authentication key acquisition request is received from the mobile terminal 20Ac that has received the delivery available notification by the communication processing unit 521, the delivery management unit 524 determines whether or not the authentication key acquisition request is a regular authentication key acquisition request. Specifically, the delivery management unit 524 may perform the determination by collating information on luggage that is a delivery target (hereinafter referred to as "delivery luggage information" for convenience) such as a deliverer, a destination (for example, a name of a recipient or a corporate name), a type of luggage, a delivery time period, and a delivery place that can be included in the authentication key acquisition request, with various types of information on the luggage registered in the storage unit 520. When the delivery management unit 524 determines that the authentication key acquisition request is a regular authentication key acquisition request, the delivery management unit 524 transmits an authentication key arrangement request to the center server 30 via the communication processing unit 521. When the delivery management unit 524 transmits the authentication key arrangement request to the center server 30, information for specifying the mobile terminal 20Ac of the deliverer may be included in the authentication key arrangement request. The information for specifying the deliverer may be, for example, an authentication ID for obtaining user authentication at the center server 30 in order for the deliverer to use the function of the key application corresponding to the authentication key acquisition unit 233 of the mobile terminal 20Ac or the like (hereinafter referred to as a "deliverer ID" for convenience). Accordingly, the mobile terminal 20Ac of the deliverer can acquire the authentication key from the center server 30.

When there is no particular notification from the center server 30 after the transmission of the departure preparation notification described above and the delivery management unit 524 receives an inquiry about the current position of the vehicle 10A from the mobile terminal 20Ac of the deliverer who has left for the delivery from the business office via the communication processing unit 521, the delivery management unit 524 inquires of the center server 30 about the current position information of the vehicle 10A. The delivery management unit 524 acquires the current position information of the vehicle 10A from the center server 30 via the communication processing unit 521 and transmits (transfers) the current position information of the vehicle 10A to the mobile terminal 20Ac of the deliverer. Accordingly, the deliverer who has gone out can compare the current position information of the vehicle 10A with the information on the parking position of the vehicle 10A designated by the delivery destination information and determine whether to deliver the luggage or return to the business office.

When the delivery management unit 524 receives a delivery completion notification received from the mobile terminal 20Ac of the deliverer who has completed the delivery of the luggage via the communication processing unit 521, the delivery management unit 524 transmits the delivery completion notification to the center server 30 via the communication processing unit 521 and basically ends an operation and management regarding the trunk delivery service regarding the luggage. When the operation and management regarding the trunk delivery service regarding the luggage ends, the delivery management unit 524 may notify the regular user of the vehicle 10A that is a client (a purchaser of a product at the EC site) through an electronic mail or a predetermined application cooperating with the delivery site installed in the mobile terminals 20Aa, 20Ab that the delivery has been completed.

The DCM 14 of the vehicle 10A may determine that the delivery by the deliverer has been completed when the door (the trunk lid or the like) for access to the trunk of the vehicle 10A is locked after the door is unlocked, and notify the center server 30 that the delivery by the deliverer has been completed, as described above. Accordingly, the center server 30 can transmit a delivery completion notification to the delivery management server 50 when the notification is received. That is, the delivery completion notification may be transmitted from the center server 30 to the delivery management server 50.

On the other hand, when a notification to be described below is received from the center server 30 between the transmission of the departure preparation notification and the delivery completion of the luggage that is a target, the delivery management unit 524 changes the delivery countermeasure regarding the luggage based on the content of the notification.

For example, when the delivery management unit 524 receives a delivery work stop notification from the center server 30 via the communication processing unit 521, the delivery management unit 524 temporarily stops the delivery work of the luggage that is a target. In this case, the delivery management unit 524 transmits an instruction (a delivery work stop instruction) indicating temporarily stopping the delivery work of the luggage that is a target (that is, temporarily stopping direction to the delivery destination) to the mobile terminal 20Ac of the deliverer in charge via the communication processing unit 521. In response to the delivery work stop notification, the delivery management unit 524 stops the delivery work of the luggage that is a target, and then, releases temporary stop of the delivery work of the luggage that is a target when receiving a delivery work stop release notification from the center server 30 via the communication processing unit 521. In this case, the delivery management unit 524 may inquiry of the center server 30 about the position information of the vehicle 10A corresponding to the delivery destination of the luggage that is a target via the communication processing unit 521, and may decide the delivery place to which the deliverer is to be directed based on the position information of the vehicle 10A received from the center server 30.

For example, when the delivery management unit 524 receives a delivery order change notification from the center server 30 via the communication processing unit 521, the delivery management unit 524 relatively delays the delivery order to the trunk of the vehicle 10A corresponding to the luggage among delivery orders of a plurality of delivery destinations of which the deliverer is in charge, which is in charge of the luggage that is a target, according to a predetermined rule (for example, delays the delivery order to the last position or delays the delivery order to a predetermined position). When the delivery management unit 524 relatively delays the delivery order, the delivery management unit 524 transmits a new delivery order list in which the delivery order has been relatively delayed among the delivery orders of the delivery destinations, to the mobile terminal 20Ac of the deliverer in charge via the communication processing unit 521. When the delivery management unit 524 relatively delays the delivery order of the luggage that is a target and then receives a delivery order reexamination notification from the center server 30 via the communication processing unit 521, the delivery management unit 524 reexamines the delivery order of the delivery destinations, to which the luggage has not been delivered, including the trunk of the vehicle 10A that is the delivery destination of the luggage that is a target. This is because the delivery order reexamination notification indicates that the vehicle 10A corresponding to the delivery destination of the luggage that is a target has deviated from a state in which a likelihood of the vehicle 10A being moving or the vehicle 10A moving is high, that is, the delivery place of the luggage that is a target may be settled as the current parking place of the vehicle 10A, as will be described below. In the above-described case, the delivery management unit 524 can reexamine the delivery orders of the delivery destinations using a known optimization scheme in consideration of a positional relationship of the delivery places of the delivery destinations, a congestion situation of a road, and the like.

For example, when the delivery management unit 524 receives the delivery place change notification from the center server 30 via the communication processing unit 521, the delivery management unit 524 changes the delivery place to which the deliverer is directed to deliver the luggage that is a target to the trunk of the vehicle 10A into an estimated movement destination of the vehicle 10A specified by the delivery place change notification. When the delivery management unit 524 changes the delivery place to the estimated movement destination of the vehicle 10A specified by the delivery place change notification, the delivery management unit 524 transmits a change instruction for the delivery place (delivery place change instruction) including the delivery place after the change of the luggage that is a target to the mobile terminal 20Ac of the deliverer in charge via the communication processing unit 521. When the delivery management unit 524 receives a delivery place settlement notification from the center server 30 via the communication processing unit 521 after changing the delivery place according to the delivery place change notification, the delivery management unit 524 settles the delivery place of the luggage that is a target as the delivery place specified by delivery place settlement notification. This is because the delivery place settlement notification indicates that the vehicle 10A corresponding to the delivery destination of the luggage that is a target has deviated from a state in which a likelihood of the vehicle 10A being moving or the vehicle 10A moving is high, that is, the delivery place of the luggage that is a target may be settled as the current parking place of the vehicle 10A. When the delivery place of the luggage that is a target is settled as the delivery place specified by the delivery place settlement notification, the delivery management unit 524 transmits a settlement instruction for the delivery place (delivery place settlement instruction) including the settled delivery place of the luggage that is a target to the mobile terminal 20Ac of the deliverer in charge via the communication processing unit 521.

the delivery management unit 524 changes the delivery destination from the trunk of the vehicle 10A to the designated option after the change when change of the delivery destination (for example, change from the trunk of the vehicle 10A to a convenience store or a home delivery box of a home or a house) is received from the requester or the like according to a delivery destination change request from the center server 30 via the delivery site or the like, as will be described below, between the transmission of the departure preparation notification described above and the delivery completion of the luggage that is a target. When the delivery destination is changed from the trunk of the vehicle 10A to the designated option after the change, the delivery management unit 524 transmits a delivery destination change instruction including the delivery destination after the change to the mobile terminal 20Ac of the deliverer via the communication processing unit 521.

Accordingly, when the vehicle 10A is moving, the delivery management unit 524 can change the delivery countermeasure of the luggage that is a target according to various notifications transmitted from the center server 30 or the change of the delivery destination by the requester, as will be described below. When there is a likelihood of sudden movement of the vehicle 10A, the delivery management unit 524 can change the delivery countermeasure of the luggage that is a target according to various notifications transmitted from the center server 30 or the change of the delivery destination by the requester in advance, as will be described below. Therefore, it is possible to achieve improvement of efficiency of the delivery work of the trunk delivery service.

The EC server 60 includes a communication device 61 and a processing device 62.

The communication device 61 is any device that performs bidirectional communication with each of the mobile terminal 20, the center server 30, and the delivery management server 50 over a predetermined communication network.

The processing device 62 includes, for example, a communication processing unit 621, a web resource transmission unit 622, a service cooperation registration unit 623, and an order reception processing unit 624 as functional units that are realized by executing one or more programs stored in the ROM or the auxiliary storage device on the CPU. The processing device 62 includes a storage unit 620 that is realized as a storage area of an auxiliary storage device or the like of the server computer.

The communication processing unit 621 controls the communication device 61 to perform transmission and reception of various signals such as control signals or information signals to and from each of the mobile terminal 20, the center server 30, and the delivery management server 50.

The web resource transmission unit 622 transmits resources corresponding to the webpage to be displayed on a browser of any terminal of the user browsing the EC site including the mobile terminals 20Aa, 20Ab based on various types of information as resources of the EC site stored in the storage unit 620 to the browser of the terminal using a predetermined scheme. A top page displayed in the EC site, a webpage corresponding to an individual product handled at the EC site, an order input page for the user to input various types of information at the time of ordering an individual product, and the like are included in the webpage on the EC site. For example, the web resource transmission unit 622 transmits a Hyper Text Markup Language (HTML) document corresponding to a webpage, and information under the HTML document such as an image and a moving image displayed on webpages in parallel.

The service cooperation registration unit 623 performs information registration for cooperation between the center server 30 regarding the use of the trunk delivery service of the regular user of the vehicle 10A and the EC server 60 according to the service use registration completion notification received from the center server 30 by the communication processing unit 621. For example, the service cooperation registration unit 623 adds a flag indicating a use target of the trunk delivery service to the service login ID included in the service use registration completion notification in the user management DB that manages the user of the EC site constructed in the storage unit 620. In addition, the service cooperation registration unit 623 performs registration in an aspect in which a service login ID of a website (that is, the delivery site) corresponding to the delivery management server 50 included in the service use registration completion notification is linked to the service login ID included in the service use registration completion notification in the user management DB. Accordingly, for example, when an inquiry about an ordered product including the service login ID of the delivery site is received from the delivery management server 50 by the communication processing unit 621, the EC server 60 can specify the service login ID of the corresponding EC site.

The order reception processing unit 624 receives an order of products from the user based on various manipulation inputs corresponding to the order of the product of the user at the EC site. When the order reception processing unit 624 receives an order and the trunk of the vehicle 10A is selected as a delivery destination on an order input page of the EC site, the order reception processing unit 624 inquires the center server 30 about the car use schedule information via the communication processing unit 621. Accordingly, the order reception processing unit 624 can acquire the latest vehicle use schedule information via the communication processing unit 621. Therefore, for example, when a designated date and time of delivery has already overlapped another schedule, the order reception processing unit 624 can take countermeasures such as requesting to change a delivery date and time.

As described above, the trunk delivery service in which luggage other than an ordered product at the EC site is a target can also be assumed. In this case, the delivery management server 50 may similarly acquire the latest vehicle use schedule information from the center server 30. Accordingly, the delivery management server 50 can take countermeasures such as requesting to change a delivery date and time when a date and time of delivery of the luggage to the trunk of the vehicle 10A designated by the regular user of the vehicle 10A has already overlapped another schedule.

The processing device 32 of the center server 30 that assists in an operation of the trunk delivery service includes the communication processing unit 3201, the condition determination unit 3202, the authentication key issuance unit 3203, the position information management unit 3204, the schedule management unit 3205, the registration management unit 3206, and the storage unit 3200, as described above. The processing device 32 of the center server 30 (an example of the information processing device) includes a user position information acquisition unit 3208, a movement destination estimation unit 3209, a vehicle movement prediction unit 3210, and a delivery countermeasure decision unit 3211 as functional units realized by executing one or more programs stored in the ROM of the server computer or the auxiliary storage device on the CPU.

When the condition determination unit 3202 receives the authentication key arrangement request from the delivery management server 50 via the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on service login information (the service login ID of the delivery site or the like) included in the authentication key arrangement request or predetermined authentication information (for example, the ID and the password) corresponding to the delivery management server 50.

When the condition determination unit 3202 determines whether or not the authentication key arrangement request is a regular authentication key arrangement request, the authentication key issuance unit 3203 specifies the vehicle 10A corresponding to the authentication key arrangement request based on the user service registration information DB of the storage unit 3200. The authentication key issuance unit 3203 issues the authentication key in which a time is limited (for example, the vehicle is available solely in units of several minutes to tens of minutes from the distribution), the number of times of use is limited (for example, the number of times of use is solely 1), and an authority is limited so that solely locking and unlocking of the trunk lid can be allowed. Accordingly, it is possible to suppress unauthorized use of the vehicle 10A by the deliverer and to improve security. The authentication key issuance unit 3203 distributes the authentication key to the mobile terminal 20Ac of the deliverer specified by the authentication key arrangement request via the communication processing unit 3201.

For example, any method such as a known mathematical method or a method based on bidirectional communication between the center server 30 and the vehicle 10 may be adopted as a method of limiting a period of time in which the authentication key is available or the number of times the authentication key is used.

In response to the inquiry about the current position of the vehicle 10 A from the delivery management server 50 received by the communication processing unit 3201, the position information management unit 3204, for example, acquires the position information from the vehicle 10A via the communication processing unit 3201 and provides (transmits) the position information to the delivery management server 50 via the communication processing unit 3201.

In response to a request from the vehicle movement prediction unit 3210, the position information management unit 3204 (an example of a vehicle position information acquisition unit) acquires, for example, the position information from the vehicle 10A via the communication processing unit 3201.

The schedule management unit 3205 replies the EC server 60 with the latest vehicle use schedule information stored in the storage unit 3200 via the communication processing unit 3201 according to the inquiry from the EC server 60 received by the communication processing unit 3201.

The registration management unit 3206 performs registration of the regular user (the sub-user) who uses various services including the trunk delivery service according to the user registration request received from the mobile terminal 20Aa of the owner user by the communication processing unit 3201, as described above. The registration management unit 3206 performs registration of use of the trunk delivery service by the regular user of the vehicle 10A according to the service use registration request received from the mobile terminal 20Aa of the owner user by the communication processing unit 3201, as described above. When the registration of use of various services including the trunk delivery service has been completed, the registration management unit 3206 notifies the mobile terminals 20Aa, 20Ab corresponding to the regular users that are registration targets that the registration of use of various services including the trunk delivery service has been completed via the communication processing unit 3201, as described above. When the registration of use of the trunk delivery service has been completed, the registration management unit 3206 transmits a service use registration completion notification including the service link information to the delivery management server 50 and the EC server 60 that perform an operation and management of a service that is a registration target via the communication processing unit 3201.

The user position information acquisition unit 3208 acquires the position information of the mobile terminals 20Aa, 20Ab of the regular users of the vehicle 10A. For example, the user position information acquisition unit 3208 can perform an inquiry using a known method in which a key application installed in the mobile terminals 20Aa, 20Ab has been used, via the communication processing unit 3201, and acquire positioning information (position information) of the mobile terminal 20 based on a GPS function of the GPS module 25 of the mobile terminal 20 or a base station positioning function.

The movement destination estimation unit 3209 estimates the movement destination of the vehicle 10A when the vehicle movement prediction unit 3210 to be described below determines that the vehicle 10A is moving or when the vehicle movement prediction unit 3210 predicts that the likelihood of movement of the vehicle 10A is high. Details of a movement destination estimation scheme of the movement destination estimation unit 3209 will be described below (see FIG. 12).

The vehicle movement prediction unit 3210 (an example of a prediction unit) determines whether or not the vehicle 10A corresponding to the delivery destination of the luggage that is a target is moving. The vehicle movement prediction unit 3210 predicts the level of the likelihood of the sudden movement of the vehicle 10A when the vehicle 10A corresponding to the delivery destination of the luggage that is a target is parked (that is, the vehicle 10A is not moving). Details of the prediction scheme of the vehicle movement prediction unit 3210 will be described below (see FIGS. 7 to 9).

The delivery countermeasure decision unit 3211 decides (sets) the delivery countermeasure of the luggage that is a target (that is, luggage for which the vehicle 10A is designated as a delivery destination), that is, a procedure regarding delivery work of the luggage, based on the prediction result or the determination result of the vehicle movement prediction unit 3210. Specifically, when the vehicle movement prediction unit 3210 determines that the vehicle 10A corresponding to the delivery destination of the luggage that is a target is moving, or when the vehicle movement prediction unit 3210 predicts that the likelihood of movement is high, a delivery countermeasure of the luggage that is a target, that is, a procedure (setup) regarding the delivery work of the luggage is changed. The delivery countermeasure decision unit 3211 transmits a notification regarding the decided (changed) delivery countermeasure to the delivery management server 50 via the communication processing unit 3201. The delivery countermeasure (the procedure regarding the delivery work of luggage) includes, for example, whether or not the deliverer is to be directed to the parking place of the current vehicle 10A, whether or not the delivery work is temporarily stopped, the delivery order among the delivery destinations of which the deliverer is in charge, and a place (a delivery place) to which the deliverer is directed to deliver the luggage to the vehicle cabin of the vehicle 10A. Details of the operation of the delivery countermeasure decision unit 3211 will be described below (see FIGS. 10 to 13).

Some or all of various functions of the center server 30 regarding the trunk delivery service, that is, functions of the condition determination unit 3202, the authentication key issuance unit 3203, the position information management unit 3204, the schedule management unit 3205, the registration management unit 3206, the vehicle movement prediction unit 328, and the delivery countermeasure decision unit 3211 may be transferred to the delivery management server 50 (an example of the information processing device). For example, the center server 30 may perform solely the distribution of the authentication key to the mobile terminal 20Ac, the management of the position information of the vehicle 10A, the determination as to whether or not the vehicle 10A is moving, and the prediction of the level of the likelihood of the sudden movement of the vehicle 10A, and the function of the delivery countermeasure decision unit 3211 may be transferred from the center server 30 to the delivery management server 50. For example, the center server 30 may perform solely the distribution of the authentication key to the mobile terminal 20Ac, the management of the position information of the vehicle 10A, or the like, and the functions of the vehicle movement prediction unit 3210 and the delivery countermeasure decision unit 3211 may be transferred to the delivery management server 50. For example, the center server 30 may perform solely the distribution of the authentication key to the mobile terminal 20Ac of the deliverer, or the like, and the functions of the position information management unit 3204, the vehicle movement prediction unit 328, and the delivery countermeasure decision unit 3211 may be transferred from the center server to the delivery management server 50. For example, the various functions of the center server 30 regarding the trunk delivery service may be all transferred to the delivery management server 50, and the delivery management server 50 may be configured to perform the distribution of the authentication key to the mobile terminal 20Ac of the deliverer (that is, the functions of the condition determination unit 3202 and the authentication key issuance unit 3203), the management of the position information of the vehicle 10A (that is, the function of the position information management unit 3204), the management of the use schedule of the vehicle 10 A in the trunk delivery service (that is, the function of the schedule management unit 3205), the registration of use of the trunk delivery service (that is, the function of the registration management unit 3206), the determination as to whether the vehicle 10A corresponding to the delivery destination of the luggage that is a target is moving or the prediction of the level of the likelihood of the sudden movement (that is, the function of the vehicle movement prediction unit 3210), and the decision of delivery countermeasure when the vehicle 10A is moving or when the likelihood of the sudden movement of the vehicle 10A is high (that is, the function of the delivery countermeasure decision unit 3211).

The processing device 23 of the mobile terminal 20Ac of a deliverer includes the communication processing unit 231, the communication processing unit 232, the authentication key acquisition unit 233, the authentication request unit 234, and the locking and unlocking request unit 235, as described above.

In the embodiment, the description will be given on the premise that the functions of the authentication key acquisition unit 233, the authentication request unit 234, and the locking and unlocking request unit 235 of the mobile terminal 20Ac are available to the owner user by the key application being activated.

The authentication key acquisition unit 233 transmits the authentication key acquisition request to the delivery management server 50 via the communication processing unit 232 according to a predetermined manipulation by a deliverer. In this case, the authentication key acquisition request includes the above-described delivery luggage information stored in the storage unit 230 in advance. Accordingly, the delivery management server 50 transmits an authentication key arrangement request to the center server 30 according to the authentication key acquisition request, the center server 30 distributes the authentication key to the mobile terminal 20Ac according to the authentication key arrangement request, and the mobile terminal 20Ac can acquire the authentication key. Therefore, the mobile terminal 20Ac can lock and unlock the trunk lid of the vehicle 10A based on the functions of the communication processing unit 231, the authentication request unit 234, and the locking and unlocking request unit 235, such that the deliverer can deliver the requested luggage to the trunk of the vehicle 10A, lock the trunk of the vehicle 10A, and return to the house.

Details of Configuration Regarding C2C Car Sharing Service

A configuration regarding a C2C car sharing service in the authentication key management system 1 will be described with reference to FIG. 5.

Figure 5:
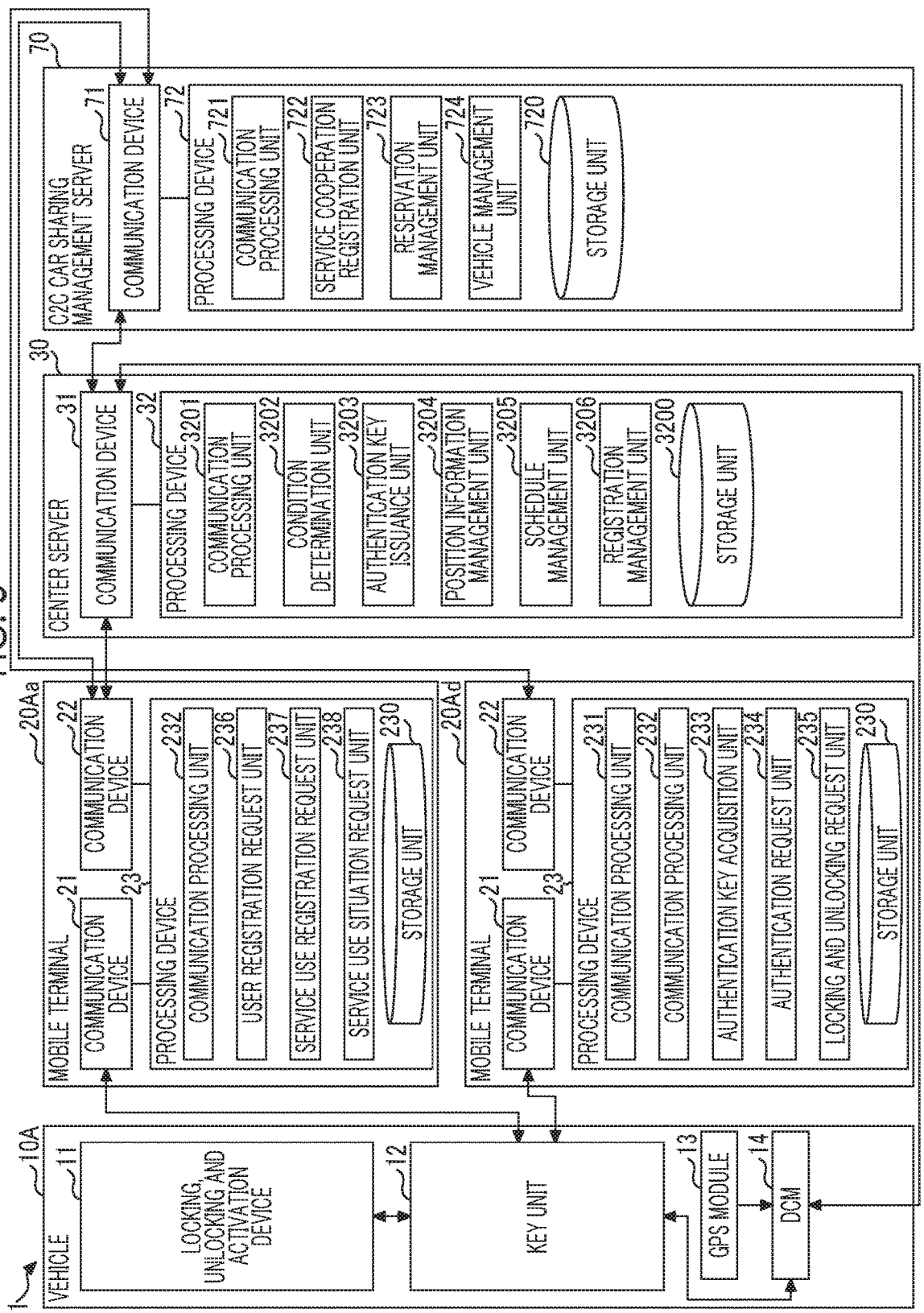
FIG. 5 is a diagram mainly illustrating an example of a configuration regarding a consumer to consumer (C2C) car sharing service in the authentication key management system.

FIG. 5 is a diagram mainly illustrating an example of the configuration regarding the C2C car sharing service in the authentication key management system 1. Hereinafter, the configuration regarding the C2C car sharing service in the authentication key management system 1 will be mainly described with respect to FIG. 5, and duplicate description on the configuration overlapping the above-described configuration regarding the key sharing service or the like will be omitted as much as possible.

The processing device 23 of the mobile terminal 20Aa carried by the owner user of the vehicle 10A includes the communication processing unit 232, the user registration request unit 236, the service use registration request unit 237, and the service use situation request unit 238, as described above.

The user registration request unit 236 requests the center server 30 to register the regular user (a sub-user) of the vehicle 10A who uses various services including the C2C car sharing service according to a predetermined manipulation by the owner user, as described above.

The service use registration request unit 237 requests the center server 30 to perform the registration of use of various services including the C2C car sharing service for each registered regular user (the owner user or the sub-user) according to a predetermined manipulation by the owner user, as described above.

For example, the service use registration request unit 237 transmits, as the service link information, a service use registration request for using the C2C car sharing service including a service login ID of a website for a user who uses the C2C car sharing service corresponding to the C2C car sharing management server 70 (hereinafter referred to as a "C2C car sharing site"), which corresponds to the regular user of the vehicle 10A that is a registration target, to the center server 30.

The service use situation request unit 238 requests the center server 30 to provide information on a use situation of various services (service use situation information) including the C2C car sharing service of the regular user of the vehicle 10A for which the use registration has been performed, in a form corresponding to the owner user ID according to a predetermined manipulation by the owner user, as described above.

The C2C car sharing management server 70 includes a communication device 71 and a processing device 72.

The communication device 71 is any device that performs bidirectional communication with each of the mobile terminal 20 and the center server 30 over a predetermined communication network.

The processing device 72 includes, for example, a communication processing unit 721, a service cooperation registration unit 722, a reservation management unit 723, and a vehicle management unit 724 as functional units that are realized by executing one or more programs stored in the ROM or the auxiliary storage device on the CPU. The processing device 72 includes a storage unit 720 that is realized as a storage area of an auxiliary storage device or the like of the server computer.

Description will be given on the premise that the information for specifying the vehicle 10A that is a lending target has already been registered (stored) in the storage unit 720 in an aspect in which the information is linked to the service login ID via the C2C car sharing site by the regular user (the owner user) of the vehicle 10A.

The communication processing unit 721 controls the communication device 71 to perform transmission and reception of various signals such as control signals or information signals to and from each of the mobile terminal 20 and the center server 30.

The service cooperation registration unit 722 performs information registration for cooperation between the center server 30 regarding the use of the C2C car sharing service of the regular user of the vehicle 10A and the C2C car sharing management server 70 according to the service use registration completion notification received from the center server 30 by the communication processing unit 721.

For example, the service cooperation registration unit 722 adds a flag indicating a lender of the vehicle 10A the C2C car sharing service to the service login ID included in the service use registration completion notification in the user management DB that manages the user of the C2C car sharing site constructed in the storage unit 720. The C2C car sharing management server 70 transmits the authentication key arrangement request including the service login ID corresponding to the regular user of the vehicle 10A, which is the lender, to the center server 30 such that it is possible to cause the authentication key to be distributed from the center server 30 to the mobile terminal 20Ad of the borrower, as described below.

The reservation management unit 723 manages reservation of use of the vehicle 10A that is performed through the C2C car sharing site or the like.

For example, the reservation management unit 723 receives registration of a date and time on which the vehicle 10A is rentable from the regular user of the vehicle 10A through the C2C car sharing site and registers (stores) the received date and time on which the vehicle 10A is rentable in the storage unit 720. When the date and time on which the vehicle 10A is rentable is registered (stored) in the storage unit 720, the reservation management unit 723 inquires of the center server 30 about the car use schedule information via the communication processing unit 721. Accordingly, the reservation management unit 723 can acquire the latest vehicle use schedule information via the communication processing unit 721. Therefore, the C2C car sharing management server 70, for example, can take countermeasures such as requesting to change the date and time on which the vehicle 10A is rentable, which is received from the regular user of the vehicle 10A, or registering a portion excluding an overlapping portion from the date and time on which the vehicle 10A is rentable as the date and time on which the vehicle 10A is rentable when the received date and time on which the vehicle 10A is rentable already overlaps another schedule or registering.

For example, the reservation management unit 723 receives the reservation of use of the vehicle 10A within a range of the date and time on which the vehicle 10A is rentable, which is stored in the storage unit 720. When the reservation management unit 723 receives the reservation of use of the vehicle 10A from a user who is a borrower through the C2C car sharing site, the reservation management unit 723 updates information on a lending schedule of the vehicle 10A (lending schedule information) stored in the storage unit 720.

For example, when the authentication key acquisition request is received from the mobile terminal 20Ad of the borrower of the vehicle 10A by the communication processing unit 721, the reservation management unit 723 determines whether or not the authentication key acquisition request is a regular authentication key acquisition request. Specifically, the reservation management unit 723 may perform the determination based on the service login ID and the password of the C2C car sharing site included in the authentication key acquisition request, or a relationship regarding the date and time of reservation of use (for example, within a range of the date and time of reservation of use or less than a predetermined time until a date and time of use start). When the authentication key acquisition request is a regular authentication key acquisition request, the reservation management unit 723 transmits an authentication key arrangement request to the center server 30 via the communication processing unit 721. When the authentication key arrangement request is transmitted to the center server 30, information for specifying the mobile terminal 20Ad of the borrower of the vehicle 10A is included in the authentication key arrangement request. The information for specifying the borrower of the vehicle 10A may be, for example, an authentication ID (hereinafter referred to as a "borrower ID" for convenience) for obtaining user authentication in the center server 30 in order for the borrower of the vehicle 10A to use a function of the authentication key acquisition unit 233 of the mobile terminal 20Ad. Accordingly, the mobile terminal 20Ad of the borrower of the vehicle 10A can acquire the authentication key from the center server 30.

The vehicle management unit 724 manages the vehicle 10A that is a lending target.

For example, the vehicle management unit 724 inquires of the center server 30 about a current position information of the vehicle 10A via the communication processing unit 721 before the date and time of reservation of use of the vehicle 10A (for example, a period from tens of minutes ago to immediately before). The vehicle management unit 724 acquires the current position information of the vehicle 10A replied from the center server 30 according to the inquiry via the communication processing unit 721. Accordingly, a determination can be made as to whether or not the vehicle 10A returns to a designated place before a date and time of lending (a date and time of reservation of use) of the vehicle 10A. Accordingly, when the vehicle 10A does not return to the designated place, the C2C car sharing management server 70 can take countermeasures such as warning the regular user who is a lender of the vehicle 10A so that the vehicle 10A returns to the designated place through an e-mail or a predetermined application cooperating with the C2C car sharing site, which is installed in the mobile terminals 20Aa, 20Ab.

The processing device 32 of the center server 30 includes the communication processing unit 3201, the condition determination unit 3202, the authentication key issuance unit 3203, the position information management unit 3204, the schedule management unit 3205, the registration management unit 3206, and the storage unit 3200, as described above.

When the authentication key arrangement request is received from the C2C car sharing management server 70 by the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on the service link information included in the authentication key arrangement request (for example, the service login ID of the C2C car sharing site) or predetermined authentication information (for example, the ID and the password) corresponding to the C2C car sharing management server 70.

When the condition determination unit 3202 determines whether or not the authentication key arrangement request is a regular authentication key arrangement request, the authentication key issuance unit 3203 specifies the vehicle 10A corresponding to the authentication key arrangement request based on the user service registration information DB of the storage unit 3200. The authentication key issuance unit 3203 issues the authentication key in which a time is limited (for example, the vehicle is available solely at the date and time of reservation of use of the vehicle 10A included in the authentication key arrangement request and in a buffering period before and after the date and time of reservation of use of the vehicle 10A). The authentication key issuance unit 3203 distributes the authentication key to the mobile terminal 20Ad of the borrower of the vehicle 10A specified by the authentication key arrangement request via the communication processing unit 3201.

The C2C car sharing service may include, for example, a service (hereinafter referred to as a "vehicle truck lending service" for convenience) in an aspect in which solely a trunk of the vehicle 10A is lent. In the case of a vehicle trunk lending service, the authentication key issuance unit 3203 may issue an authentication key with an authority limited so that locking and unlocking of the trunk lid are allowed. Accordingly, it is possible to limit a lending target of C2C car sharing to solely the trunk. By limiting the lending target of the C2C car sharing to solely the trunk, for example, a trunk delivery service in an aspect in which the trunk of the vehicle 10A to be lent at a travel destination is borrowed and a purchased product for use at a travel destination is delivered to the borrowed trunk can be realized.

The position information management unit 3204 transmits a position information request to the vehicle 10A via the communication processing unit 3201 according to the inquiry about the current position of the vehicle 10A from the C2C car sharing management server 70 received by the communication processing unit 3201. Accordingly, the position information management unit 3204 can acquire the current position information from the vehicle 10A via the communication processing unit 3201. The position information management unit 3204 replies the C2C car sharing management server 70 with the current position information acquired from the vehicle 10A via the communication processing unit 3201.

The schedule management unit 3205 transmits the latest vehicle use schedule information to the vehicle 10A via the communication processing unit 3201 according to the inquiry about the current position of the vehicle 10A from the C2C car sharing management server 70 received by the communication processing unit 3201.

The registration management unit 3206 performs registration of the regular user (the sub-user) who uses various services including the C2C car sharing service according to the user registration request received from the mobile terminal 20Aa of the owner user by the communication processing unit 3201, as described above. The registration management unit 3206 performs registration of use of the C2C car sharing service by the regular user of the vehicle 10A according to the service use registration request received from the mobile terminal 20Aa of the owner user by the communication processing unit 3201, as described above. When the registration of use of various services including the C2C car sharing service has been completed, the registration management unit 3206 notifies the mobile terminals 20Aa, 20Ab corresponding to the regular users that are registration targets that the registration of use of various services including the C2C car sharing service has been completed via the communication processing unit 3201, as described above. When the registration of use of the C2C car sharing service has been completed, the registration management unit 3206 transmits a service use registration completion notification including the service link information to the C2C car sharing management server 70 that performs an operation and management of a service that is a registration target via the communication processing unit 3201.

The processing device 23 of the mobile terminal 20Ad of the borrower of the vehicle 10A includes the communication processing unit 231, the communication processing unit 232, the authentication key acquisition unit 233, the authentication request unit 234, the locking and unlocking request unit 235, and the storage unit 230, as described above.

The authentication key acquisition unit 233 transmits an authentication key acquisition request to the C2C car sharing management server 70 via the communication processing unit 232 according to a predetermined manipulation by the borrower of the vehicle 10A. When the authentication key acquisition request is transmitted, the service login ID of the C2C car sharing site corresponding to the borrower of the vehicle 10A is included in the authentication key acquisition request. Accordingly, the C2C car sharing management server 70 can transmit an authentication key arrangement request to the center server 30 according to the authentication key acquisition request, the center server 30 can distribute the authentication key to the mobile terminal 20Ad according to the authentication key arrangement request, and the mobile terminal 20Ad can acquire the authentication key. Therefore, the mobile terminal 20Ad can lock and unlock the door of the vehicle 10A based on the functions of the communication processing unit 231, the authentication request unit 234, and the locking and unlocking request unit 235. That is, the borrower of the vehicle 10A carrying the mobile terminal 20Ad can directly use the vehicle 10A, such as locking and unlocking the vehicle 10A and driving the vehicle 10A using the mobile terminal 20Ad without performing exchange of a key with the regular user of the vehicle 10A through the C2C car sharing service. Similarly, the regular user of the vehicle 10A can lend the vehicle 10A to another person other than the regular user without exchanging the key. Therefore, it is possible to improve convenience in lending and borrowing of the vehicle 10A between the regular user of the vehicle 10A and another person other than the regular user through the C2C car sharing service in the authentication key management system 1.

Details of Configuration Regarding B2C Car Sharing Service

A B2C car sharing service in the authentication key management system 1 will be described with reference to FIG. 6.

Figure 6:
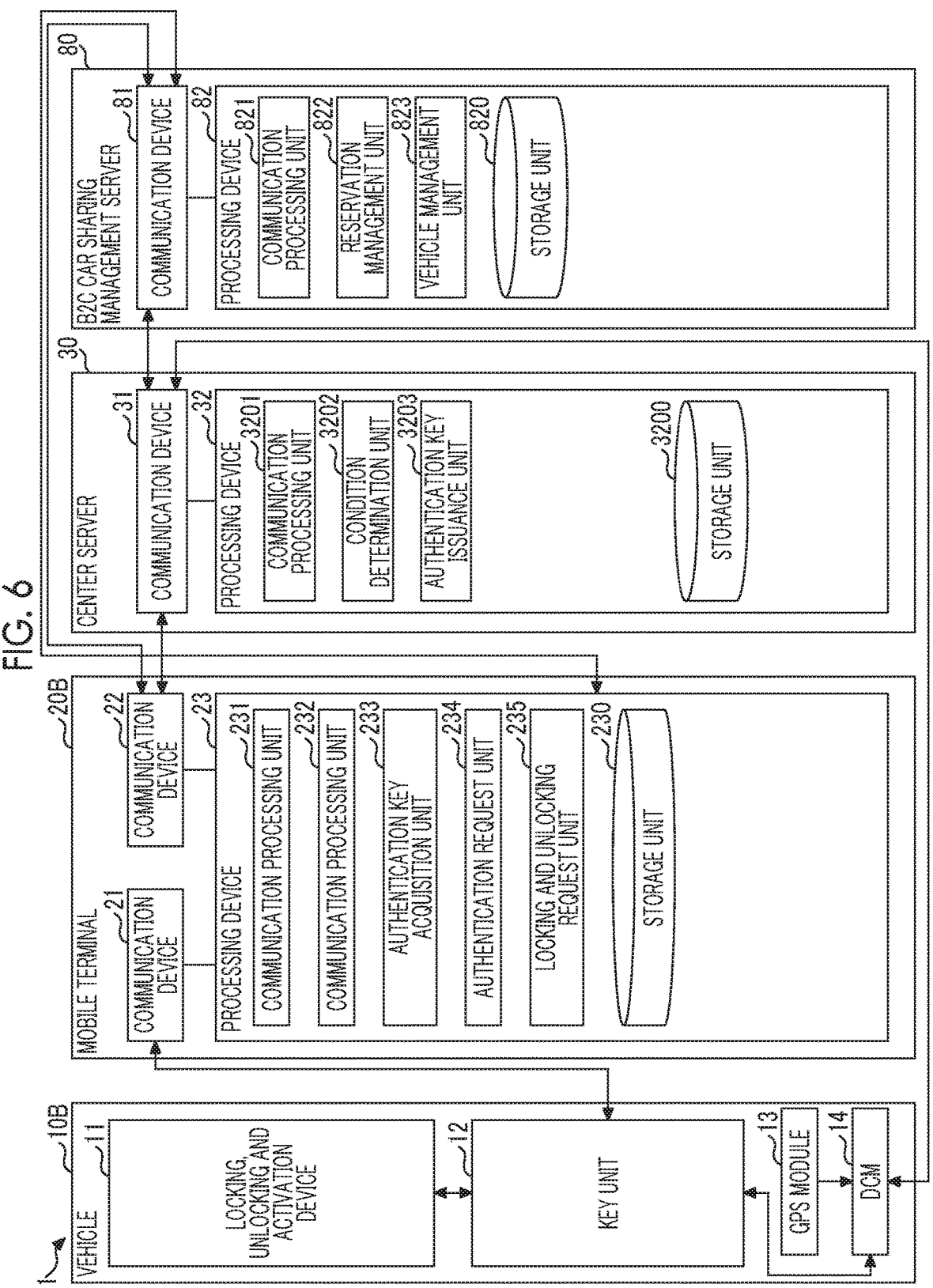
FIG. 6 is a diagram mainly illustrating an example of a configuration regarding a business to consumer (B2C) car sharing service in the authentication key management system.

FIG. 6 is a diagram mainly illustrating an example of the configuration regarding the B2C car sharing service in the authentication key management system 1. Hereinafter, the configuration regarding the B2C car sharing service in the authentication key management system 1 will be mainly described with respect to FIG. 6, and duplicate description on the configuration overlapping the above-described configuration regarding the key sharing service or the like will be omitted as much as possible.

The B2C car sharing management server 80 includes a communication device 81 and a processing device 82.

The communication device 81 is any device that performs bidirectional communication with each of the mobile terminal 20B and the center server 30 over a predetermined communication network.

The processing device 82 includes, for example, a communication processing unit 821, a reservation management unit 822, and a vehicle management unit 823 as functional units that are realized by executing one or more programs stored in the ROM or the auxiliary storage device on the CPU. The processing device 82 includes a storage unit 820 that is realized as a storage area of an auxiliary storage device or the like of the server computer.

The communication processing unit 821 controls the communication device 81 to perform transmission and reception of various signals such as control signals or information signals to and from each of the mobile terminal 20B and the center server 30.

The reservation management unit 822 manages the reservation of use of the vehicle 10B that is performed through the B2C car sharing site or the like.

For example, the reservation management unit 822 receives reservation of use of the vehicle 10B from a user (hereinafter referred to as a "borrower user") who wants to borrow the vehicle 10B through a website that is operated by a company of the B2C car sharing management server 80 or the like (hereinafter referred to as a "B2C car sharing site" for convenience). The reservation management unit 822 stores information on the received reservation of use of the vehicle 10B (use reservation information) in the storage unit 820. When the information on use reservation is stored in the storage unit 820, for example, information for specifying the vehicle 10A that is a target, information on a date and time of reservation of use (a start date and time of use and an end date and time of use), and a service login ID of the borrower user in the B2C car sharing site may be included in the use reservation information.

For example, the reservation management unit 822 updates the information on the use schedule of the vehicle 10B (the vehicle use schedule information) stored in the storage unit 820 each time the reservation management unit 822 receives the reservation of use of the vehicle 10B. Accordingly, the B2C car sharing management server 80 can display the use schedule of the vehicle 10B on the B2C car sharing site to present a date and time when the reservation of use can be made, to the borrower user.

For example, when the authentication key request is received from the mobile terminal 20B by the communication processing unit 821, the reservation management unit 822 determines whether or not the authentication key request is a regular authentication key request. Specifically, the reservation management unit 822 may perform the determination based on the service login ID and the password of the B2C car sharing site corresponding to the borrower user included in the authentication key request, or a relationship regarding the date and time of reservation of use (for example, within a range of the date and time of reservation of use or less than a predetermined time until a date and time of use start). When the authentication key request is a regular authentication key acquisition request, the reservation management unit 822 transmits an authentication key arrangement request to the center server 30 via the communication processing unit 821. When the authentication key arrangement request is transmitted to the center server 30, information for specifying the mobile terminal 20B of the borrower user borrowing the vehicle 10B is included in the authentication key arrangement request. The information for specifying the borrower user borrowing the vehicle 10B may be, for example, an authentication ID (hereinafter referred to as a "borrower user ID" for convenience) for obtaining user authentication in the center server 30 in order for the borrower user borrowing the vehicle 10B to use a function of a key application corresponding to the authentication key acquisition unit 233 of the mobile terminal 20B or the like. Accordingly, the mobile terminal 20B of the borrower user borrowing the vehicle 10B can acquire the authentication key from the center server 30.

The vehicle management unit 823 manages the vehicle 10B that is a lending target.

For example, the vehicle management unit 823 inquires of the center server 30 about the vehicle 10B parked in the vicinity (for example, within hundreds of meters) of a place designated in the reservation of use via the communication processing unit 821 before the date and time of reservation of use of the vehicle 10B of a borrower user (for example, before tens of minutes). The vehicle management unit 823 acquires the position information of the vehicle 10B parked in the vicinity of the designated place replied from the center server 30 according to the inquiry via the communication processing unit 821. Accordingly, the vehicle management unit 823 can specify one or a plurality of vehicles 10B parked around the designated place and determine, for example, the vehicle 10B to be lent before the start date and time of use of the vehicle 10B of the borrower.

For example, the vehicle management unit 823 inquires of the center server 30 about the position information of the vehicle 10B in the designated area via the communication processing unit 821 according to a search request of the vehicle 10B in a designated area by the borrower user at the B2C car sharing site. The vehicle management unit 823 acquires the position information of the vehicle 10B in the designated area replied from the center server 30 according to the inquiry via the communication processing unit 821. Accordingly, the vehicle management unit 823, for example, can present the position information of the vehicle 10B that is a target to the borrower user who wants to borrow the vehicle 10B in the designated area immediately at the B2C car sharing site.

The processing device 32 of the center server 30 includes the communication processing unit 3201, the condition determination unit 3202, the authentication key issuance unit 3203, and the storage unit 3200, as described above.

When the authentication key arrangement request received from the B2C car sharing management server 80 is received by the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on whether or not the borrower user ID included in the authentication key arrangement request is the authentication ID already registered in the storage unit 3200, or on predetermined authentication information (for example, an ID Password) corresponding to the B2C car sharing management server 80.

When the condition determination unit 3202 determines whether or not the authentication key arrangement request is the regular authentication key arrangement request, the authentication key issuance unit 3203 issues the authentication key in which a time is limited (for example, the vehicle is available solely at the date and time of reservation of use of the vehicle 10B included in the authentication key arrangement request and in a buffering period before and after the date and time of reservation of use of the vehicle 10B). The authentication key issuance unit 3203 distributes the authentication key to the mobile terminal 20B of the borrower user borrowing the vehicle 10B specified by the authentication key arrangement request via the communication processing unit 3201.

The processing device 23 of the mobile terminal 20B of the borrower user borrowing the vehicle 10B includes the communication processing unit 231, the communication processing unit 232, the authentication key acquisition unit 233, the authentication request unit 234, the locking and unlocking request unit 235, and the storage unit 230, as described above.

The authentication key acquisition unit 233 transmits an authentication key acquisition request to the B2C car sharing management server 80 via the communication processing unit 232 according to a predetermined manipulation by the borrower user of the vehicle 10B. When the authentication key acquisition request is transmitted, the service login ID of the B2C car sharing site corresponding to the borrower user borrowing the vehicle 10B is included in the authentication key acquisition request. Accordingly, the B2C car sharing management server 80 can transmit an authentication key arrangement request to the center server 30 according to the authentication key acquisition request, the center server 30 can distribute the authentication key to the mobile terminal 20B according to the authentication key arrangement request, and the mobile terminal 20B can acquire the authentication key. Therefore, the mobile terminal 20B can lock and unlock the door of the vehicle 10B based on the functions of the communication processing unit 231, the authentication request unit 234, and the locking and unlocking request unit 235. That is, the borrower user borrowing the vehicle 10B carrying the mobile terminal 20B can directly use the vehicle 10B, such as locking and unlocking the vehicle 10B and driving the vehicle 10B using the mobile terminal 20B without performing exchange of a key with the company of the vehicle 10B through the B2C car sharing service. Therefore, it is possible to improve convenience for the borrower user borrowing the vehicle 10B through the B2C car sharing service in the authentication key management system 1.

Characteristic Operation of Center Server

A characteristic operation of the center server 30, that is, a processing flow of a process of the center server 30 predicting a level of the likelihood of the sudden movement of the vehicle 10A (a vehicle movement prediction process) and a process of deciding (changing) a delivery countermeasure when a likelihood of the vehicle 10A being moving or of movement of the vehicle 10A (a delivery countermeasure decision process) is high is described with reference to FIGS. 7 to 13.

Specific Example of Vehicle Movement Prediction Process

Figure 7:
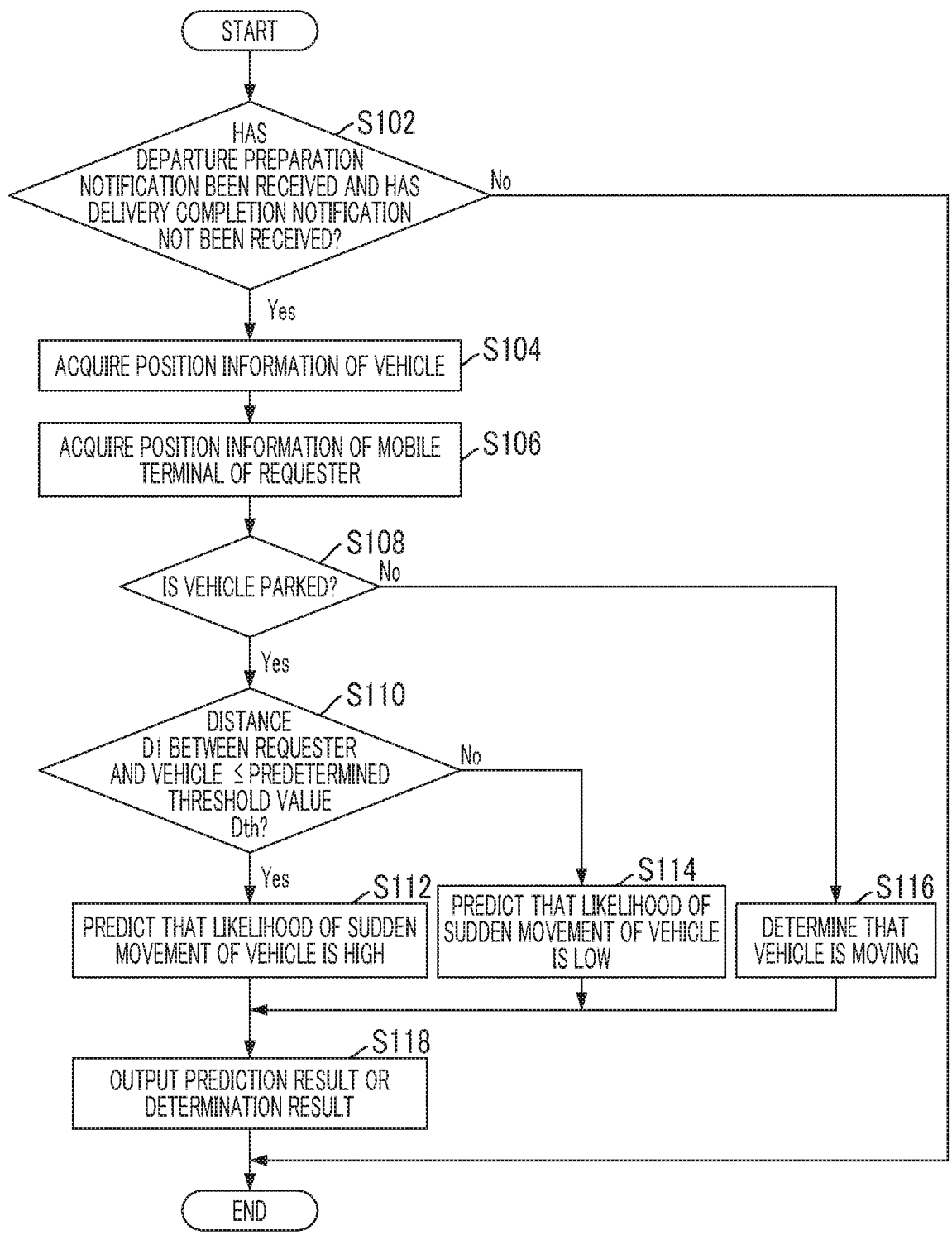
FIG. 7 is a flowchart schematically showing a first example of a vehicle movement prediction process of a center server.

FIG. 7 is a flowchart schematically showing a first example of the vehicle movement prediction process of the center server 30. A process according to this flowchart is repeatedly executed at predetermined processing intervals for each luggage that is a target of a trunk delivery service notified in advance from the delivery management server 50. Hereinafter, the same applies to processes according to flowcharts of FIGS. 8 and 9.

In step S102, the vehicle movement prediction unit 3210 determine s whether or not the departure preparation notification of the luggage that is a target has been received from the center server 30 by the communication processing unit 3201, and whether or not the delivery completion notification of the luggage has not been received. That is, the vehicle movement prediction unit 3210 determines whether or not the luggage that is a target is in a delivery process from start of departure preparation at the business office to completion of delivery by the deliverer to the vehicle cabin (trunk) of the vehicle 10A. When the above condition is satisfied, the vehicle movement prediction unit 3210 proceeds to step S104, and when the condition is not satisfied, the vehicle movement prediction unit 3210 ends this process.

In step S104, the position information management unit 3204 acquires the position information of the vehicle 10A corresponding to the delivery destination of the luggage that is a target. Specifically, the position information management unit 3204 acquires time-series data of position information of the vehicle 10A for a predetermined time. Accordingly, the vehicle movement prediction unit 3210 can determine whether or not the vehicle 10A is moving.

In step S106, the user position information acquisition unit 3208 (an example of the requester position information acquisition unit) acquires the position information of the mobile terminal 20 (the mobile terminal 20Aa or the mobile terminal 20Ab) carried by the requester (the regular user of the vehicle 10A) of the luggage that is a target specified by the departure preparation notification.

In step S108, the vehicle movement prediction unit 3210 determines whether or not the vehicle 10A is parked based on the time-series data of the position information of the vehicle 10A. When the vehicle 10A is parked (that is, the vehicle 10A is not moving), the vehicle movement prediction unit 328 proceeds to step S110. When the vehicle 10A is not parked (that is, the vehicle 10A is moving), the vehicle movement prediction unit 328 proceeds to step S116.

In step S110, the vehicle movement prediction unit 3210 determines whether or not the requester is in a predetermined range somewhat close to the vehicle 10A, based on the position information of the vehicle 10A and the position information of the mobile terminal 20 of the requester. Specifically, the vehicle movement prediction unit 3210 determines whether or not a distance D1 between the requester (the mobile terminal 20 carried by the requester) and the vehicle 10A is equal to or smaller than a predetermined threshold value Dth (for example, tens of meters to hundreds of meters). When the distance D1 between the requester and the vehicle 10A is equal to or smaller than the predetermined threshold value Dth, the vehicle movement prediction unit 3210 proceeds to step S112 and, otherwise, proceeds to step S114.

In step S112, the vehicle movement prediction unit 3210 predicts that a likelihood of the sudden movement of the vehicle 10A is high, and the process proceeds to step S118. This is because the distance D1 between the requester and the vehicle 10A is short to a certain extent and therefore, it is predicted that the requester gets on the vehicle 10A and the vehicle 10A moves.

On the other hand, in step S114, the vehicle movement prediction unit 3210 predicts that the likelihood of the sudden movement of the vehicle 10A is low and proceeds to step S118.

In step S116, the vehicle movement prediction unit 3210 determines that the vehicle 10A is moving, and proceeds to step S118.

In step S118, the vehicle movement prediction unit 3210 outputs the prediction results of steps S112 and S114 or the determination result of step S116, and ends this process.

As described above, in the example, the center server 30 can predict that the likelihood of the requester getting on the vehicle 10A and the vehicle 10A suddenly moving is high when the requester is in a predetermined range close to the vehicle 10A, that is, the distance D1 between the vehicle 10A and the requester is equal to or smaller than the predetermined threshold value Dth based on the position information of the vehicle 10A and the position information of the mobile terminal 20 carried by the requester.

Figure 8:
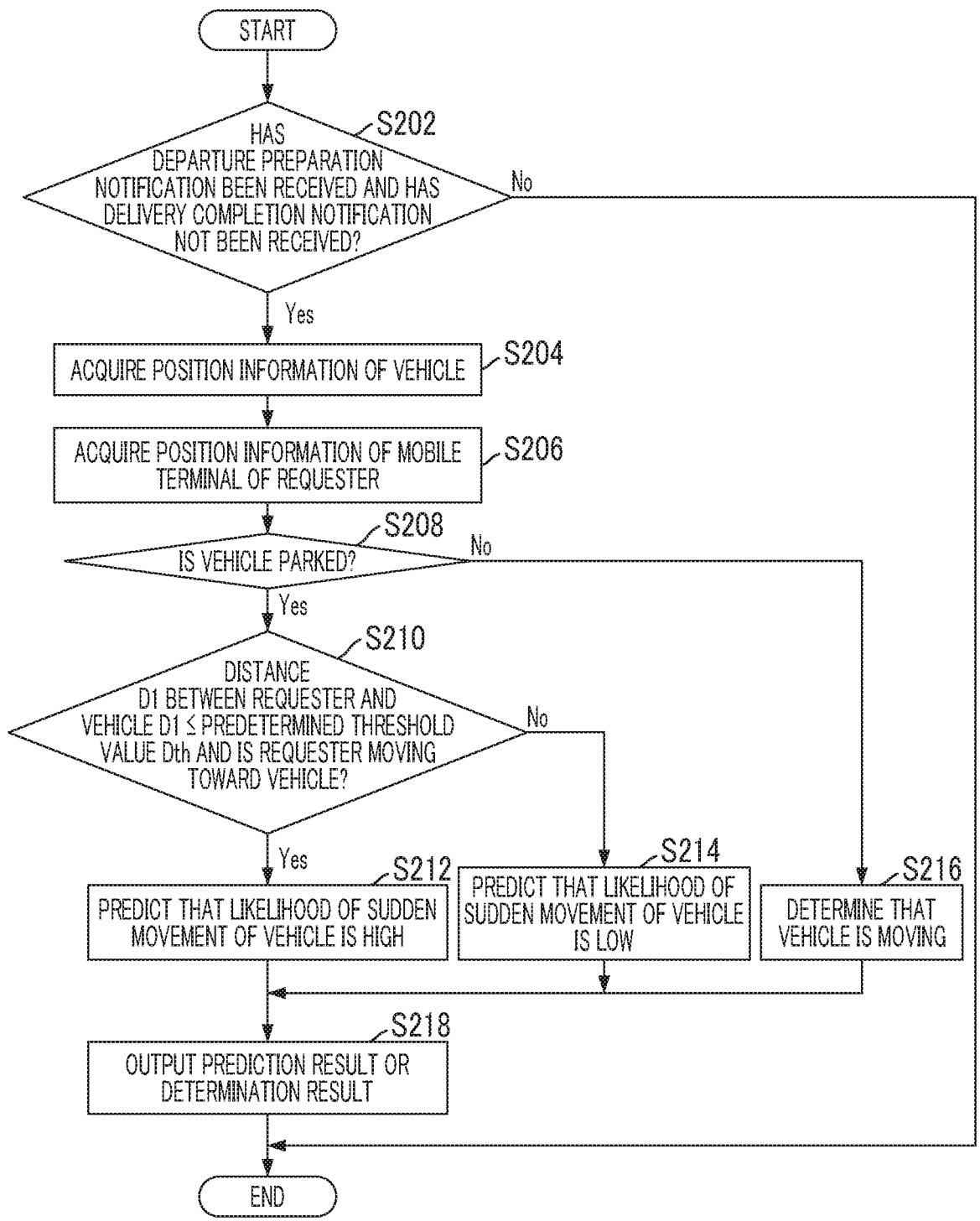
FIG. 8 is a flowchart schematically showing a second example of the vehicle movement prediction process of the center server.

FIG. 8 is a flowchart schematically showing a second example of the vehicle movement prediction process of the center server 30.

Since processes of steps S202 to S208 are the same as the processes of steps S102 to S108 of FIG. 7, description thereof will be omitted.

In step S210, the vehicle movement prediction unit 3210 determines whether or not the requester is in a predetermined range somewhat close to the vehicle 10A (that is, the distance D1 between the vehicle 10A and the requester is equal to or smaller than the predetermined threshold value Dth) and the requester is moving toward the vehicle 10A based on the position information of the vehicle 10A and the position information of the mobile terminal 20 of the requester. When the condition is satisfied, the vehicle movement prediction unit 3210 proceeds to step S212, and when the condition is not satisfied, the vehicle movement prediction unit 3210 proceeds to step S214.

Since processes of steps S212 to 218 are the same as the processes of steps S112 to S118 of FIG. 7, description thereof will be omitted.

As described above, in the example, the center server 30 can predict that the likelihood of the requester getting on the vehicle 10A and the vehicle 10A suddenly moving is high when the requester is moving toward the vehicle 10A within a predetermined range close to the vehicle 10A to some extent based on the position information of the vehicle 10A and the position information of the mobile terminal 20 carried by the requester. Therefore, the vehicle movement prediction unit 3210 can predict a level of a likelihood of the requester getting on the vehicle 10A and the vehicle 10A suddenly moving with higher accuracy.

The vehicle movement prediction unit 3210 may change the content of the process of step S210 and predict the level of the likelihood of the sudden movement of the vehicle 10A according to solely whether or not the requester is moving toward the vehicle 10A regardless of whether the requester is in a predetermined range close to the vehicle 10A to some extent, based on the position information of the vehicle 10A and the position information of the mobile terminal 20 carried by the requester.

Figure 9:
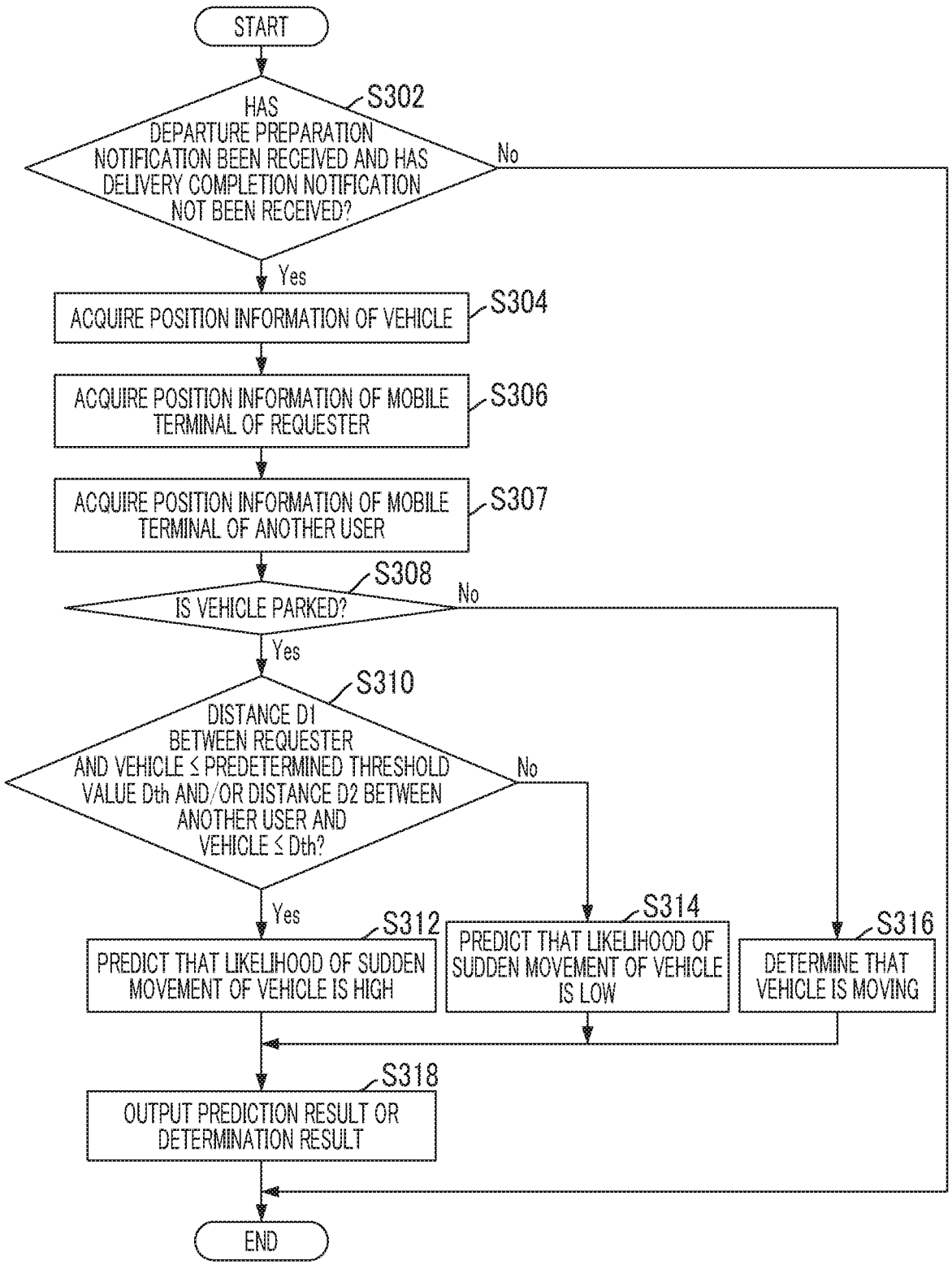
FIG. 9 is a flowchart schematically showing a third example of the vehicle movement prediction process of the center server.

FIG. 9 is a flowchart schematically showing a third example of the vehicle movement prediction process of the center server 30.

Since processes of steps S302 to S306 are the same as the processes of steps S102 to S106 in FIG. 7, description thereof will be omitted.

In step S307, the user position information acquisition unit 3208 (an example of an other-user position information acquisition unit) acquires position information of the mobile terminal 20 (the mobile terminal 20Aa or the mobile terminal 20Ab) carried by the regular user (hereinafter referred to as "another user" for convenience) of the vehicle 10A other than the requester via the communication processing unit 3201.

Since a process of step S308 is the same as the process of step S108 of FIG. 7, description thereof will be omitted.

In step S310, the vehicle movement prediction unit 3210 determines whether or not at least one of the requester and the other user is in a predetermined range somewhat close to the vehicle 10A based on the position information of the vehicle 10A, the position information of the mobile terminal 20 carried by the requester, and the position information of the mobile terminal 20 carried by the other user. Specifically, the vehicle movement prediction unit 3210 determines whether at least one of the distance D1 between the requester and the vehicle 10A and a distance D2 between the other user and the vehicle 10A is equal to or smaller than a predetermined threshold value Dth. When the above condition is satisfied, the vehicle movement prediction unit 3210 proceeds to step S312. When the condition is not satisfied, the vehicle movement prediction unit 3210 proceeds to step S314.

Since processes of steps S312 to S318 are the same as the processes of steps S112 to S118 of FIG. 7, description thereof will be omitted.

In the example, when at least one of the requester and the other user is in the predetermined range somewhat close to the vehicle 10A based on the position information of the vehicle 10A, the position information of the mobile terminal 20 carried by the requester, and the position information of the mobile terminal 20 carried by the other user as described above, the center server 30 can predict that a likelihood of at least one of the requester and the other user getting on the vehicle 10A and the vehicle 10A suddenly moving is high. That is, in the example, the center server 30 can cope with not only a case where the requester gets on the vehicle 10A and the vehicle 10A is suddenly moving, but also a case where a user (another user) of the vehicle 10A other than the requester gets on the vehicle 10A and the vehicle 10A is suddenly moving.

The vehicle movement prediction unit 3210 may change the process of step S310 and predict the level of the likelihood of at least one of the requester and the other user getting on the vehicle 10A and the vehicle 10A suddenly moving in an aspect considering whether or not the requester or the other user is moving toward the vehicle 10A, as in the case of FIG. 8. Specifically, the vehicle movement prediction unit 3210 may predict that the likelihood of the sudden movement of the vehicle 10A is high when at least one of the requester and the other user is moving toward the vehicle 10A in the predetermined range close to the vehicle 10A to some extent (that is, in a state in which the distances D1 and D2 are the predetermined threshold value Dth), and predict that the likelihood is low in other cases. Accordingly, the vehicle movement prediction unit 3210 can predict the level of the likelihood of at least one of the requester and the other user getting on the vehicle 10A and the vehicle 10A suddenly moving with higher accuracy.

Specific Example of Delivery Countermeasure Decision Process

Figure 10:
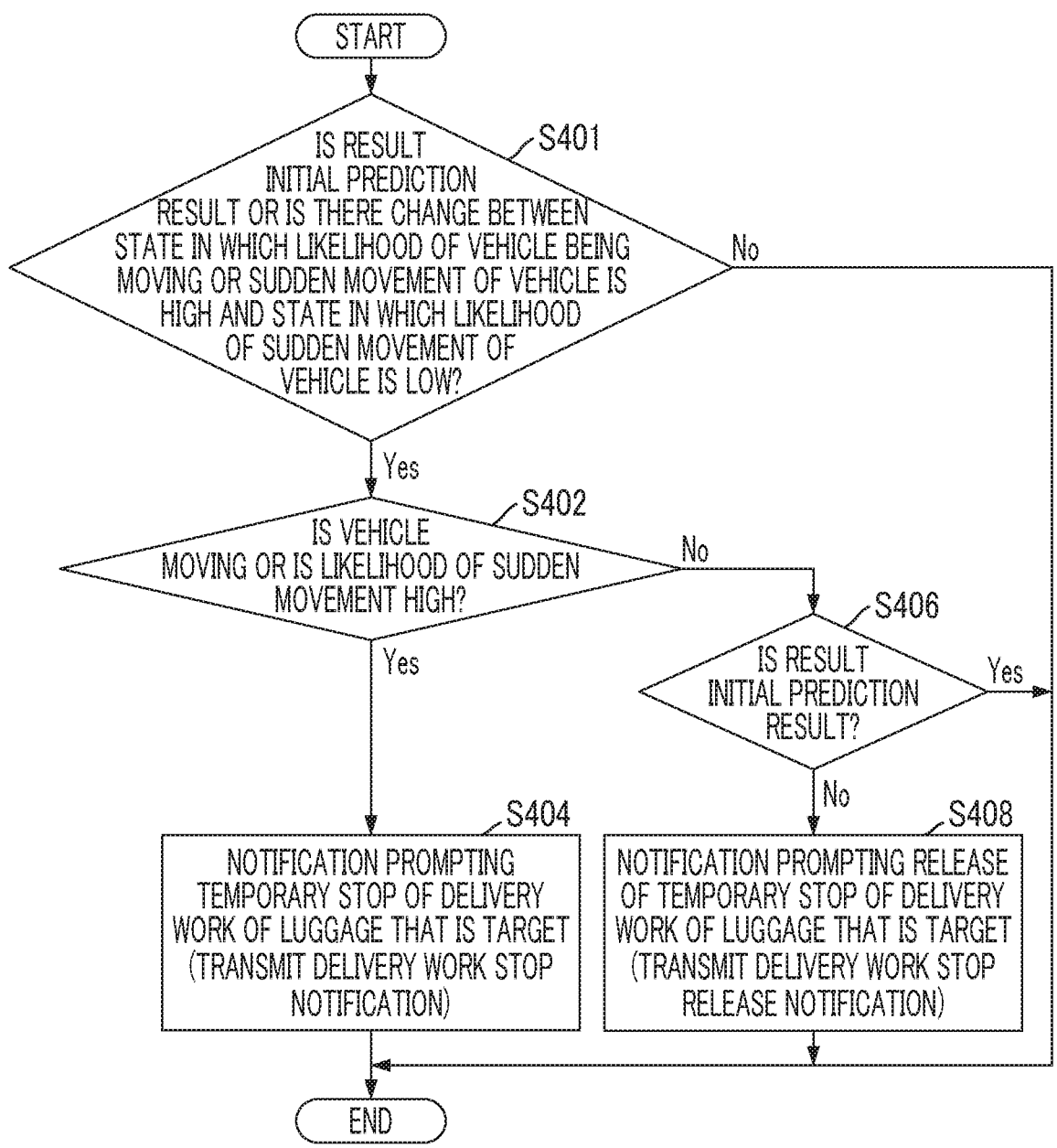
FIG. 10 is a flowchart schematically showing a first example of a delivery countermeasure decision process of the center server.

FIG. 10 is a flowchart schematically showing a first example of delivery countermeasure decision process of the center server 30. The process according to this flowchart is executed each time a prediction result or a determination result (hereinafter referred to as a "prediction result or the like" for convenience) of the vehicle movement prediction unit 3210 is output. Hereinafter, the same applies to the flowcharts of FIGS. 11 to 13.

In step S401, the delivery countermeasure decision unit 3211 decides whether or not the prediction result or the like output most recently by the vehicle movement prediction unit 3210 is an initial prediction result or the like regarding the luggage that is a target, or indicates a change between a state in which a likelihood of the vehicle 10A being moving or sudden movement of the vehicle 10A is high and a state in which the likelihood of the sudden movement of the vehicle 10A is low. When the above conditions are satisfied, the delivery countermeasure decision unit 3211 proceeds to step S402. When the condition is not satisfied, the delivery countermeasure decision unit 3211 ends this process. This is because, when there is no change between the state in which the likelihood of the vehicle 10A being moving or sudden movement of the vehicle 10A is high and the state in which the likelihood of the sudden movement of the vehicle 10A is low, for example, in a prediction result other than an initial prediction result regarding the luggage that is a target in the vehicle movement prediction unit 3210, it is not needed for a delivery countermeasure for the luggage that is a target, that is, a procedure regarding the delivery work of the luggage to be changed.

In step S402, the delivery countermeasure decision unit 3211 decides whether or not the prediction result of the vehicle movement prediction unit 3210 is a determination that the vehicle 10A is moving or a prediction that there is a likelihood of sudden movement of the vehicle 10A. When the prediction result of the vehicle movement prediction unit 3210 is a determination that the vehicle 10A is moving or a prediction that the likelihood of the sudden movement of the vehicle 10A is high, the delivery countermeasure decision unit 3211 proceeds to step S402. On the other hand, in other cases (that is, when the prediction result is a prediction that the likelihood of the movement of the vehicle 10A is low), the delivery countermeasure decision unit 3211 proceeds to step S406.

In step S404, the delivery countermeasure decision unit 3211 transmits a notification (a delivery work stop notification) prompting the delivery work of the luggage that is a target to be temporarily stopped to the delivery management server 50 via the communication processing unit 3201, and ends this process. Accordingly, the delivery management server 50 can temporarily stop the delivery work of the luggage and prioritize delivery work of other luggage in a situation in which the vehicle 10A corresponding to the delivery destination of the luggage that is a target is moving or the likelihood of the sudden movement of the vehicle 10A is high. Therefore, the center server 30 can achieve improvement of efficiency of the delivery work of the trunk delivery service.

On the other hand, in step S406, the delivery countermeasure decision unit 3211 decides whether or not the prediction result output by the vehicle movement prediction unit 3210 is an initial prediction result regarding the luggage that is a target. The delivery countermeasure decision unit 3211 proceeds to step S408 when the prediction result or the like output by the vehicle movement prediction unit 3210 is not an initial prediction result for the luggage that is a target, and ends this process in the other cases (that is, in the case of the initial prediction result). This is because it is not needed to change the delivery countermeasure, that is, the procedure regarding the delivery work of the luggage when a result indicating that the likelihood of the sudden movement of the vehicle 10A is low is output as the initial prediction result.

In step S408, the delivery countermeasure decision unit 3211 transmits a notification (a delivery work stop release notification) prompting release of the temporary stop of the delivery work of the luggage that is a target via the communication processing unit 3201 to the delivery management server 50, and ends this process. Accordingly, the delivery management server 50 can restart the delivery work of the luggage using returning to a situation in which the likelihood of movement of the vehicle 10A corresponding to the delivery destination of the luggage that is a target is low, as a trigger.

As described above, in the example, the center server 30 can temporarily stop the delivery work of the luggage when the vehicle 10A corresponding to the delivery destination of the luggage that is a target is moving. Therefore, the center server 30 can prioritize the delivery work of other luggage of which the delivery destination has been settled for the delivery company, thereby achieving improvement of efficiency of the delivery work.

The center server 30 can stop the delivery work of the luggage in advance when the likelihood of movement of the vehicle 10A is high. Therefore, the center server 30 prioritizes the delivery work of other luggage of which the delivery destinations have been settled for the delivery company in advance to be earlier than a timing at which the vehicle 10A actually moves, thereby further achieving improvement of efficiency of the delivery work.

Figure 11:
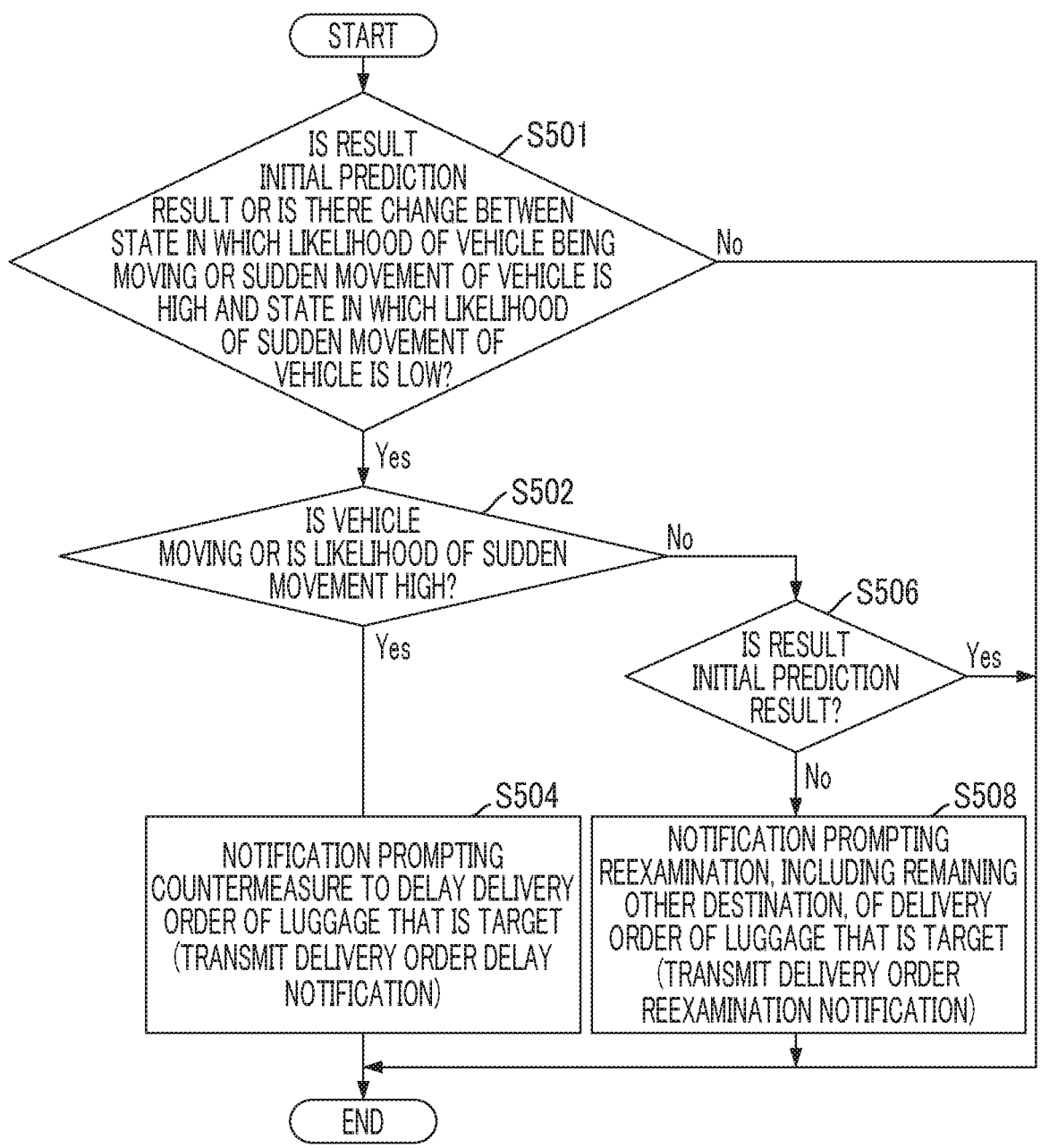
FIG. 11 is a flowchart schematically showing a second example of the delivery countermeasure decision process of the center server.

FIG. 11 is a flowchart schematically showing a second example of the delivery countermeasure decision process of the center server 30.

Since processes of steps S501 and S502 are the same as the processes of steps S401 and S402 in FIG. 10, description thereof will be omitted.

In step S502, when the determination condition is satisfied, the delivery countermeasure decision unit 3211 proceeds to step S504.

In step S504, the delivery countermeasure decision unit 3211 transmits a notification (a delivery order delay notification) prompting a countermeasure to delay the delivery order of the luggage that is a target to the delivery management server 50 via the communication processing unit 3201. Accordingly, the delivery management server 50 can delay the delivery order of the luggage and prioritize delivery of other luggage in a situation in which there is a likelihood of the vehicle 10A corresponding to the delivery destination of the luggage that is a target being moving or suddenly moving. Therefore, the center server 30 can achieve improvement of efficiency of the delivery work of the trunk delivery service.

On the other hand, in step S502, when the determination condition is not satisfied, the delivery countermeasure decision unit 3211 proceeds to step S506.

Since a process in step S506 is the same as the process in step S406 in FIG. 4, description thereof will be omitted.

In step S508, the delivery countermeasure decision unit 3211 transmits a notification (a delivery order reexamination notification) prompting reexamination of the delivery order of the trunk of the vehicle 10A that is the delivery destination of the luggage that is a target, including other remaining delivery destinations of which the deliverer is in charge, to the delivery management server 50 via the communication processing unit 3201. Accordingly, the delivery management server 50 can restart the delivery work of the luggage can reexamine and decide an optimal delivery order regarding the delivery destinations including the trunk of the vehicle 10A that is the delivery destination of the luggage using returning to a situation in which the likelihood of movement of the vehicle 10A corresponding to the delivery destination of the luggage that is a target is low, as a trigger.

As described above, in the example, when the vehicle 10A corresponding to the delivery destination of the luggage that is a target is moving, the center server 30 can relatively delay the delivery order of the trunk of the vehicle 10A which is the delivery destination corresponds to the luggage among the delivery destinations of which the deliverer is in charge. Therefore, the center server 30 can prioritize the delivery work of other luggage of which the delivery destination has been settled for the delivery company, thereby achieving improvement of efficiency of the delivery work.

When the likelihood of the movement of the vehicle 10A is high, the center server 30 can relatively delay the delivery order of the trunk of the vehicle 10A which is the delivery destination corresponds to the luggage among the delivery destinations of which the deliverer is in charge. Therefore, the center server 30 prioritizes the delivery work of other luggage of which the delivery destinations have been settled for the delivery company in advance to be earlier than a timing at which the vehicle 10A actually moves, thereby achieving high improvement of efficiency of the delivery work.

FIG. 12 is a flowchart schematically showing a third example of the delivery countermeasure decision process of the center server 30.

Since processes of steps S601 and S602 are the same as the processes of steps S401 and S402 in FIG. 4, description thereof will be omitted.

In step S602, when the determination condition is satisfied, the delivery countermeasure decision unit 3211 proceeds to step S603.

In step S603, the movement destination estimation unit 3209 estimates the movement destination of the vehicle 10A, and proceeds to step S604. Hereinafter, the estimated movement destination is referred to as an "estimated movement destination" for convenience.

For example, when the vehicle 10A is moving, the movement destination estimation unit 3209 acquires information related to setting of a destination or the like (hereinafter referred to as "navigation setting information") in the navigation device mounted on the vehicle 10A via the communication processing unit 3201. When the navigation setting information is acquired, the DCM 14 of the vehicle 10A acquires the navigation setting information from the navigation device via an in-vehicle network or the like in response to a request of the navigation setting information received from the center server 30 and replies the center server 1430 with the navigation setting information. The movement destination estimation unit 3209 may estimate that a current set destination is a place of the movement destination of the vehicle 10A. The movement destination estimation unit 3209 may estimate a place of the movement destination of the vehicle 10A based on a past destination setting history, a current movement direction of the vehicle 10A, and the like even when the destination is not set. Specifically, the movement destination estimation unit 3209 may estimate a destination suitable for a current movement direction or a current movement route among the destinations set at a frequency equal to or higher than a predetermined reference in the past setting history of the destinations to be a current movement destination.

For example, the movement destination estimation unit 3209 acquires information on the action pattern (hereinafter referred to as "action pattern information") of the requester (the regular user of the vehicle 10A) of the luggage that is a target, which is stored in the storage unit 3200 in advance. The movement destination estimation unit 3209 may acquire action pattern information of the regular user (that is, another user) of the vehicle 10A other than the requester. In the above-described case, the action pattern information may include, for example, information indicating being at a company in a specific time period on a weekday and being directed to a specific place in a specific time period of a specific day of the week, or the like. Specifically, the action pattern information may be generated based on a history of getting-on and use (getting-on pattern) of the vehicle 10A by the requester. In the above-described case, the history of the getting-on and use of the vehicle 10A by the user may be acquired by performing a notification from the vehicle 10A to the center server 30 each time the locking or unlocking of the vehicle 10A is performed. The action pattern information can be acquired by analyzing a movement history of the user based on time-series data of the position information of the mobile terminal 20Aa, 20Ab of the user acquired under the approval of the user. The movement destination estimation unit 3209 may extract an action pattern suitable for a current situation (for example, date and time, time period, day of week, current position, or movement direction) among the action patterns of the requester or the other user included in the action pattern information, and estimate a place corresponding to the extracted action pattern as the movement destination.

For example, the movement destination estimation unit 3209 acquires information on a schedule (action schedule) (hereinafter referred to as "schedule information") of the requester (the regular user of the vehicle 10A) of the luggage that is a target. The movement destination estimation unit 3209 may acquire the schedule information of the regular user (that is, another user) of the vehicle 10A other than the requester. Specifically, the movement destination estimation unit 3209 may acquire the schedule information of the regular user of the vehicle 10A, which is registered by a general-purpose schedule application installed in a terminal (for example, mobile terminal 20Aa, 20Ab) of a requester or another user (a regular user of the vehicle 10A), from a predetermined server that is in conjunction with the schedule application via the communication processing unit 3201. The movement destination estimation unit 3209 may estimate a place specified from the schedule of a time period corresponding to a current time of the schedule information of the user, as the movement destination of the vehicle 10A.

In step S604, the delivery countermeasure decision unit 3211 transmits a notification (a delivery place change notification) prompting the delivery place to which the deliverer is caused to be directed for delivery of the luggage that is a target to be changed into the estimated movement destination to the delivery management server 50 via the communication processing unit 3201. Accordingly, the delivery management server 50 can cause the deliverer to trace the moving vehicle 10A or to go ahead and be directed to the estimated movement destination of the vehicle 10A without causing the deliverer to be directed to the parking place of the vehicle 10A which is highly likely to move in a situation in which there is a likelihood of the vehicle 10A corresponding to the delivery destination of the luggage that is a target being moving or suddenly moving. Therefore, the center server 30 can achieve improvement of efficiency of the delivery work of the trunk delivery service (the vehicle cabin delivery service).

On the other hand, in step S602, when the determination condition is not satisfied, the delivery countermeasure decision unit 3211 proceeds to step S606.

Since a process of step S606 is the same as the process of step S406 in FIG. 4, description thereof will be omitted.

In step S608, the delivery countermeasure decision unit 3211 transmits a notification (a delivery place settlement notification) prompting the delivery destination of the luggage that is a target to be settled as the parking place of the vehicle 10A to the delivery management server 50 via the communication processing unit 3201. Accordingly, the delivery management server 50 can settle the delivery destination of the luggage to be the parking place of the vehicle 10A using returning to a situation in which the likelihood of movement of the vehicle 10A corresponding to the delivery destination of the luggage that is a target is low, as a trigger.

As described above, in the example, the center server 30 can cause the deliverer to go ahead of the estimated movement destination when the vehicle 10A corresponding to the delivery destination of the luggage that is a target is moving. Therefore, it is not needed for the center server 30 to cause the deliverer to trace the moving vehicle 10A, and it is possible to achieve improvement of efficiency of the delivery work.

When the likelihood of movement of the vehicle 10A is high, the center server 30 can cause the deliverer to go ahead of the estimated movement destination in advance when the vehicle 10A has started movement. Therefore, the center server 30 can change the delivery place from the parking place of the vehicle 10A to the estimated movement destination in advance earlier than a timing at which the vehicle 10A actually moves, thereby further achieving improvement of efficiency of the delivery work.

FIG. 13 is a flowchart schematically showing a fourth example of the delivery countermeasure decision process of the center server 30.

Since processes of steps S701 and S702 are the same as the processes of steps S401 and S402 in FIG. 4, description thereof will be omitted.

In step S702, the delivery countermeasure decision unit 3211 proceeds to step S704 when the determination condition is satisfied, and ends this process when the determination condition is not satisfied.

In step S704, the delivery countermeasure decision unit 3211 performs a notification (a delivery destination change request notification) prompting a change of a delivery destination of the luggage that is a target from the trunk (vehicle cabin) of the vehicle 10A to another option (for example, a home delivery box of a house or an apartment, or a convenience store) to the requester via the communication processing unit 3201 (an example of a notification unit).

For example, the delivery countermeasure decision unit 3211 may directly transmit a delivery destination change request notification to the mobile terminal 20 (the mobile terminal 20Aa or the mobile terminal 20Ab) of the requester in a push notification aspect through a key application installed in the mobile terminal 20 of the requester.

For example, the delivery countermeasure decision unit 3211 may transmit the delivery destination change request notification to an email address of the requester (the regular user of the vehicle 10A) or an account of a predetermined SNS registered in the storage unit 3200 in advance.

As described above, in the example, when the vehicle 10A is moving or the likelihood of movement of the vehicle 10A is high, the center server 30 can cause the requester to change the delivery destination from the trunk (vehicle cabin) of the vehicle 10A to another option. Therefore, for example, it is not needed to cause the delivery company to trace the moving vehicle 10A or to be directed to the parking place of the vehicle 10A highly likely to move, thereby achieving improvement of efficiency of the delivery work of the trunk delivery service (the vehicle cabin delivery service).

Any of the processes of FIGS. 10 to 12 and the process of FIG. 13 may be combined. That is, the center server 30 may combine transmission of the delivery work stop notification, the delivery order delay notification, or the delivery order change notification to the delivery management server 50, and transmission of the delivery destination change request to the mobile terminal 20 of the requester, or the like. In the above-described case, for example, the process of step S704 of FIG. 13 may be added immediately after steps S402, S502, S602 of FIGS. 10 to 12 or immediately after steps S604, S704, and S804.

Operation

In the embodiment, the center server 30 assists in an operation of a delivery service (vehicle cabin delivery service) in which the vehicle cabin including the trunk of the vehicle 10A used by the requester can be designated as a delivery destination of a luggage. Specifically, the position information management unit 3204 acquires the position information of the vehicle 10A. The user position information acquisition unit 3208 acquires the position information of the mobile terminals 20Aa, 20Ab carried by the requester. When the vehicle 10A is parked, the delivery countermeasure decision unit 3211 decides a procedure regarding the delivery work of the luggage in which the trunk (the vehicle cabin) of the vehicle 10A is designated as the delivery destination based on the position information of the vehicle 10A and the position information of the mobile terminals 20Aa, 20Ab carried by the requester.

Accordingly, the center server 30 can ascertain the relative positional relationship between the vehicle 10A and the requester based on the position information of the vehicle 10A and the position information of the mobile terminals 20Aa, 20Ab carried by the requester. Therefore, when the vehicle 10A is parked, the center server 30 determines can predict whether or not the likelihood of the requester getting on the vehicle 10A and going out is high, that is, whether or not the likelihood of the requester getting on the vehicle 10A and the vehicle 10A suddenly moving is high, from the relative positional relationship between the vehicle 10A and the requester or a change in the relative positional relationship. Therefore, for example, the center server 30 can maintain the procedure regarding the delivery work of the luggage in which the trunk (vehicle cabin) of the vehicle 10A is designated as a delivery destination as it is in a situation in which the likelihood of the sudden movement of the vehicle 10A is low, and can change the procedure regarding the delivery work of the luggage in consideration of efficiency before the vehicle 10A moves in a situation in which the likelihood of the sudden movement of the vehicle 10A is high. Therefore, the center server 30 can realize efficient delivery work even in a situation in which a likelihood of the sudden movement of the parked vehicle 10A is high.

In the embodiment, when the vehicle 10A is parked, the vehicle movement prediction unit 3210 predicts the level of the likelihood of the sudden movement of the vehicle 10A based on the position information of the vehicle 10A and the position information of the mobile terminals 20Aa, 20Ab carried by the requester. When the vehicle movement prediction unit 3210 predicts that the likelihood of the sudden movement of the vehicle 10A is high, the delivery countermeasure decision unit 3211 changes the procedure regarding the delivery work of the luggage that is a target.

Accordingly, the center server 30 can specifically predict the level of the likelihood of the sudden movement of the vehicle 10A, and change the procedure regarding the delivery work of the luggage in which the trunk (the vehicle cabin) of the vehicle 10A is designated as the delivery destination when the center server 30 predicts that the likelihood of the sudden movement of the vehicle 10A is high.

In the embodiment, when the distance between the vehicle 10A and the mobile terminals 20Aa, 20Ab carried by the requester is relatively short (specifically, when the distance D1 between the vehicle 10A and the requester is equal to or smaller than the predetermined threshold value Dth), the vehicle movement prediction unit 3210 predicts that the likelihood of the sudden movement of the vehicle 10A is high.

Accordingly, when the distance between the vehicle 10A and the requester is relatively short, the center server 30 can specifically predict that the likelihood of the sudden movement of the vehicle 10A is high.

In the embodiment, the vehicle movement prediction unit 3210 predicts that the likelihood of the sudden movement of the vehicle 10A is high when the mobile terminals 20Aa, 20Ab carried by the requester are approaching the vehicle 10A in a predetermined range of the vehicle 10A (specifically, in a situation in which the distance D1 between the vehicle 10A and the requester is equal to or smaller than the predetermined threshold value Dth).

Accordingly, the center server 30 can predict that the likelihood of the sudden movement of the vehicle 10A is high when the requester is approaching the vehicle 10A in the predetermined range of the vehicle 10A.

In the embodiment, the user position information acquisition unit 3208 acquires the position information of the mobile terminals 20Aa, 20Ab carried by the other user of the vehicle 10A other than the requester. When the vehicle 10A is parked, the vehicle movement prediction unit 3210 predicts the level of the likelihood of the sudden movement of the vehicle 10A based on the position information of the vehicle 10A and the position information of the mobile terminals 20Aa, 20Ab carried by the other user.

Accordingly, the center server 30 can ascertain the relative positional relationship between the vehicle 10A and the other user based on the position information of the vehicle 10A and the position information of the mobile terminals 20Aa, 20Ab carried by the other user of the vehicle 10A other than the requester of the delivery service. Therefore, when the vehicle 10A is parked, the center server 30 can predict not only the level of the likelihood of the sudden movement of the vehicle 10A, but also predict the level of the likelihood of the other user getting on the vehicle 10A and the vehicle 10A suddenly moving from the relative position relationship between the vehicle 10A and the other user and a change in the relative positional relationship. That is, the center server 30 can predict the level of the likelihood of solely the other user other than the requester getting on the vehicle 10A and the vehicle 10A suddenly moving. Therefore, the center server 30 can realize efficient delivery work even in a situation in which the likelihood of solely the other user other than the requester getting on the vehicle 10A and the parked vehicle 10A suddenly moving is high.

In the embodiment, the delivery countermeasure decision unit 3211 temporarily stops the delivery work of the luggage when the vehicle movement prediction unit 3210 predicts that the likelihood of the sudden movement of the vehicle 10A is high.

Accordingly, when the likelihood of the sudden movement of the vehicle 10A is high, the center server 30 can specifically perform a countermeasure such as changing the procedure regarding the delivery work of the luggage in advance in an aspect in which the delivery work of the luggage that is a target is temporarily stopped, and prioritizing the delivery work of other luggage.

In this embodiment, when the vehicle movement prediction unit 3210 predicts that the likelihood of the sudden movement of the vehicle 10A is high, the delivery countermeasure decision unit 3211 relatively delays a delivery order of the vehicle cabin of the vehicle 10A corresponding to the luggage among the delivery destinations of which the deliverer of the luggage that is a target is in charge.

Accordingly, when the likelihood of the sudden movement of the vehicle 10A is high, the center server 30 can specifically perform a countermeasure such as changing the procedure regarding the delivery work of the luggage in an aspect in which the delivery order of the vehicle cabin of the vehicle 10A corresponding to the luggage that is a target among the delivery destinations of which the deliverer is in charge is delayed, and prioritizing the delivery work of other luggage.

In the embodiment, the movement destination estimation unit 3209 estimates the movement destination of the vehicle 10A. When the vehicle movement prediction unit 3210 predicts that the likelihood of the sudden movement of the vehicle 10A is high, the delivery countermeasure decision unit 3211 changes the delivery place to which the deliverer of the luggage that is a target is directed, from the parking place of the vehicle 10A to the movement destination of the vehicle 10A estimated by the movement destination estimation unit 3209.

Accordingly, when the likelihood of the sudden movement of the vehicle 10A is high, the center server 30 can change the procedure regarding the delivery work of the luggage in advance, specifically, in an aspect in which a delivery place to which the deliverer of the luggage that is a target is directed is changed, from the parking place of the vehicle 10A to a place estimated as the movement destination of the vehicle 10A.

In the embodiment, when the vehicle movement prediction unit 3210 predicts that the likelihood of the sudden movement of the vehicle 10A is high, the delivery countermeasure decision unit 3211 transmits a notification (a delivery destination change request) prompting change of the delivery destination from the trunk (vehicle cabin) of the vehicle 10A to another option, to the mobile terminals 20Aa, 20Ab carried by the requester, an email address of the requester, or a predetermined SNS account of the requester via the communication processing unit 3201.

Accordingly, the center server 30 can prompt the requester to change the delivery destination in advance when the likelihood of the sudden movement of the vehicle 10A is high.

The embodiments for carrying out the present disclosure have been described in detail above, but the present disclosure is not limited to the specific embodiments as described above, and various modifications and changes can be performed without departing from the gist of the present disclosure described in the claims.

For example, in the embodiment described above, the mobile terminal 20 transmits the authentication request including the authentication key to the key unit 12, and the key unit 12 performs exchange of signals with the locking, unlocking and activation device 11 according to an authentication result based on the authentication key. Therefore, the locking and unlocking of the doors of the vehicle 10A by the locking, unlocking and activation device 11 and the activation of the vehicle 10A are realized, but the present disclosure is not limited to the above aspect.

Specifically, a configuration in which the function of the key unit 12 is transferred to the mobile terminal 20, and the mobile terminal 20 performs exchange of signals based on the above-described key information (internal key information) with the vehicle 10 (the locking, unlocking and activation device 11) using the LF radio waves and the RF radio waves such that the locking and unlocking of the doors of the vehicle 10A and the activation of the vehicle 10A by the locking, unlocking and activation device 11 are realized may be adopted. In this case, the "authentication key" of the embodiment described above may be read as the "key information". That is, the center server 30 may issue the key information instead of the authentication key and distribute the key information to the mobile terminal 20 in the same method as in the authentication key in the above-described embodiment. Accordingly, the same operation and effects as those of the above-described embodiment can be obtained.

The functions of the key unit 12 may be integrated with the locking, unlocking and activation device 11, and a configuration regarding communication between the locking, unlocking and activation device 11 and the key unit 12 and authentication related to the communication (the LF radio wave transmitter 111, the RF radio wave receiver 112, the collating ECU 113, the LF radio wave receiver 121, and the RF radio wave transmitter 122) may be omitted. In this case, when the authentication of the mobile terminal 20 based on the authentication key has been successful, the key ECU 124 may directly output an unlocking command or a locking command and an activation command to each of the body ECU 114 and the engine ECU 116 instead of the collating ECU 113, and perform locking and unlocking the doors of the vehicle 10 and activation of the vehicle 10. Accordingly, the same operation and effects as those of the above-described embodiment can be obtained.

What is claimed is:

1. An information processing device that performs an operation of a delivery service in which a vehicle cabin including a trunk of a vehicle used by a requester is designated as a delivery destination of luggage, or assists in the operation, the information processing device comprising
a center server including a processing device having a processor for executing programs stored in memory, a storage device, a real time clock, and a communication interface, the center server configured to:
acquire position information of the vehicle;
acquire position information of a mobile terminal carried by the requester;
decide a procedure regarding delivery work of the luggage based on the position information of the vehicle and the position information of the mobile terminal carried by the requester when the vehicle is parked;
predict a level of a likelihood of a sudden movement of the vehicle based on the position information of the vehicle and the position information of the mobile terminal carried by the requester when the vehicle is parked;
change the procedure when a prediction unit predicts that the likelihood of the sudden movement of the vehicle is high; and
transmit an authentication key to a mobile terminal for unlocking or locking the vehicle cabin in response to the prediction unit predicting that the likelihood of the sudden movement of the vehicle is not high, wherein
the mobile terminal is caused to transmit to a key electronic control unit (ECU) of the vehicle an unlock or lock request including the authentication key and information designating only unlocking or locking the vehicle cabin,
authenticating the mobile terminal by the key ECU based on the authentication key delivered with the unlock or lock request, the key ECU is caused to transmit to a body ECU of the vehicle an unlock or lock signal, and
the body ECU is caused to output a control command to cause a door lock motor of the vehicle to only unlock or lock the vehicle cabin.

2. The information processing device according to claim 1, the center server further configured to: predict that the likelihood of the sudden movement of the vehicle is high when a distance between the vehicle and the mobile terminal carried by the requester is relatively short.

3. The information processing device according to claim 1, the center server further configured to: predict that the likelihood of the sudden movement of the vehicle is high when the mobile terminal carried by the requester is approaching the vehicle in a predetermined range of the vehicle.

4. The information processing device according to claim 1, the center server further configured to: acquire the position information of the mobile terminal carried by another user of the vehicle other than the requester,
wherein the prediction unit predicts a level of the likelihood of the sudden movement of the vehicle based on the position information of the vehicle and the position information of the mobile terminal carried by the other user when the vehicle is parked.

5. The information processing device according to claim 1, the center server further configured to: stop the delivery work of the luggage when the prediction unit predicts that the likelihood of the sudden movement of the vehicle is high.

6. The information processing device according to claim 1, the center server further configured to: relatively delay a delivery order of the vehicle cabin of the vehicle corresponding to the luggage among a plurality of delivery destinations of which a deliverer of the luggage is in charge when the prediction unit predicts that the likelihood of the sudden movement of the vehicle is high.

7. The information processing device according to claim 1, further comprising a movement destination estimation unit configured the center server further configured to: estimate a movement destination of the vehicle,
the center server further configured to: change a delivery place to which a deliverer of the luggage is directed, from a parking place of the vehicle to the movement destination of the vehicle estimated by the movement destination estimation unit when the prediction unit predicts that the likelihood of the sudden movement of the vehicle is high.

8. The information processing device according to claim 1, the center server further configured to: transmit a notification prompting change of the delivery destination from the vehicle cabin of the vehicle to another option, to the mobile terminal carried by the requester, an email address of the requester, or an account of a predetermined social networking service of the requester when the prediction unit predicts that the likelihood of the sudden movement of the vehicle is high.

9. An information processing method executed by an information processing device including a center server including a processing device having a processor for executing programs stored in memory, a storage device, a real time clock, and a communication interface, the information processing device performs an operation of a delivery service in which a vehicle cabin including a trunk of a vehicle used by a requester is designated as a delivery destination of luggage, or assists in the operation, the information processing method comprising:
acquiring, with the information processing device, position information of the vehicle;
acquiring, with the information processing device, position information of a mobile terminal carried by a requester;
deciding, with the information processing device, a procedure regarding delivery work of the luggage based on the position information of the vehicle and the position information of the mobile terminal carried by the requester when the vehicle is parked;
predicting, with the information processing device, a level of a likelihood of a sudden movement of the vehicle based on the position information of the vehicle and the position information of the mobile terminal carried by the requester when the vehicle is parked,
changing, with the information processing device, the procedure when the likelihood of the sudden movement of the vehicle is high; and
transmitting an authentication key to a mobile terminal for unlocking or locking the vehicle cabin in response to a prediction unit predicting that the likelihood of the sudden movement of the vehicle is not high, wherein
the mobile terminal is caused to transmit to a key electronic control unit (ECU) of the vehicle an unlock or lock request including the authentication key and information designating only unlocking or locking the vehicle cabin,
authenticating the mobile terminal by the key ECU based on the authentication key delivered with the unlock or lock request, the key ECU is caused to transmit to a body ECU of the vehicle an unlock or lock signal, and
the body ECU is caused to output a control command to cause a door lock motor of the vehicle to only unlock or lock the vehicle cabin.

10. A non-transitory computer-readable storage medium storing an information processing program causing an information processing device to execute the information processing method according to claim 9.

* * * * *